United States Patent
Wright et al.

(10) Patent No.: US 7,609,257 B2
(45) Date of Patent: Oct. 27, 2009

(54) SYSTEM AND METHOD FOR APPLYING LINK ANALYSIS TOOLS FOR VISUALIZING CONNECTED TEMPORAL AND SPATIAL INFORMATION ON A USER INTERFACE

(75) Inventors: William Wright, Toronto (CA); Thomas Kapler, Toronto (CA)

(73) Assignee: Oculus Info Inc., Toronto, Ontario (CA)

( * ) Notice: Subject to any disclaimer, the term of this patent is extended or adjusted under 35 U.S.C. 154(b) by 289 days.

(21) Appl. No.: 11/503,921

(22) Filed: Aug. 15, 2006

(65) Prior Publication Data

US 2007/0055782 A1    Mar. 8, 2007

Related U.S. Application Data

(63) Continuation-in-part of application No. 11/078,330, filed on Mar. 14, 2005, and a continuation-in-part of application No. 10/810,680, filed on Mar. 29, 2004, now Pat. No. 7,180,516.

(60) Provisional application No. 60/707,942, filed on Aug. 15, 2005.

(51) Int. Cl.
 G06T 15/00    (2006.01)
 G06T 11/20    (2006.01)
(52) U.S. Cl. .................... 345/419; 345/418; 345/440
(58) Field of Classification Search .................. None
 See application file for complete search history.

(56) References Cited

U.S. PATENT DOCUMENTS

| | | | |
|---|---|---|---|
| 6,356,285 B1 * | 3/2002 | Burkwald et al. ........... | 715/853 |
| 6,727,927 B1 * | 4/2004 | Dempski et al. ............ | 715/853 |
| 6,906,709 B1 * | 6/2005 | Larkin et al. ............... | 345/419 |
| 7,036,085 B2 * | 4/2006 | Barros ....................... | 715/764 |
| 2005/0012743 A1 | 1/2005 | Kapler et al. | |

OTHER PUBLICATIONS

Kraak, M., "The Space-Time Cube Revisited From a Geovisualization Perspective", Proceedings of the 21st International Cartographic Conference (ICC) Durban, South Africa, Aug. 10-16, 2003.*

* cited by examiner

*Primary Examiner*—Ulka Chauhan
*Assistant Examiner*—Daniel F Hajnik
(74) *Attorney, Agent, or Firm*—Grant Tisdall; Gowling Lafleur Henderson LLP

(57) ABSTRACT

A system and method for analyzing a plurality of data elements having both temporal and spatial properties, where a first data element and a second data element of the plurality of data elements are linked by at least one association element. The system and method include selecting the first data element from the plurality of data elements and providing at least one search criteria for use in analyzing the properties of the plurality of data elements with respect to at least one property of the first data element. An analysis module is used to apply the at least one search criteria to the properties of the plurality of data elements for identifying the second data element from the plurality of data elements and the corresponding at least one association element. The at least one association element is configured for representing a connection between the first data element and the second data element, such that the connection has a first property common to a property of the first data element and a second property common to a property of the second data element. A visualization module is used to generate a visual representation of the first and second data elements and the association element configured for display on a user interface for subsequent interaction with user events. The visual representation includes a spatial domain including a reference surface for providing a spatial reference frame having at least two spatial dimensions and a temporal domain operatively coupled to the spatial domain for providing a common temporal reference frame for locations of interest in the spatial domain.

40 Claims, 38 Drawing Sheets

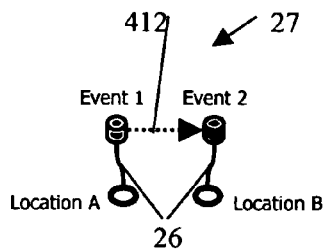
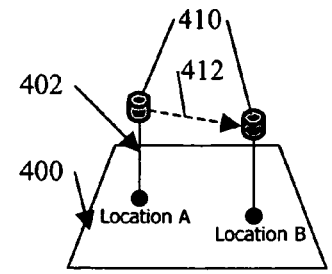

Soft Vector Group
(Phone Call, email, money transfer)
3 Associations:
• Event1 occurred at Location A
• Event 2 occurred at Location B
• Event 1 directed at Event 2

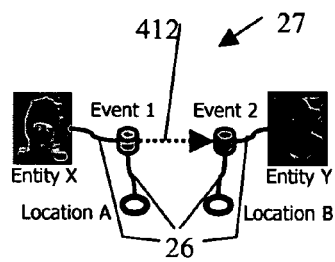

Soft Vector Group with Actors
(Phone Call, email, money transfer)
5 Associations: Same as above plus...
• Entity X present at Event 1
• Entity Y present at Event 2

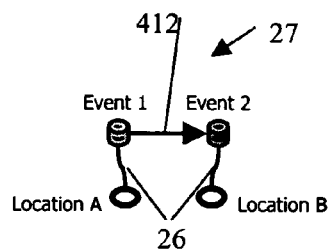
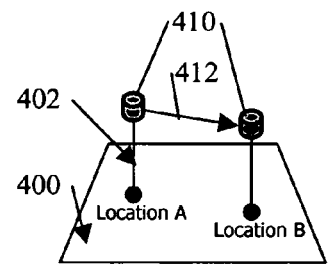

Hard Vector Group
(Documented transport such as air or boat travel)
3 Associations:
• Event1 occurred at Location A
• Event 2 occurred at Location B
• Event 1 moves to Event 2

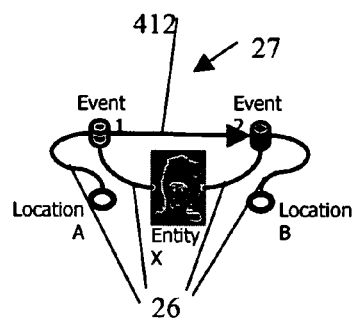
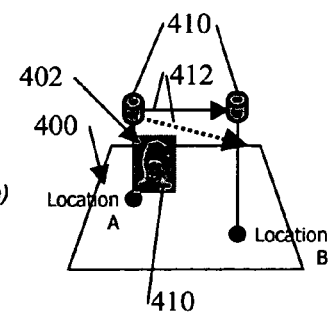

Hard Vector Group with Actors
(Transport of a person or thing)
5 Associations: Same as above plus...
• Entity X present at Event 1 (departure)
• Entity X present at Event 2 (arrival)

Figure 6

1. At time *t*, Entity *X* is rendered at Event1 (Location *A*)
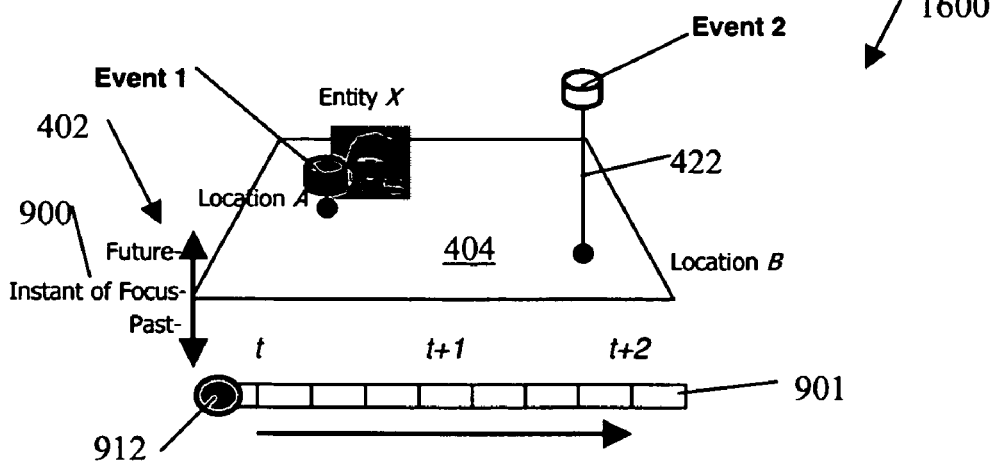
Figure 16
2. At time *t+1*, Entity *X* is shown moving between known locations (Event1 and Event2)
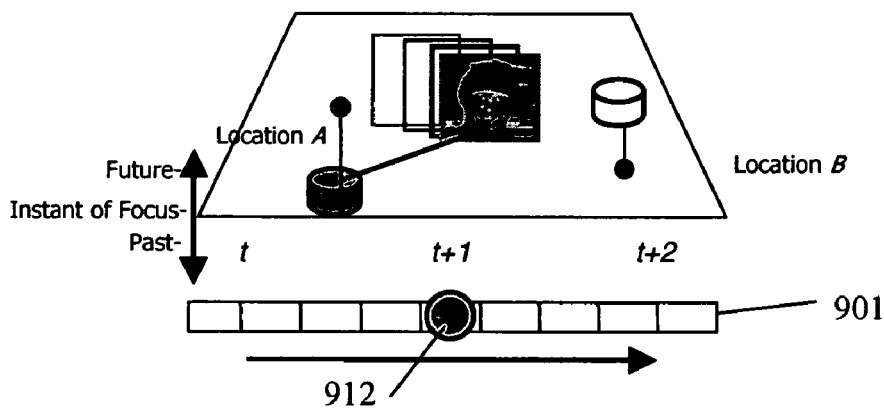
3. At time *t+2*, Entity *X* is rendered at Event2 (Location *B*)
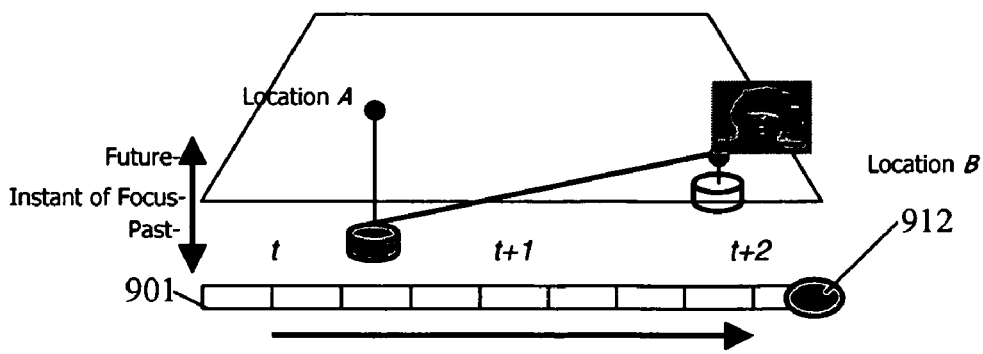

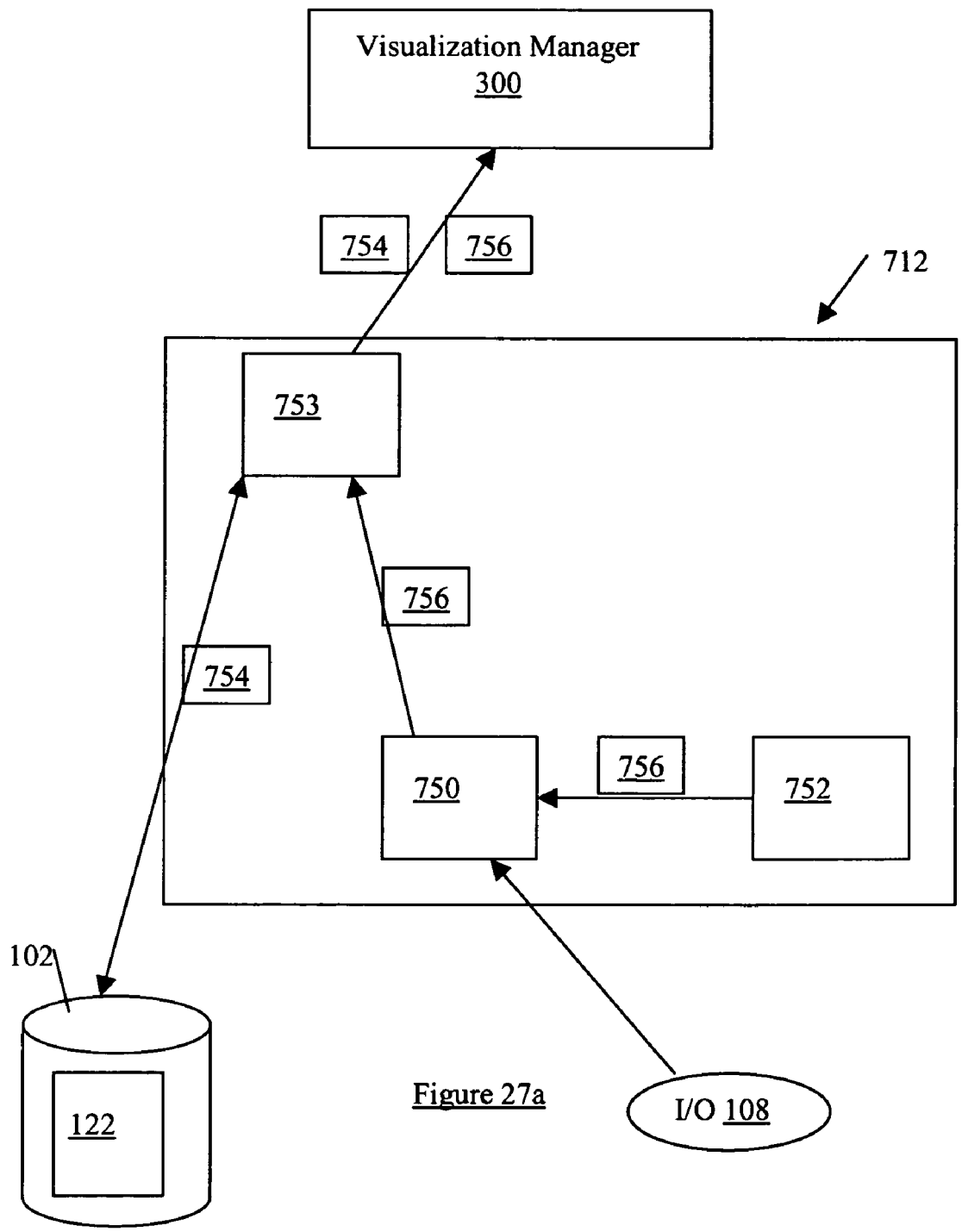

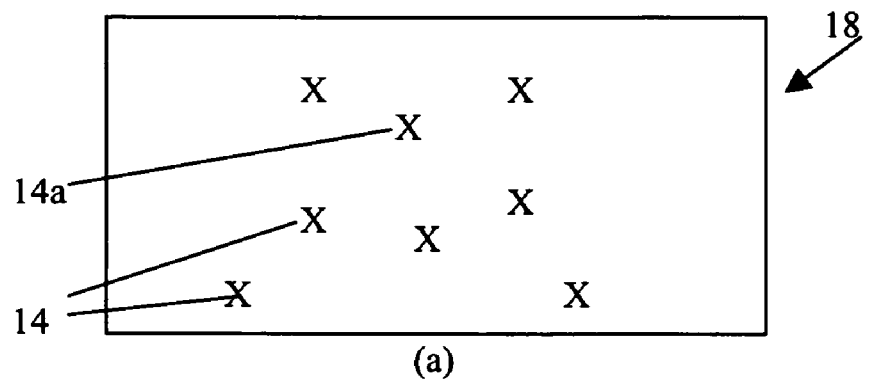
(a)
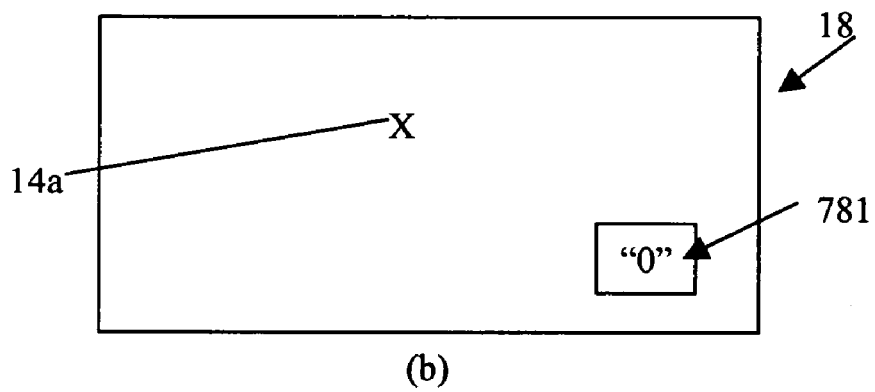
(b)
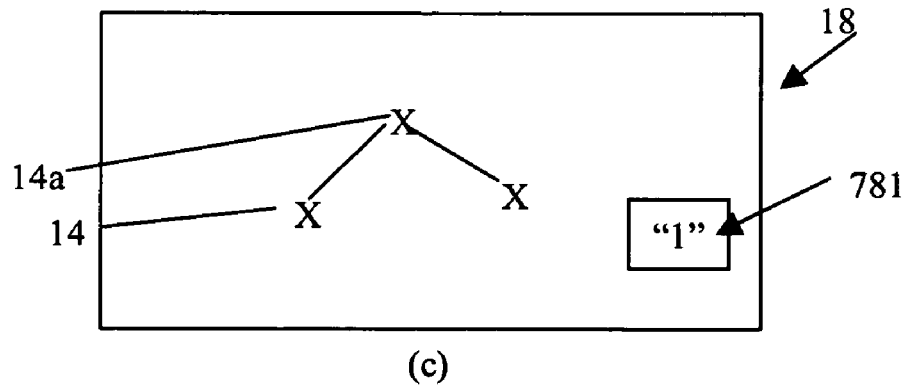
(c)
Figure 32
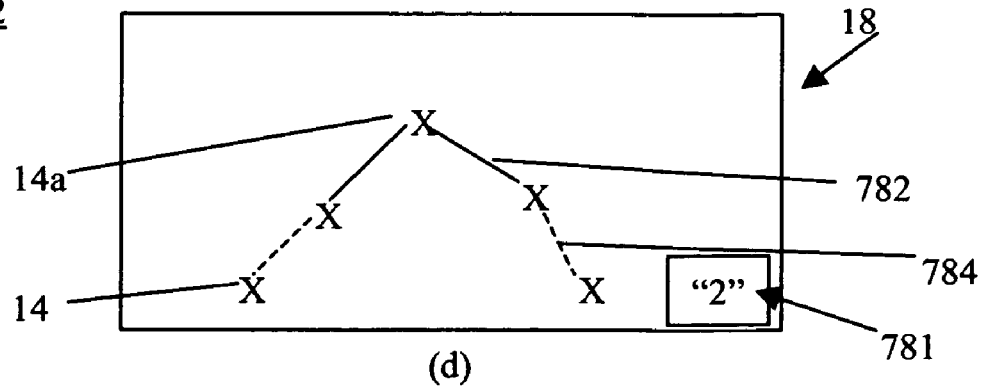
(d)

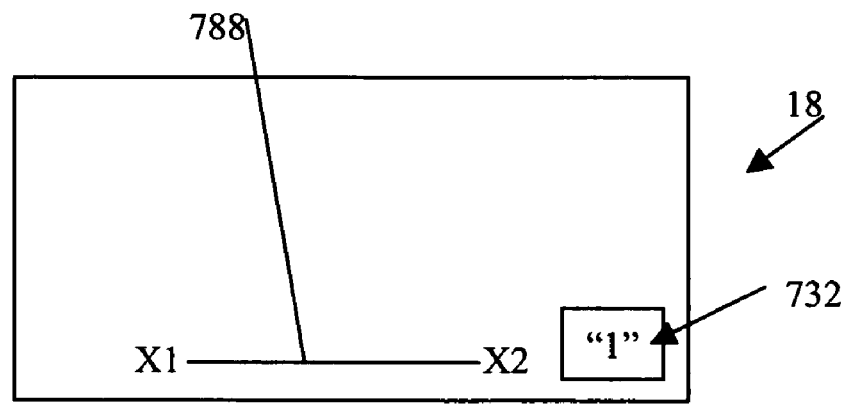
(a)
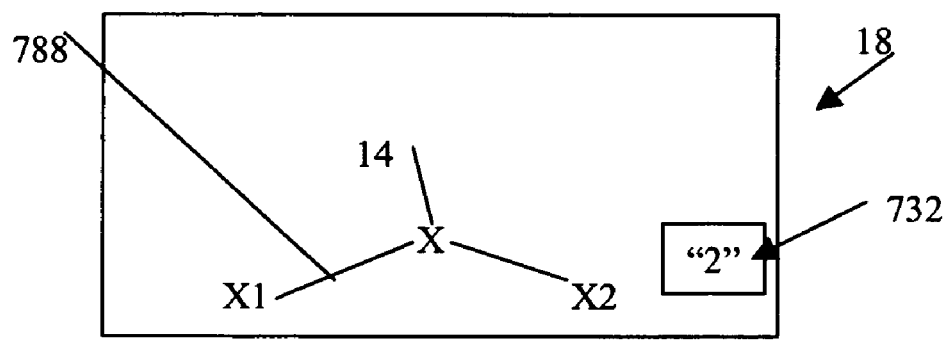
(b)
Figure 33
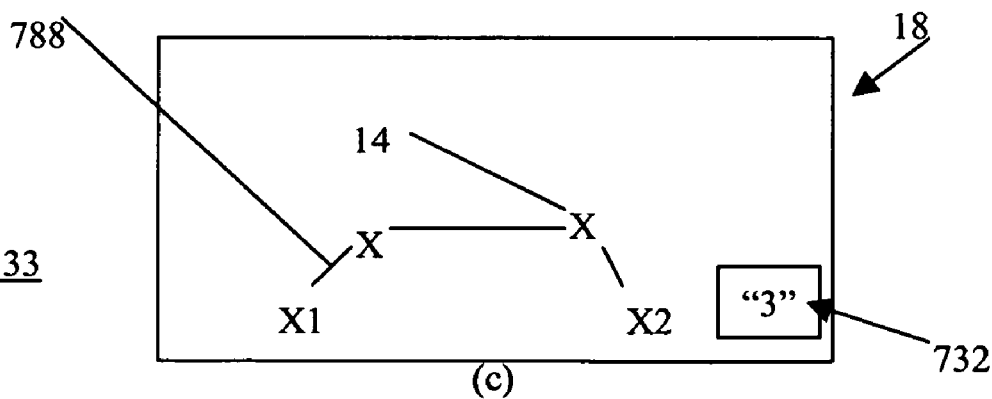
(c)

SYSTEM AND METHOD FOR APPLYING LINK ANALYSIS TOOLS FOR VISUALIZING CONNECTED TEMPORAL AND SPATIAL INFORMATION ON A USER INTERFACE (The present application is a Continuation-In-Part of Ser. No. 10/810,680, now U.S. Pat. No. 7,180,516, filed Mar. 29, 2004, U.S. patent application Ser. No. 11/078,330, filed Mar. 14, 2005 and U.S. Provisional Application No. 60/707,942, filed Aug. 15, 2005, all herein incorporated by reference.)

BACKGROUND OF THE INVENTION

The present invention relates to an interactive visual presentation of multidimensional data on a user interface.

Tracking and analyzing entities and streams of events, has traditionally been the domain of investigators, whether that be national intelligence analysts, police services or military intelligence. Business users also analyze events in time and location to better understand phenomenon such as customer behavior or transportation patterns. As data about events and objects become more commonly available, analyzing and understanding of interrelated temporal and spatial information is increasingly a concern for military commanders, intelligence analysts and business analysts. Localized cultures, characters, organizations and their behaviors play an important part in planning and mission execution. In situations of asymmetric warfare and peacekeeping, tracking relatively small and seemingly unconnected events over time becomes a means for tracking enemy behavior. For business applications, tracking of production process characteristics can be a means for improving plant operations. A generalized method to capture and visualize this information over time for use by business and military applications, among others, is needed.

Many visualization techniques and products for analyzing complex event interactions only display information along a single dimension, typically one of time, geography or a network connectivity diagram. Each of these types of visualizations is common and well understood. For example a Time-focused scheduling chart such as Microsoft (MS) Project displays various project events over the single dimension of time, and a Geographic Information System (GIS) product, such as MS MapPoint, or ESRI ArcView, is good for showing events in the single dimension of locations on a map. There are also link analysis tools, such as Netmap (www.netmapanalytics.com) or Visual Analytics (www.visualanalytics.com) that display events as a network diagram, or graph, of objects and connections between objects. Some of these systems are capable of using animation to display another dimension, typically time. Time is played back, or scrolled, and the related spatial image display changes to reflect the state of information at a moment in time. However this technique relies on limited human short term memory to track and then retain temporal changes and patterns in the spatial domain. Another visualization technique called "small multiples" uses repeated frames of a condition or chart, each capturing an increment moment in time, much like looking at sequence of frames from a film laid side by side. Each image must be interpreted separately, and side-by-side comparisons made, to detect differences. This technique is expensive in terms of visual space since an image must be generated for each moment of interest, which can be problematic when trying to simultaneously display multiple images of adequate size that contain complex data content.

A technique has been developed, as described in Interactive Visualization of Spatiotemporal Patterns using Spirals on a Geographical Map—by Hewagamage et al. that uses spiral shaped ribbons as timelines to show isolated sequences of events that have occurred at discrete locations on a geographical map. This technique is limited because it uses spiral timelines exclusively to show the periodic quality of certain types of events, while does not show connectivity between the temporal and spatial information of data objects at multi-locations within the spatial domain. Further, event data objects placed on the spirals can suffer from occlusion, thereby providing for only a limited number of events and locations viewable with the spiral timelines.

Further, there exists problems in simplifying or otherwise analyzing cluttered visualizations with respect to identifying relevant data elements associated with one another from non-associated data elements. Further, problems exist in changing the content of a visualization to assist the analyst in interpretation of identified data elements.

It is an object of the present invention to provide a system and method for the integrated, interactive visual representation of a plurality of data elements with spatial and temporal properties to obviate or mitigate at least some of the above-mentioned disadvantages.

SUMMARY OF THE INVENTION

Tracking and analyzing entities and streams of events, has traditionally been the domain of investigators, whether that be national intelligence analysts, police services or military intelligence. Business users also analyze events in time and location to better understand phenomenon such as customer behavior or transportation patterns. As data about events and objects become more commonly available, analyzing and understanding of interrelated temporal and spatial information is increasingly a concern for military commanders, intelligence analysts and business analysts.

There exists problems in simplifying or otherwise analyzing cluttered visualizations with respect to identifying relevant data elements associated with one another from non-associated data elements, in particular in environments with both temporal and spatial properties. Further, problems exist in changing the content of a visualization to assist the analyst in interpretation of identified data elements. Contrary to present visualization systems there is provided a system and method for analyzing a plurality of data elements having both temporal and spatial properties, where a first data element and a second data element of the plurality of data elements are linked by at least one association element. The system and method include selecting the first data element from the plurality of data elements and providing at least one search criteria for use in analyzing the properties of the plurality of data elements with respect to at least one property of the first data element. An analysis module is used to apply the at least one search criteria to the properties of the plurality of data elements for identifying the second data element from the plurality of data elements and the corresponding at least one association element. The at least one association element is configured for representing a connection between the first data element and the second data element, such that the connection has a first property common to a property of the first data element and a second property common to a property of the second data element. A visualization module is used to generate a visual representation of the first and second data elements and the association element configured for display on a user interface for subsequent interaction with user events. The visual representation includes a spatial domain including a reference surface for providing a spatial reference frame having at least two spatial dimensions and a temporal domain operatively coupled to the spatial domain for providing a common temporal reference frame for locations of interest in the spatial domain.

According to a first aspect there is provided a method for analysing a plurality of data elements having both temporal and spatial properties, a first data element and a second data element of the plurality of data elements linked by at least one association element, the method comprising the steps of: selecting the first data element from the plurality of data elements; providing at least one search criteria for use in analysing the properties of the plurality of data elements with respect to at least one property of the first data element; applying the at least one search criteria to the properties of the plurality of data elements for identifying the second data element from the plurality of data elements and the corresponding at least one association element, the at least one association element configured for representing a connection between the first data element and the second data element, the connection having a first property common to a property of the first data element and a second property common to a property of the second data element; and generating a visual representation of the first and second data elements and the association element configured for display on a user interface for subsequent interaction with user events, the visual representation including a spatial domain including a reference surface for providing a spatial reference frame having at least two spatial dimensions and including a temporal domain operatively coupled to the spatial domain for providing a common temporal reference frame for locations of interest in the spatial domain.

According to a second aspect there is provided a system for analysing a plurality of data elements having both temporal and spatial properties, a first data element and a second data element of the plurality of data elements linked by at least one association element, the system comprising: a user interface for selecting the first data element from the plurality of data elements and for providing at least one search criteria for use in analysing the properties of the plurality of data elements with respect to at least one property of the first data element; an analysis module configured for applying the at least one search criteria to the properties of the plurality of data elements for identifying the second data element from the plurality of data elements and the corresponding at least one association element, the at least one association element configured for representing a connection between the first data element and the second data element, the connection having a first property common to a property of the first data element and a second property common to a property of the second data element; and a visualization module configured for generating a visual representation of the first and second data elements and the association element configured for display on the user interface for subsequent interaction with user events, the visual representation including a spatial domain including a reference surface for providing a spatial reference frame having at least two spatial dimensions and including a temporal domain operatively coupled to the spatial domain for providing a common temporal reference frame for locations of interest in the spatial domain.

BRIEF DESCRIPTION OF THE DRAWINGS

A better understanding of these and other embodiments of the present invention can be obtained with reference to the following drawings and detailed description of the preferred embodiments, in which:

FIG. 6 shows example data objects and associations of FIG. 1;

FIG. 16 shows a further example operation of the tool of FIG. 3;

FIG. 27a shows a further embodiment of the tool of FIG. 3;

FIGS. 32a,b,c,d show example an embodiment of an analysis function of the tool of FIG. 27;

FIGS. 33a,b,c, show further example embodiments of the analysis function of the tool of FIG. 27;

DETAILED DESCRIPTION OF THE PREFERRED EMBODIMENT

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the Java computer programming language (or other computer programming languages in conjunction with C/C++). Any limitations presented would be a result of a particular type of operating system, computer programming language, or data processing system and would not be a limitation of the present invention.

Visualization Environment

Figure 1:
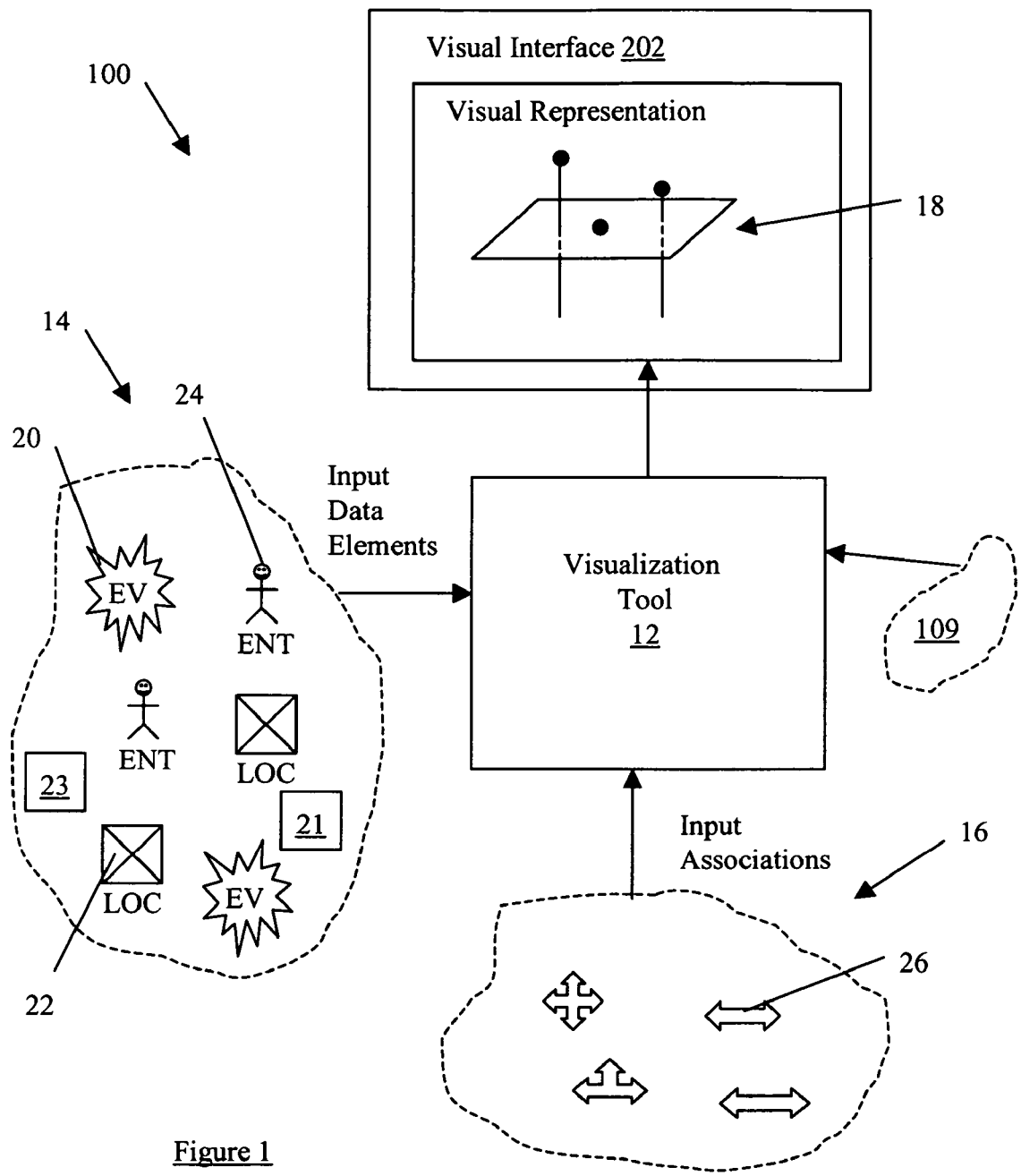
FIG. 1 is a block diagram of a data processing system for a visualization tool.

Referring to FIG. 1, a visualization data processing system 100 includes a visualization tool 12 for processing a collection of data objects 14 as input data elements to a user interface 202. The data objects 14 are combined with a respective set of associations 16 by the tool 12 to generate an interactive visual representation 18 on the visual interface (VI) 202. The data objects 14 include event objects 20, location objects 22, images 23 and entity objects 24, as further described below. The set of associations 16 include individual associations 26 that associate together various subsets of the objects 20, 22, 23, 24, as further described below. Management of the data objects 14 and set of associations 16 are driven by user events 109 of a user (not shown) via the user interface 108 (see FIG. 2) during interaction with the visual representation 18. The representation 18 shows connectivity between temporal and spatial information of data objects 14 at multi-locations within the spatial domain 400 (see FIG. 4).

Data Processing System

Figure 2:
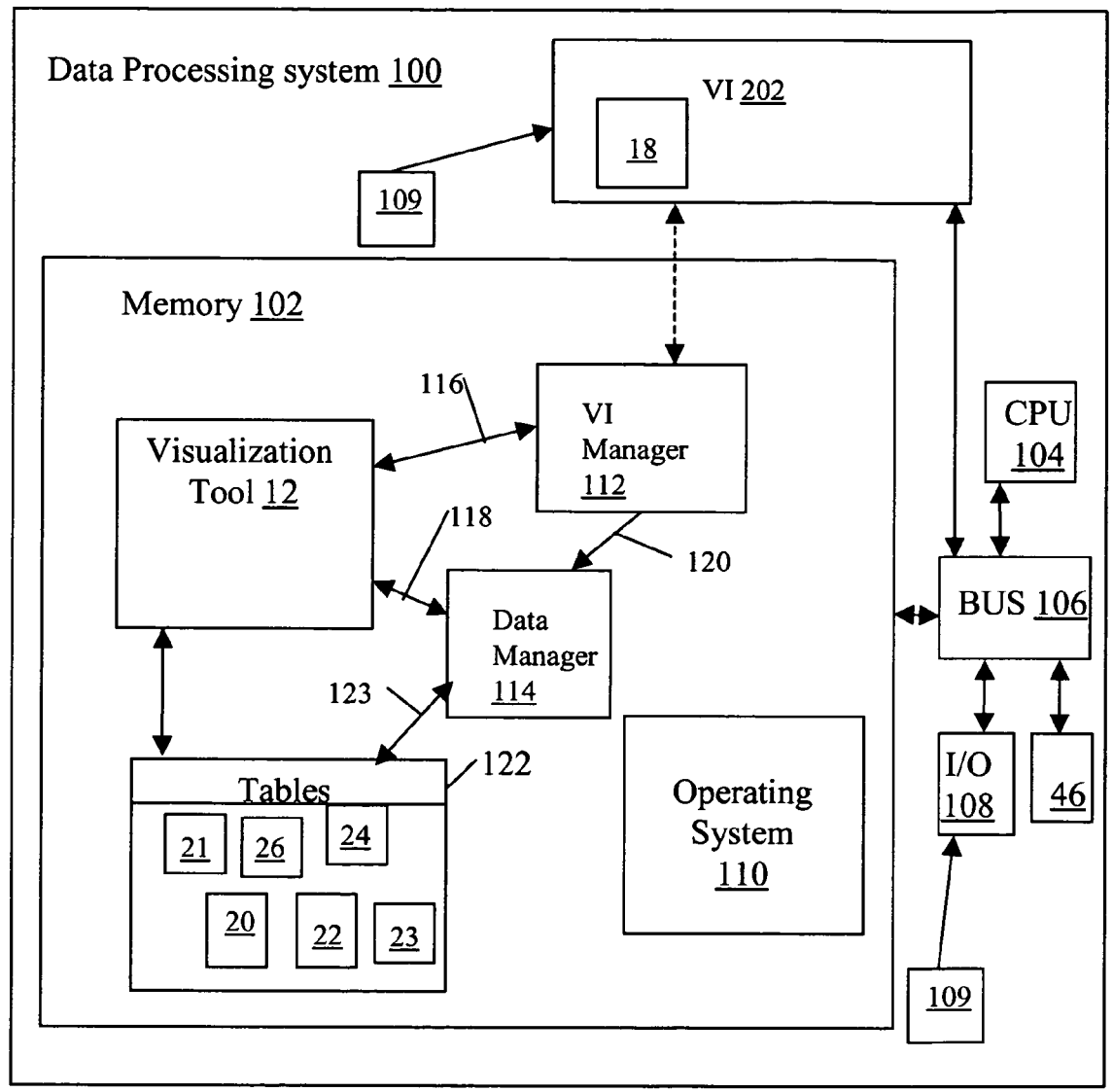
FIG. 2 shows further details of the data processing system of FIG. 1.

Referring to FIG. 2, the data processing system 100 has a user interface 108 for interacting with the tool 12, the user interface 108 being connected to a memory 102 via a BUS 106. The interface 108 is coupled to a processor 104 via the BUS 106, to interact with user events 109 to monitor or otherwise instruct the operation of the tool 12 via an operating system 110. The user interface 108 can include one or more user input devices such as but not limited to a QWERTY keyboard, a keypad, a trackwheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, the tool 12 interacts via link 116 with a VI manager 112 (also known as a visualization renderer) of the system 100 for presenting the visual representation 18 on the visual interface 202. The tool 12 also interacts via link 118 with a data manager 114 of the system 100 to coordinate management of the data objects 14 and association set 16 from data files or tables 122 of the memory 102. It is recognized that the objects 14 and association set 16 could be stored in the same or separate tables 122, as desired. The data manager 114 can receive requests for storing, retrieving, amending, or creating the objects 14 and association set 16 via the tool 12 and/or directly via link 120 from the VI manager 112, as driven by the user events 109 and/or independent operation of the tool 12. The data manager 114 manages the objects 14 and association set 16 via link 123 with the tables 122. Accordingly, the tool 12 and managers 112, 114 coordinate the processing of data objects 14, association set 16 and user events 109 with respect to the content of the screen representation 18 displayed in the visual interface 202.

Referring to FIGS. 1, 27, 27a, and 29, the tool 12 has an information module 712 for generating object information 714a,b,c,d for display by the visualization manager 300, in response to user manipulations via the I/O interface 108. The information module 712 has an identification module 750 for recognizing the object type (e.g. entity, event, location, association, etc.) of the selected object(s) 14 from the visualization representation 18. Once the object 14 type is determined, the identification module 750 uses a rule set 752 to determine the specified type and display format (e.g. text size/font/colour, images, icons, graphic objects, bounding box size and position on representation 18, etc.) 756 of object information 714a,b,c,d to be displayed on the visualization representation 18 with respect to the selected object(s) 14. The selected object(s) 14 and their specified type and display format of the object information 714a,b,c,d is supplied to an access module 753, which then accesses the tables 122 of the memory 102 for retrieving the object data 754 representing the desired object information 714a,b,c,d. The access module 753 can also be configured to supply the retrieved object data 754 and its corresponding display format 756 to the visualization manager 300 for effecting display on the visualization representation 18, shown by example in FIG. 29.

For example, when a mouse pointer 713 (or other user implemented trigger event—e.g. keyboard identification of selected object(s) 14) is held over the visual element 410,412 of the representation 18, some predefined information 714a, b,c,d is displayed about that selected visual element 410,412. The information module 712 is configured to display the type of information dependent upon whether the object is a place 22, target 24, elementary or compound event 20, for example. For example, when the place 22 type is selected, the displayed information 714a is formatted by the information module 712 to include such as but not limited to; Label (e.g. Rome), Attributes attached to the object (if any); and events associated with that place 22. For example, when the target 24/target trail 412 (see FIG. 17) type is selected, the displayed information 714b is formatted by the information module 712 to include such as but not limited to; Label, Attributes (if any), events associated with that target 24, as well as the target's icon (if one is associated with the target 24) is shown. For example, when an elementary event 20a type is selected, the displayed information 714c is formatted by the information module 712 to include such as but not limited to; Label, Class, Date, Type, Comment (including Attributes, if any), associated Targets 24 and Place 22. For example, when a compound event 20b type is selected, the displayed information 714d is formatted by the information module 712 to include such as but not limited to; Label, Class, Date, Type, Comment (including Attributes, if any) and all elementary event popup data for each child event. Accordingly, it is recognized that the information module 712 is configured to select data for display from the database tables 122 (see FIG. 2) appropriate to the type of visual element 410,412 selected by the user from the visual representation 18.

Tool Information Model

Referring to FIG. 1, a tool information model is composed of the four basic data elements (objects 20, 22, 23, 24 and associations 26) that can have corresponding display elements in the visual representation 18. The four elements are used by the tool 12 to describe interconnected activities and information in time and space as the integrated visual representation 18, as further described below.

Event Data Objects 20

Events are data objects 20 that represent any action that can be described. The following are examples of events;
 Bill was at Toms house at 3 pm,
 Tom phoned Bill on Thursday,
 A tree fell in the forest at 4:13 am, Jun. 3, 1993 and
 Tom will move to Spain in the summer of 2004.

The Event is related to a location and a time at which the action took place, as well as several data properties and display properties including such as but not limited to; a short text label, description, location, start-time, end-time, general event type, icon reference, visual layer settings, priority, status, user comment, certainty value, source of information, and default+user-set color. The event data object 20 can also reference files such as images or word documents.

Locations and times may be described with varying precision. For example, event times can be described as "during the week of January 5$^{th}$" or "in the month of September". Locations can be described as "Spain" or as "New York" or as a specific latitude and longitude.

Entity Data Objects 24

Entities are data objects 24 that represent any thing related to or involved in an event, including such as but not limited to; people, objects, organizations, equipment, businesses, observers, affiliations etc. Data included as part of the Entity data object 24 can be short text label, description, general entity type, icon reference, visual layer settings, priority, status, user comment, certainty value, source of information, and default+user-set color. The entity data can also reference files such as images or word documents. It is recognized in reference to FIGS. 6 and 7 that the term Entities includes "People", as well as equipment (e.g. vehicles), an entire organization (e.g. corporate entity), currency, and any other object that can be tracked for movement in the spatial domain 400. It is also recognized that the entities 24 could be stationary objects such as but not limited to buildings. Further, entities can be phone numbers and web sites. To be explicit, the entities 24 as given above by example only can be regarded as Actors Location Data Objects 22

Locations are data objects 22 that represent a place within a spatial context/domain, such as a geospatial map, a node in a diagram such as a flowchart, or even a conceptual place such as "Shang-ri-la" or other "locations" that cannot be placed at a specific physical location on a map or other spatial domain. Each Location data object 22 can store such as but not limited to; position coordinates, a label, description, color information, precision information, location type, non-geospatial flag and user comments.

Associations

Event 20, Location 22 and Entity 24 are combined into groups or subsets of the data objects 14 in the memory 102 (see FIG. 2) using associations 26 to describe real-world occurrences. The association is defined as an information object that describes a pairing between 2 data objects 14. For example, in order to show that a particular entity was present when an event occurred, the corresponding association 26 is created to represent that Entity X "was present at" Event A. For example, associations 26 can include such as but not limited to; describing a communication connection between two entities 24, describing a physical movement connection between two locations of an entity 24, and a relationship connection between a pair of entities 24 (e.g. family related and/or organizational related). It is recognised that the associations 26 can describe direct and indirect connections. Other examples can include phone numbers and web sites.

A variation of the association type 26 can be used to define a subclass of the groups 27 to represent user hypotheses. In other words, groups 27 can be created to represent a guess or hypothesis that an event occurred, that it occurred at a certain location or involved certain entities. Currently, the degree of belief/accuracy/evidence reliability can be modeled on a simple 1-2-3 scale and represented graphically with line quality on the visual representation 18.

Image Data Objects 23

Figure 20:
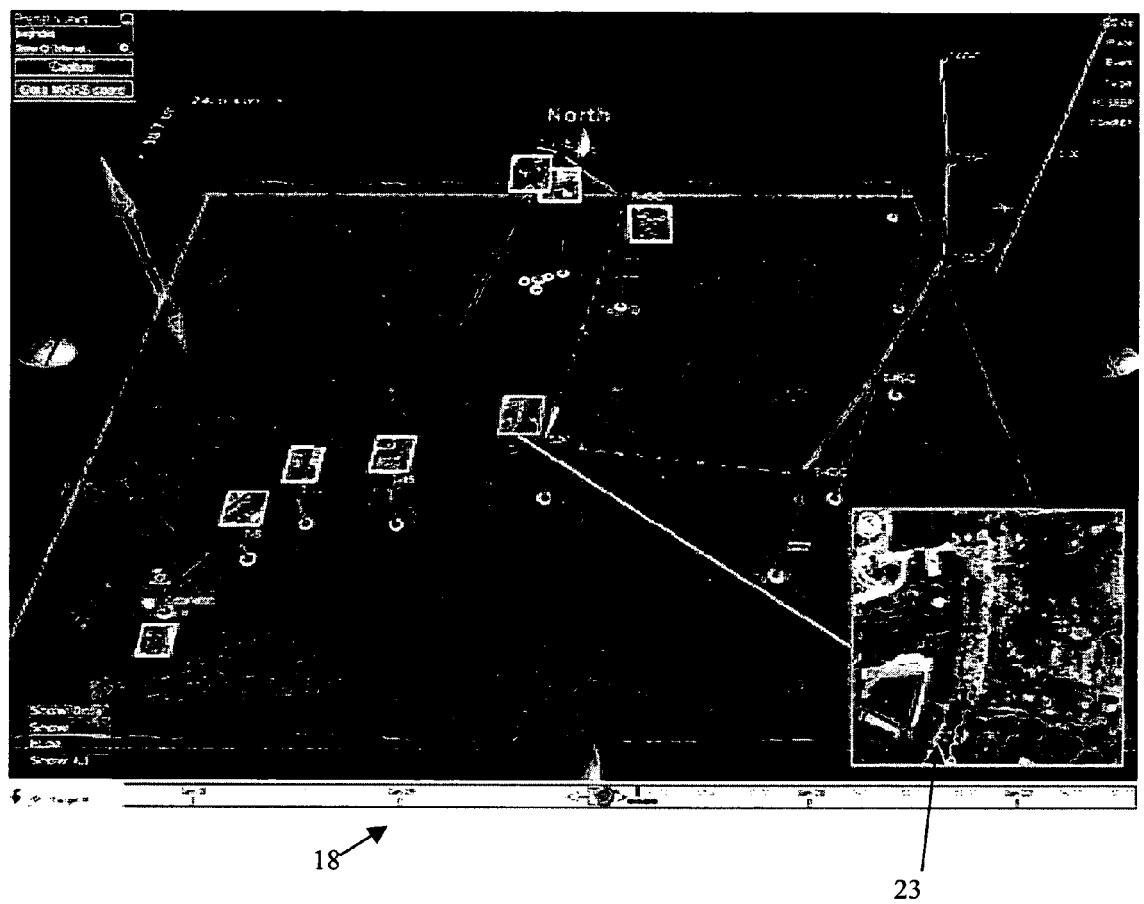
FIG. 20 is a further embodiment of FIG. 18 showing imagery.

Standard icons for data objects 14 as well as small images 23 for such as but not limited to objects 20,22,24 can be used to describe entities such as people, organizations and objects. Icons are also used to describe activities. These can be standard or tailored icons, or actual images of people, places, and/or actual objects (e.g. buildings). Imagery can be used as part of the event description. Images 23 can be viewed in all of the visual representation 18 contexts, as for example shown in FIGS. 20 and 21 which show the use of images 23 in the time lines 422 and the time chart 430 views. Sequences of images 23 can be animated to help the user detect changes in the image over time and space.

Annotations 21

Figure 21:
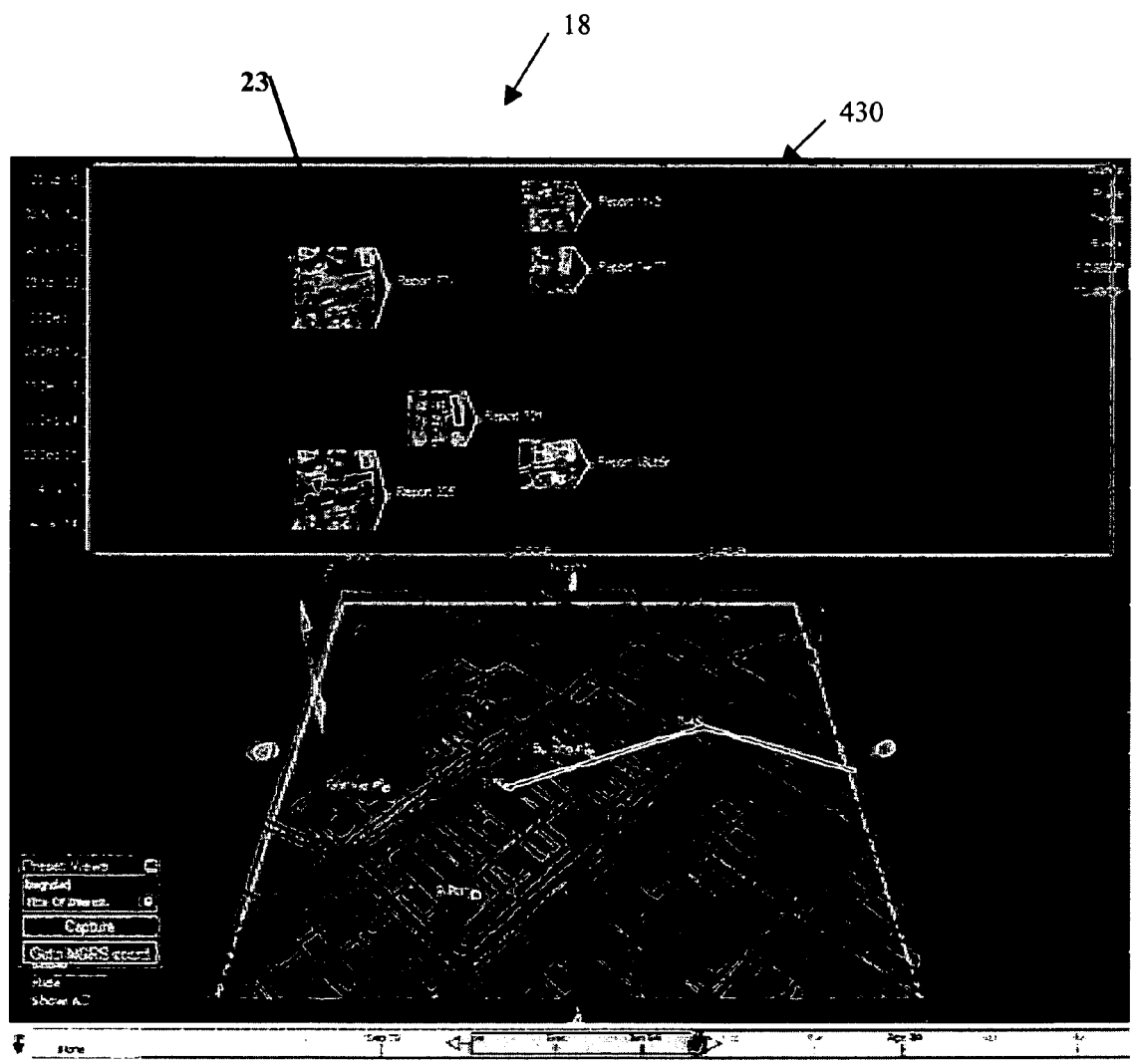
FIG. 21 is a further embodiment of FIG. 18 showing imagery in a time chart view.

Annotations 21 in Geography and Time (see FIG. 22) can be represented as manually placed lines or other shapes (e.g. pen/pencil strokes) can be placed on the visual representation 18 by an operator of the tool 12 and used to annotate elements of interest with such as but not limited to arrows, circles and freeform markings. Some examples are shown in FIG. 21. These annotations 21 are located in geography (e.g. spatial domain 400) and time (e.g. temporal domain 422) and so can appear and disappear on the visual representation 18 as geographic and time contexts are navigated through the user input events 109.

Visualization Tool 12

Figure 3:
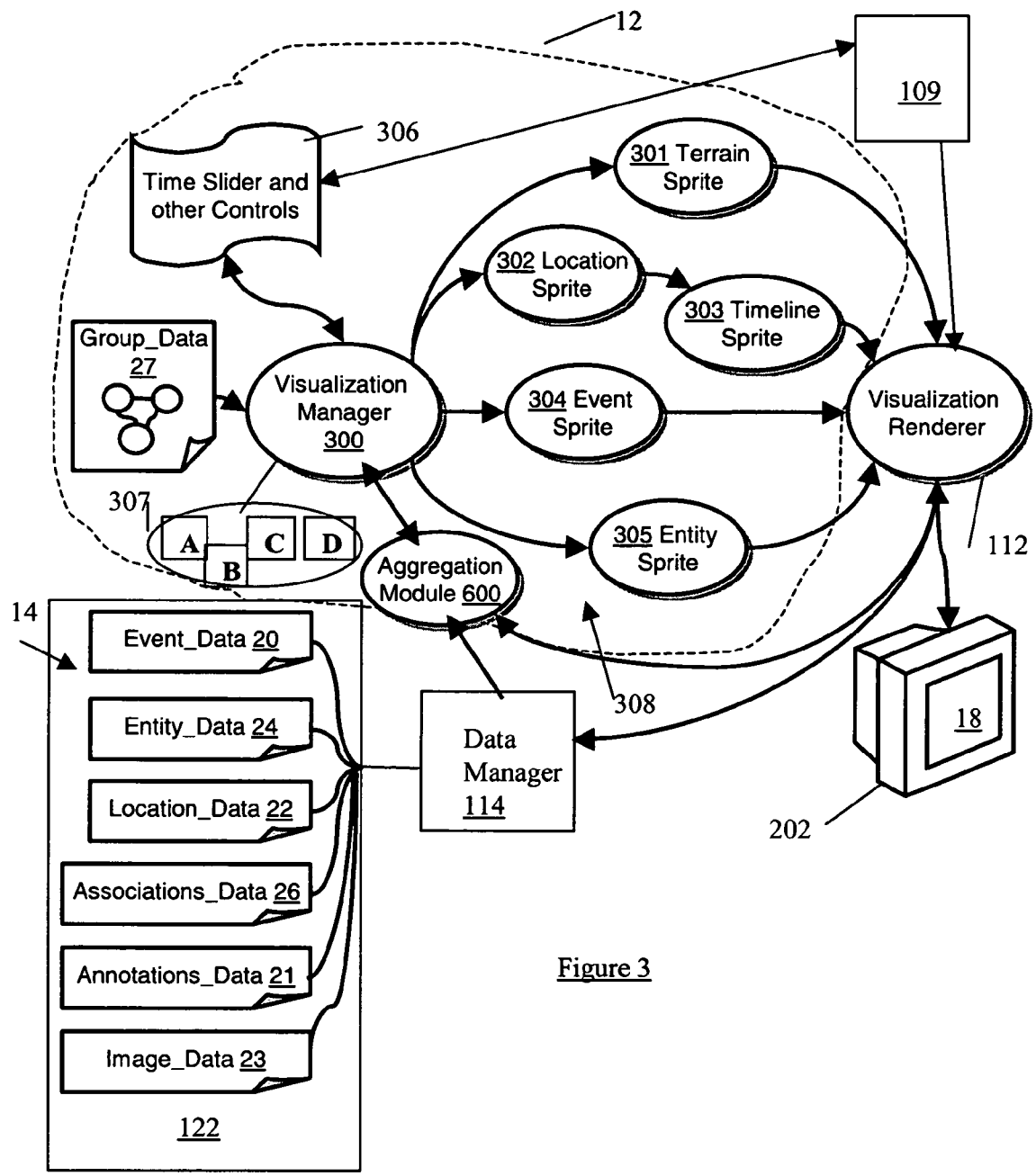
FIG. 3 shows further details of the visualization tool of FIG. 1.

Referring to FIG. 3, the visualization tool 12 has a visualization manager 300 for interacting with the data objects 14 for presentation to the interface 202 via the VI manager 112. The Data Objects 14 are formed into groups 27 through the associations 26 and processed by the Visualization Manager 300. The groups 27 comprise selected subsets of the objects 20, 21, 22, 23, 24 combined via selected associations 26. This combination of data objects 14 and association sets 16 can be accomplished through predefined groups 27 added to the tables 122 and/or through the user events 109 during interaction of the user directly with selected data objects 14 and association sets 16 via the controls 306. It is recognized that the predefined groups 27 could be loaded into the memory 102 (and tables 122) via the computer readable medium 46 (see FIG. 2). The Visualization manager 300 also processes user event 109 input through interaction with a time slider and other controls 306, including several interactive controls for supporting navigation and analysis of information within the visual representation 18 (see FIG. 1) such as but not limited to data interactions of selection, filtering, hide/show and grouping as further described below. Use of the groups 27 is such that subsets of the objects 14 can be selected and grouped through associations 26. In this way, the user of the tool 12 can organize observations into related stories or story fragments. These groupings 27 can be named with a label and visibility controls, which provide for selected display of the groups 27 on the representation 18, e.g. the groups 27 can be turned on and off with respect to display to the user of the tool 12.

The Visualization Manager 300 processes the translation from raw data objects 14 to the visual representation 18. First, Data Objects 14 and associations 16 can be formed by the Visualization Manager 300 into the groups 27, as noted in the tables 122, and then processed. The Visualization Manager 300 matches the raw data objects 14 and associations 16 with sprites 308 (i.e. visual processing objects/components that know how to draw and render visual elements for specified data objects 14 and associations 16) and sets a drawing sequence for implementation by the VI manager 112. The sprites 308 are visualization components that take predetermined information schema as input and output graphical elements such as lines, text, images and icons to the computers graphics system. Entity 24, event 20 and location 22 data objects each can have a specialized sprite 308 type designed to represent them. A new sprite instance is created for each entity, event and location instance to manage their representation in the visual representation 18 on the display.

The sprites 308 are processed in order by the visualization manager 300, starting with the spatial domain (terrain) context and locations, followed by Events and Timelines, and finally Entities. Timelines are generated and Events positioned along them. Entities are rendered last by the sprites 308 since the entities depend on Event positions. It is recognised that processing order of the sprites 308 can be other than as described above.

The Visualization manager 112 renders the sprites 308 to create the final image including visual elements representing the data objects 14 and associates 16 of the groups 27, for display as the visual representation 18 on the interface 202. After the visual representation 18 is on the interface 202, the user event 109 inputs flow into the Visualization Manager, through the VI manager 112 and cause the visual representation 18 to be updated. The Visualization Manager 300 can be optimized to update only those sprites 308 that have changed in order to maximize interactive performance between the user and the interface 202.

Layout of the Visualization Representation 18

Figure 4:
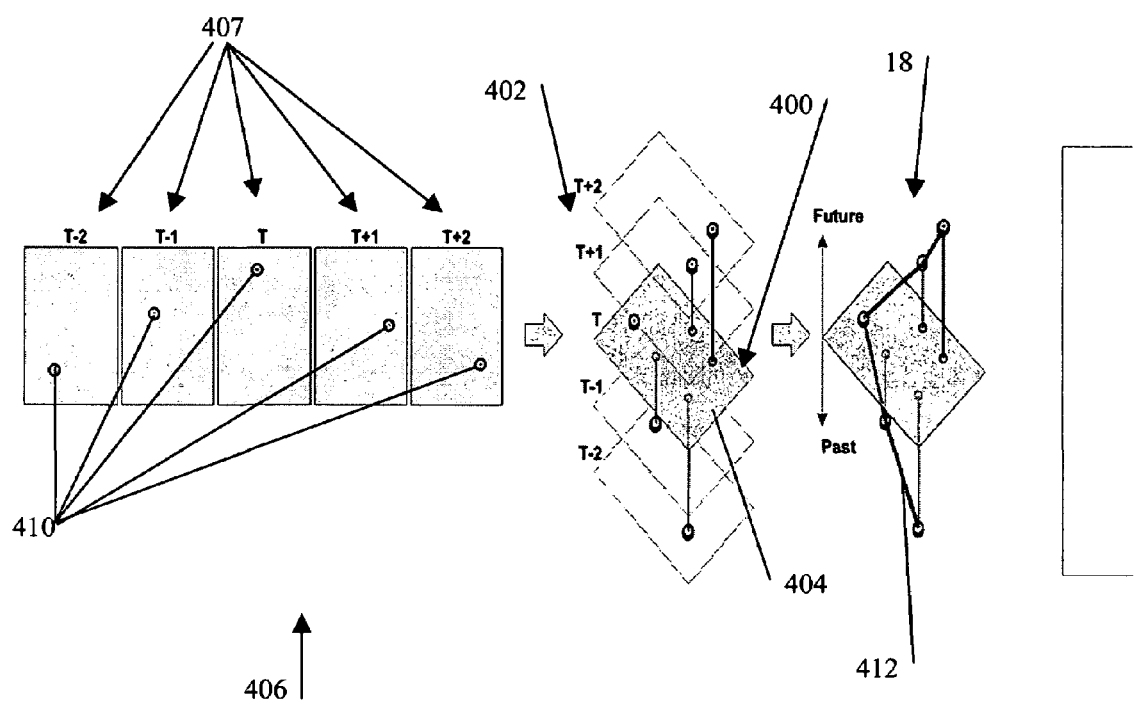
FIG. 4 shows further details of a visualization representation for display on a visualization interface of the system of FIG. 1.

The visualization technique of the visualization tool 12 is designed to improve perception of entity activities, movements and relationships as they change over time in a concurrent time-geographic or time-diagrammatical context. The visual representation 18 of the data objects 14 and associations 16 consists of a combined temporal-spatial display to show interconnecting streams of events over a range of time on a map or other schematic diagram space, both hereafter referred to in common as a spatial domain 400 (see FIG. 4). Events can be represented within an X,Y,T coordinate space, in which the X,Y plane shows the spatial domain 400 (e.g. geographic space) and the Z-axis represents a time series into the future and past, referred to as a temporal domain 402. In addition to providing the spatial context, a reference surface (or reference spatial domain) 404 marks an instant of focus between before and after, such that events "occur" when they meet the surface of the ground reference surface 404. FIG. 4 shows how the visualization manager 300 (see FIG. 3) combines individual frames 406 (spatial domains 400 taken at different times Ti 407) of event/entity/location visual elements 410, which are translated into a continuous integrated spatial and temporal visual representation 18. It should be noted connection visual elements 412 can represent presumed location (interpolated) of Entity between the discrete event/entity/location represented by the visual elements 410. Another interpretation for connections elements 412 could be signifying communications between different Entities at different locations, which are related to the same event as further described below.

Figure 5:
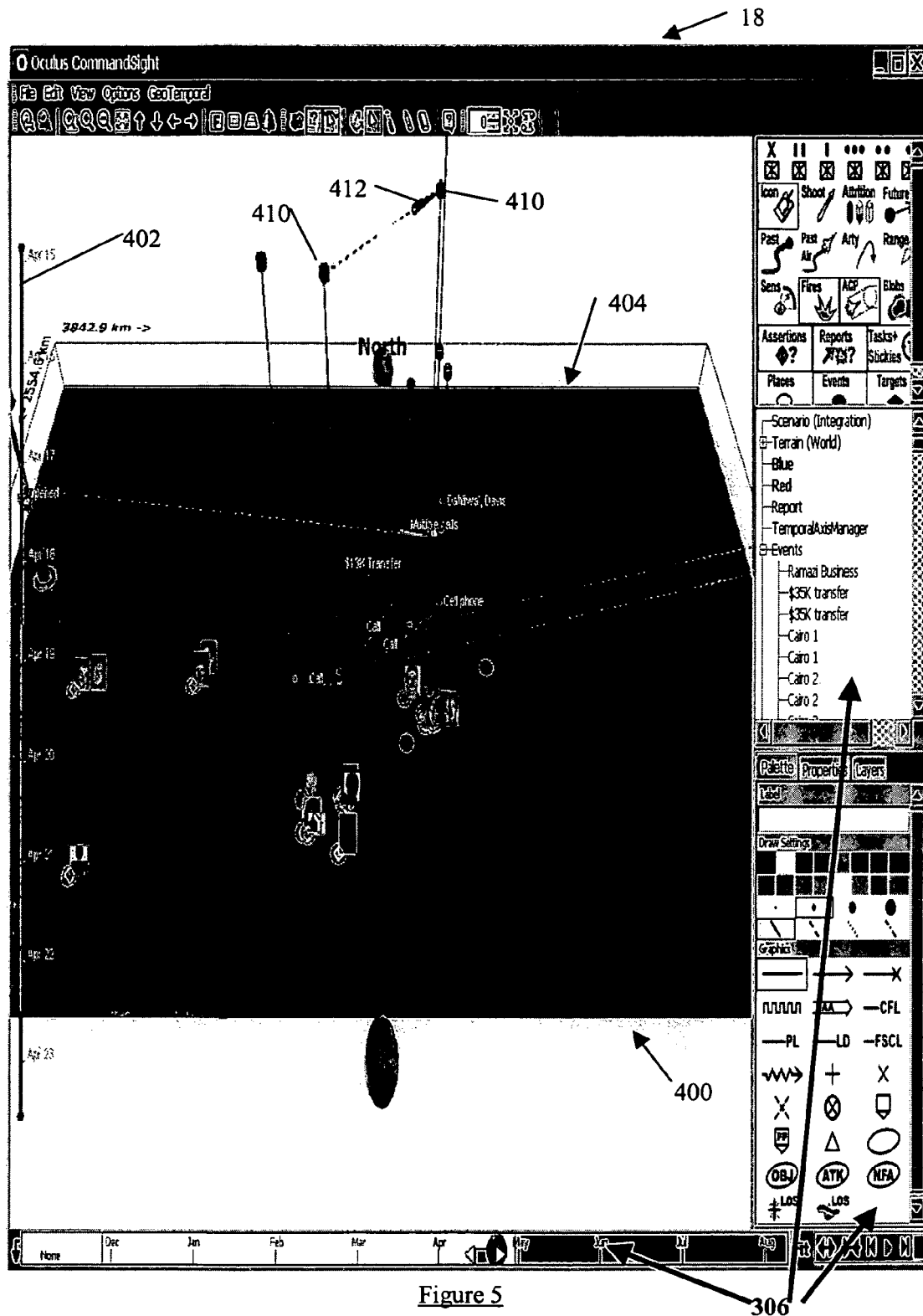
FIG. 5 is an example visualization representation of FIG. 1 showing Events in Concurrent Time and Space.

Referring to FIG. 5, an example visual representation 18 visually depicts events over time and space in an x, y, t space (or x, y, z, t space with elevation data). The example visual representation 18 generated by the tool 12 (see FIG. 2) is shown having the time domain 402 as days in April, and the spatial domain 400 as a geographical map providing the instant of focus (of the reference surface 404) as sometime around noon on April 23—the intersection point between the timelines 422 and the reference surface 404 represents the instant of focus. The visualization representation 18 represents the temporal 402, spatial 400 and connectivity elements 412 (between two visual elements 410) of information within a single integrated picture on the interface 202 (see FIG. 1). Further, the tool 12 provides an interactive analysis tool for the user with interface controls 306 to navigate the temporal, spatial and connectivity dimensions. The tool 12 is suited to the interpretation of any information in which time, location and connectivity are key dimensions that are interpreted together. The visual representation 18 is used as a visualization technique for displaying and tracking events, people, and equipment within the combined temporal and spatial domains 402, 400 display. Tracking and analyzing entities 24 and streams has traditionally been the domain of investigators, whether that be police services or military intelligence. In addition, business users also analyze events 20 in time and spatial domains 400, 402 to better understand phenomenon such as customer behavior or transportation patterns. The visualization tool 12 can be applied for both reporting and analysis.

The visual representation 18 can be applied as an analyst workspace for exploration, deep analysis and presentation for such as but not limited to:

Situations involving people and organizations that interact over time and in which geography or territory plays a role;

Storing and reviewing activity reports over a given period. Used in this way the representation 18 could provide a means to determine a living history, context and lessons learned from past events; and As an analysis and presentation tool for long term tracking and surveillance of persons and equipment activities.

The visualization tool 12 provides the visualization representation 18 as an interactive display, such that the users (e.g. intelligence analysts, business marketing analysts) can view, and work with, large numbers of events. Further, perceived patterns, anomalies and connections can be explored and subsets of events can be grouped into "story" or hypothesis fragments. The visualization tool 12 includes a variety of capabilities such as but not limited to:

An event-based information architecture with places, events, entities (e.g. people) and relationships;

Past and future time visibility and animation controls;

Data input wizards for describing single events and for loading many events from a table;

Entity and event connectivity analysis in time and geography;

Path displays in time and geography;

Configurable workspaces allowing ad hoc, drag and drop arrangements of events;

Search, filter and drill down tools;

Creation of sub-groups and overlays by selecting events and dragging them into sets (along with associated spatial/time scope properties); and Adaptable display functions including dynamic show/hide controls.

Example Objects 14 with Associations 16

In the visualization tool 12, specific combinations of associated data elements (objects 20, 22, 24 and associations 26) can be defined. These defined groups 27 are represented visually as visual elements 410 in specific ways to express various types of occurrences in the visual representation 18. The following are examples of how the groups 27 of associated data elements can be formed to express specific occurrences and relationships shown as the connection visual elements 412.

Figure 7:
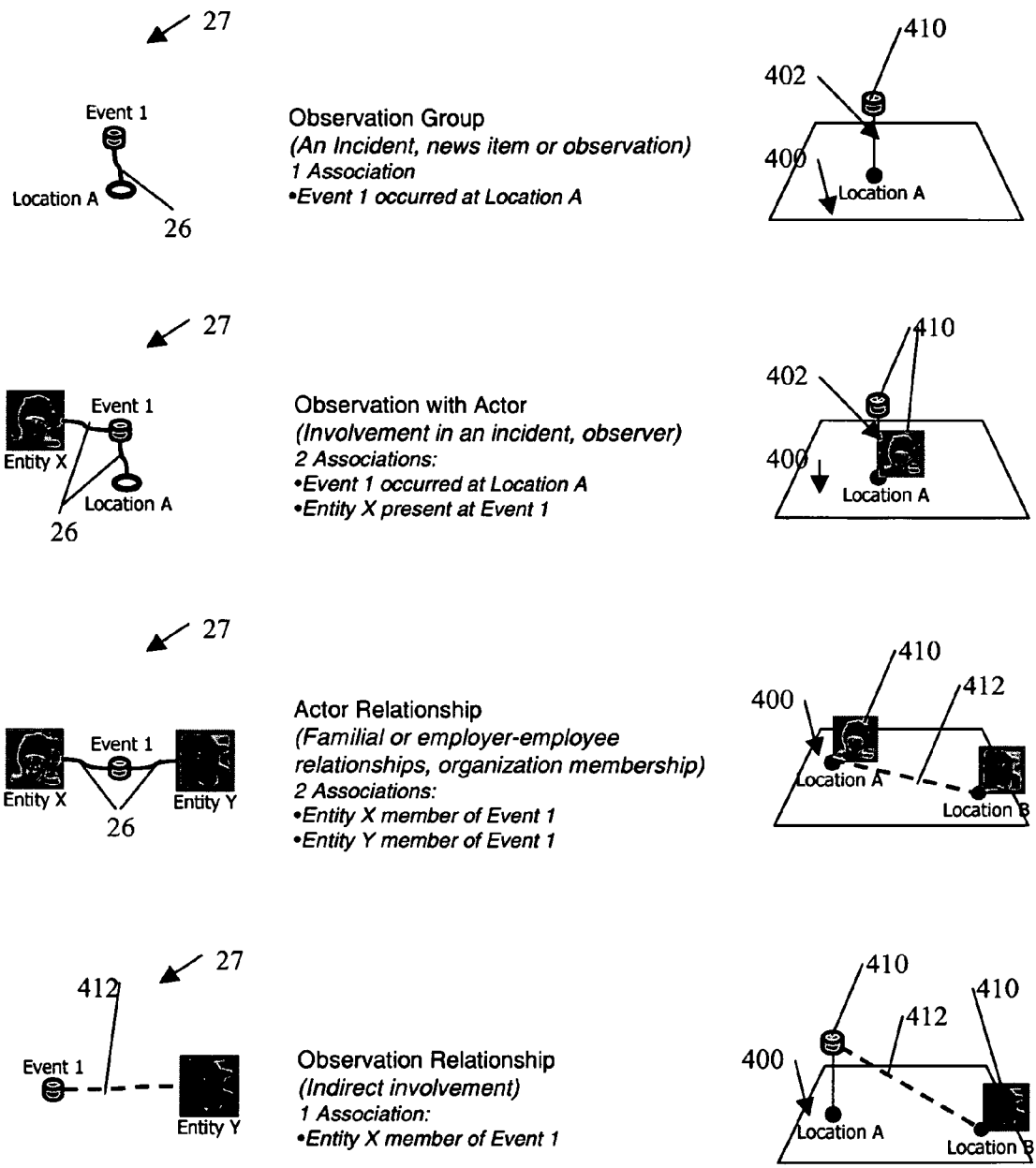
FIG. 7 shows further example data objects and associations of FIG. 1.

Referring to FIGS. 6 and 7, example groups 27 (denoting common real world occurrences) are shown with selected subsets of the objects 20, 22, 24 combined via selected associations 26. The corresponding visualization representation 18 is shown as well including the temporal domain 402, the spatial domain 400, connection visual elements 412 and the visual elements 410 representing the event/entity/location combinations. It is noted that example applications of the groups 27 are such as but not limited to those shown in FIGS. 6 and 7. In the FIGS. 6 and 7 it is noted that event objects 20 are labeled as "Event 1", "Event 2", location objects 22 are labeled as "Location A", "Location B", and entity objects 24 are labeled as "Entity X", "Entity Y". The set of associations 16 are labeled as individual associations 26 with connections labeled as either solid or dotted lines 412 between two events, or dotted in the case of an indirect connection between two locations.

Visual Elements Corresponding to Spatial and Temporal Domains

The visual elements 410 and 412, their variations and behavior facilitate interpretation of the concurrent display of events in the time 402 and space 400 domains. In general, events reference the location at which they occur and a list of Entities and their role in the event. The time at which the event occurred or the time span over which the event occurred are stored as parameters of the event.

Spatial Domain Representation

Figure 8:
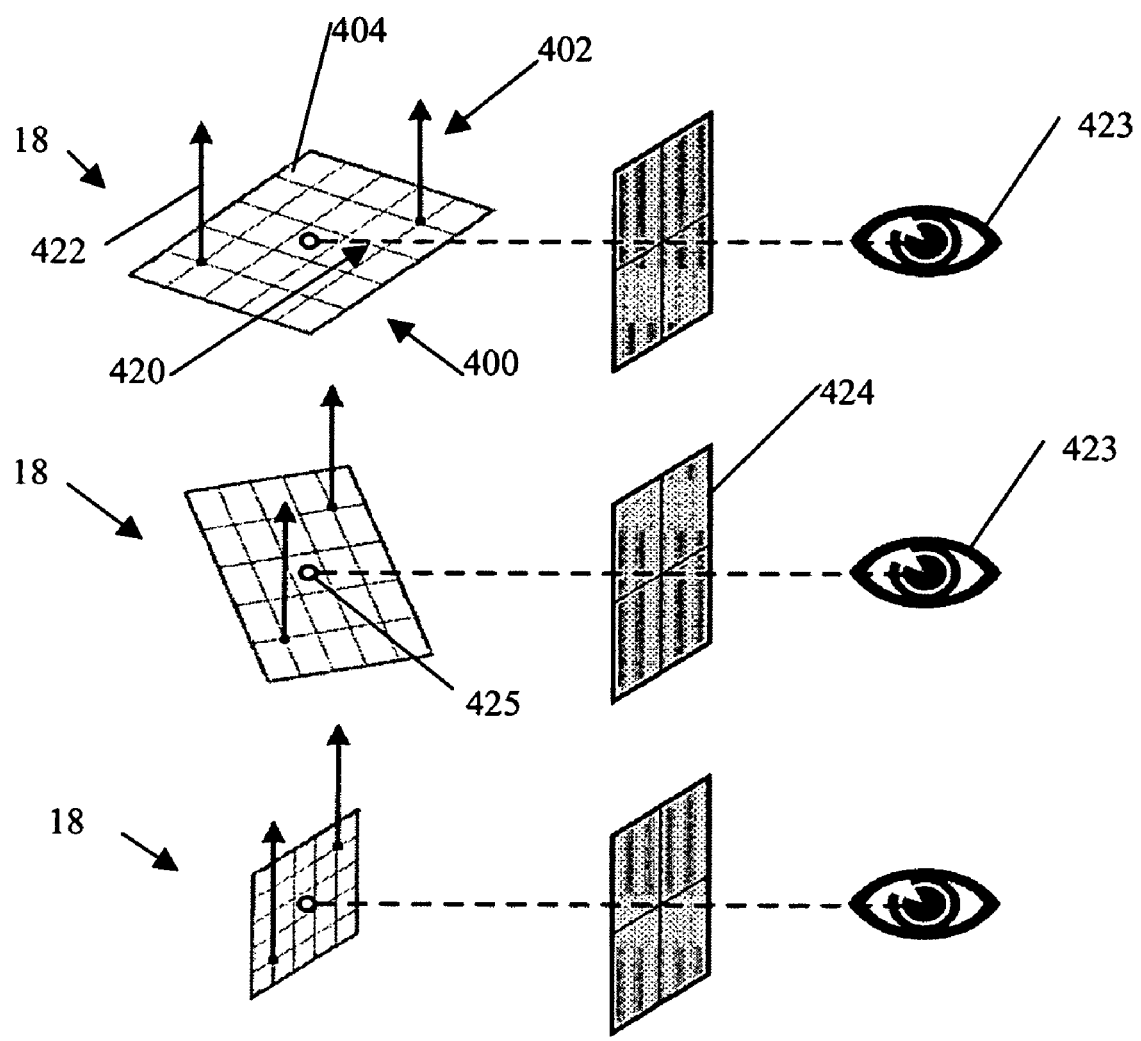
FIG. 8 shows changes in orientation of a reference surface of the visualization representation of FIG. 1.

Referring to FIG. 8, the primary organizing element of the visualization representation 18 is the 2D/3D spatial reference frame (subsequently included herein with reference to the spatial domain 400). The spatial domain 400 consists of a true 2D/3D graphics reference surface 404 in which a 2D or 3 dimensional representation of an area is shown. This spatial domain 400 can be manipulated using a pointer device (not shown—part of the controls 306—see FIG. 3) by the user of the interface 108 (see FIG. 2) to rotate the reference surface 404 with respect to a viewpoint 420 or viewing ray extending from a viewer 423. The user (i.e. viewer 423) can also navigate the reference surface 404 by scrolling in any direction, zooming in or out of an area and selecting specific areas of focus. In this way the user can specify the spatial dimensions of an area of interest the reference surface 404 in which to view events in time. The spatial domain 400 represents space essentially as a plane (e.g. reference surface 404), however is capable of representing 3 dimensional relief within that plane in order to express geographical features involving elevation. The spatial domain 400 can be made transparent so that timelines 422 of the temporal domain 402 can extend behind the reference surface 404 are still visible to the user. FIG. 8 shows how the viewer 423 facing timelines 422 can rotate to face the viewpoint 420 no matter how the reference surface 404 is rotated in 3 dimensions with respect to the viewpoint 420.

The spatial domain 400 includes visual elements 410, 412 (see FIG. 4) that can represent such as but not limited to map information, digital elevation data, diagrams, and images used as the spatial context. These types of spaces can also be combined into a workspace. The user can also create diagrams using drawing tools (of the controls 306—see FIG. 3) provided by the visualization tool 12 to create custom diagrams and annotations within the spatial domain 400.

Event Representation and Interactions

Referring to FIGS. 4 and 8, events are represented by a glyph, or icon as the visual element 410, placed along the timeline 422 at the point in time that the event occurred. The glyph can be actually a group of graphical objects, or layers, each of which expresses the content of the event data object 20 (see FIG. 1) in a different way. Each layer can be toggled and adjusted by the user on a per event basis, in groups or across all event instances. The graphical objects or layers for event visual elements 410 are such as but not limited to:

1. Text label

The Text label is a text graphic meant to contain a short description of the event content. This text always faces the viewer 423 no matter how the reference surface 404 is oriented. The text label incorporates a de-cluttering function that separates it from other labels if they overlap. When two events are connected with a line (see connections 412 below) the label will be positioned at the midpoint of the connection line between the events. The label will be positioned at the end of a connection line that is clipped at the edge of the display area.

2. Indicator—Cylinder, Cube or Sphere

The indicator marks the position in time. The color of the indicator can be manually set by the user in an event properties dialog. Color of event can also be set to match the Entity that is associated with it. The shape of the event can be changed to represent different aspect of information and can be set by the user. Typically it is used to represent a dimension such as type of event or level of importance.

3. Icon

An icon or image can also be displayed at the event location. This icon/image 23 may used to describe some aspect of the content of the event. This icon/image 23 may be user-specified or entered as part of a data file of the tables 122 (see FIG. 2).

4. Connection elements 412

Connection elements 412 can be lines, or other geometrical curves, which are solid or dashed lines that show connections from an event to another event, place or target. A connection element 412 may have a pointer or arrowhead at one end to indicate a direction of movement, polarity, sequence or other vector-like property. If the connected object is outside of the display area, the connection element 412 can be coupled at the edge of the reference surface 404 and the event label will be positioned at the clipped end of the connection element 412.

5. Time Range Indicator

A Time Range Indicator (not shown) appears if an event occurs over a range of time. The time range can be shown as a line parallel to the timeline 422 with ticks at the end points. The event Indicator (see above) preferably always appears at the start time of the event.

The Event visual element 410 can also be sensitive to interaction. The following user events 109 via the user interface 108 (see FIG. 2) are possible, such as but not limited to:

Mouse-Left-Click:
Selects the visual element 410 of the visualization representation 18 on the VI 202 (see FIG. 2) and highlights it, as well as simultaneously deselecting any previously selected visual element 410, as desired.

Ctrl-Mouse-Left-Click and Shift-Mouse-Left-Click
Adds the visual element 410 to an existing selection set.

Mouse-Left-Double-Click:
Opens a file specified in an event data parameter if it exists. The file will be opened in a system-specified default application window on the interface 202 based on its file type.

Mouse-Right-Click:
Displays an in-context popup menu with options to hide, delete and set properties.

Mouse over Drilldown:
When the mouse pointer (not shown) is placed over the indicator, a text window is displayed next to the pointer, showing information about the visual element 410. When the mouse pointer is moved away from the indicator, the text window disappears.

Location Representation

Locations are visual elements 410 represented by a glyph, or icon, placed on the reference surface 404 at the position specified by the coordinates in the corresponding location data object 22 (see FIG. 1). The glyph can be a group of graphical objects, or layers, each of which expresses the content of the location data object 22 in a different way. Each layer can be toggled and adjusted by the user on a per Location basis, in groups or across all instances. The visual elements 410 (e.g. graphical objects or layers) for Locations are such as but not limited to:

1. Text Label

The Text label is a graphic object for displaying the name of the location. This text always faces the viewer 422 no matter how the reference surface 404 is oriented. The text label incorporates a de-cluttering function that separates it from other labels if they overlap.

2. Indicator

The indicator is an outlined shape that marks the position or approximate position of the Location data object 22 on the reference surface 404. There are, such as but not limited to, 7 shapes that can be selected for the locations visual elements 410 (marker) and the shape can be filled or empty. The outline thickness can also be adjusted. The default setting can be a circle and can indicate spatial precision with size. For example, more precise locations, such as addresses, are smaller and have thicker line width, whereas a less precise location is larger in diameter, but uses a thin line width.

The Location visual elements 410 are also sensitive to interaction. The following interactions are possible:

Mouse-Left-Click:
Selects the location visual element 410 and highlights it, while deselecting any previously selected location visual elements 410.

Ctrl-Mouse-Left-Click and Shift-Mouse-Left-Click
Adds the location visual element 410 to an existing selection set.

Mouse-Left-Double-Click:
Opens a file specified in a Location data parameter if it exists. The file will be opened in a system-specified default application window based on its file type.

Mouse-Right-Click:
Displays an in-context popup menu with options to hide, delete and set properties of the location visual element 410.

Mouseover Drilldown:
When the Mouse pointer is placed over the location indicator, a text window showing information about the location visual element 410 is displayed next to the pointer. When the mouse pointer is moved away from the indicator, the text window disappears.

Mouse-Left-Click-Hold-and-Drag:
Interactively repositions the location visual element 410 by dragging it across the reference surface 404.

Non-Spatial Locations

Locations 22 have the ability to represent indeterminate position. These are referred to as non-spatial locations 22. Locations 22 tagged as non-spatial can be displayed at the edge of the reference surface 404 just outside of the spatial context of the spatial domain 400. These non-spatial or virtual locations 22 can be always visible no matter where the user is currently zoomed in on the reference surface 404. Events and Timelines 422 that are associated with non-spatial Locations 22 can be rendered the same way as Events with spatial Locations 22.

Further, it is recognized that spatial locations 22 can represent actual, physical places, such that if the latitude/longitude is known the location 22 appears at that position on the map or if the latitude/longitude is unknown the location 22 appears on the bottom corner of the map (for example). Further, it is recognized that non-spatial locations 22 can represent places with no real physical location and can always appear off the right side of map (for example). For events 20, if the location 22 of the event 20 is known, the location 22 appears at that position on the map. However, if the location 22 is unknown, the location 22 can appear halfway (for example) between the geographical positions of the adjacent event locations 22 (e.g. part of target tracking).

Entity Representation

Entity visual elements 410 are represented by a glyph, or icon, and can be positioned on the reference surface 404 or other area of the spatial domain 400, based on associated Event data that specifies its position at the current Moment of Interest 900 (see FIG. 9) (i.e. specific point on the timeline 422 that intersects the reference surface 404). If the current Moment of Interest 900 lies between 2 events in time that specify different positions, the Entity position will be interpolated between the 2 positions. Alternatively, the Entity could be positioned at the most recent known location on the reference surface 404. The Entity glyph is actually a group of the entity visual elements 410 (e.g. graphical objects, or layers) each of which expresses the content of the event data object 20 in a different way. Each layer can be toggled and adjusted by the user on a per event basis, in groups or across all event instances. The entity visual elements 410 are such as but not limited to:

1. Text Label

The Text label is a graphic object for displaying the name of the Entity. This text always faces the viewer no matter how the reference surface 404 is oriented. The text label incorporates a de-cluttering function that separates it from other labels if they overlap.

2. Indicator

The indicator is a point showing the interpolated or real position of the Entity in the spatial context of the reference surface 404. The indicator assumes the color specified as an Entity color in the Entity data model.

3. Image Icon

An icon or image is displayed at the Entity location. This icon may used to represent the identity of the Entity. The displayed image can be user-specified or entered as part of a data file. The Image Icon can have an outline border that assumes the color specified as the Entity color in the Entity data model. The Image Icon incorporates a de-cluttering function that separates it from other Entity Image Icons if they overlap.

4. Past Trail

The Past Trail is the connection visual element 412, as a series of connected lines that trace previous known positions of the Entity over time, starting from the current Moment of Interest 900 and working backwards into past time of the timeline 422. Previous positions are defined as Events where the Entity was known to be located. The Past Trail can mark the path of the Entity over time and space simultaneously.

5. Future Trail

The Future Trail is the connection visual element 412, as a series of connected lines that trace future known positions of the Entity over time, starting from the current Moment of Interest 900 and working forwards into future time. Future positions are defined as Events where the Entity is known to be located. The Future Trail can mark the future path of the Entity over time and space simultaneously.

The Entity representation is also sensitive to interaction. The following interactions are possible, such as but not limited to:

Mouse-Left-Click:

Selects the entity visual element 410 and highlights it and deselects any previously selected entity visual element 410.

Ctrl-Mouse-Left-Click and Shift-Mouse-Left-Click

Adds the entity visual element 410 to an existing selection set

Mouse-Left-Double-Click:

Opens the file specified in an Entity data parameter if it exists. The file will be opened in a system-specified default application window based on its file type.

Mouse-Right-Click:

Displays an in-context popup menu with options to hide, delete and set properties of the entity visual element 410.

Mouseover Drilldown:

When the Mouse pointer is placed over the indicator, a text window showing information about the entity visual element 410 is displayed next to the pointer. When the mouse pointer is moved away from the indicator, the text window disappears.

Temporal Domain Including Timelines

Figure 9:
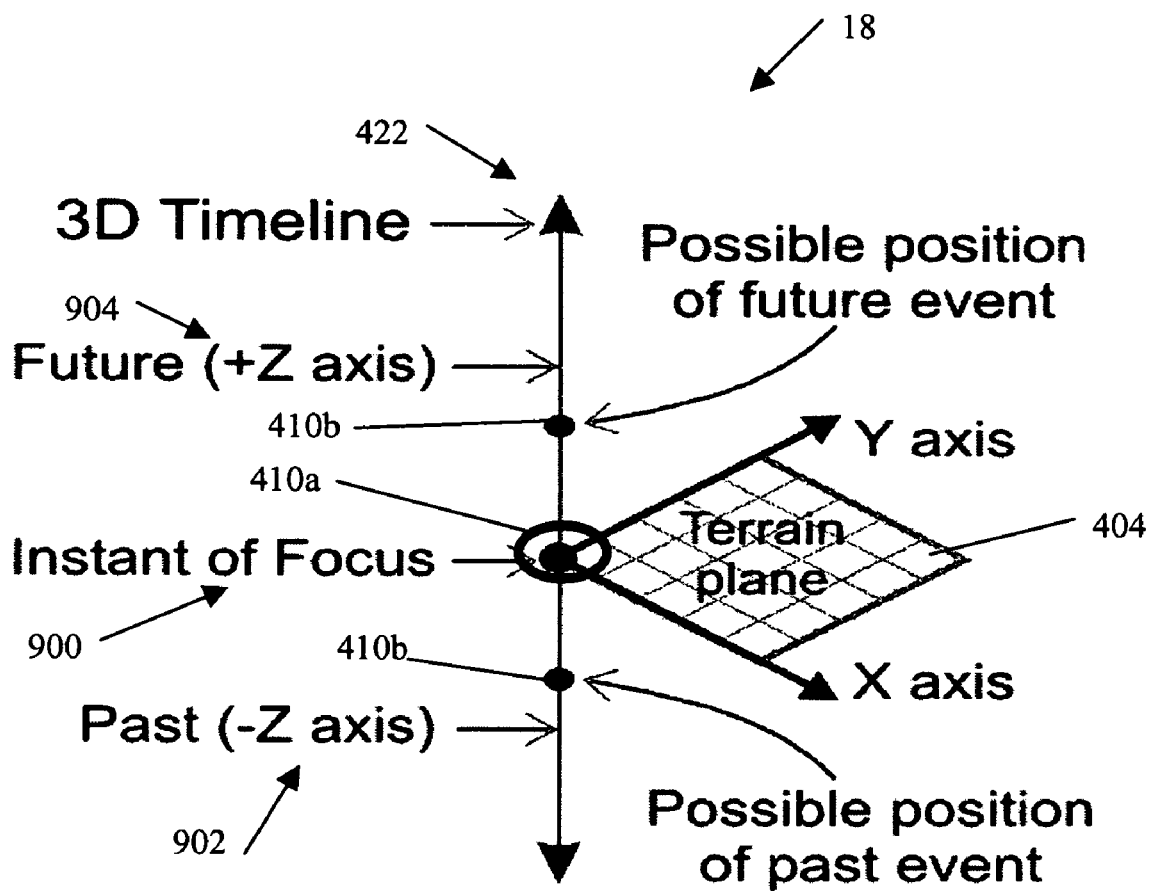
FIG. 9 is an example timeline of FIG. 8.

Referring to FIGS. 8 and 9, the temporal domain provides a common temporal reference frame for the spatial domain 400, whereby the domains 400, 402 are operatively coupled to one another to simultaneously reflect changes in interconnected spatial and temporal properties of the data elements 14 and associations 16. Timelines 422 (otherwise known as time tracks) represent a distribution of the temporal domain 402 over the spatial domain 400, and are a primary organizing element of information in the visualization representation 18 that make it possible to display events across time within the single spatial display on the VI 202 (see FIG. 1). Timelines 422 represent a stream of time through a particular Location visual element 410a positioned on the reference surface 404 and can be represented as a literal line in space. Other options for representing the timelines/time tracks 422 are such as but not limited to curved geometrical shapes (e.g. spirals) including 2D and 3D curves when combining two or more parameters in conjunction with the temporal dimension. Each unique Location of interest (represented by the location visual element 410a) has one Timeline 422 that passes through it. Events (represented by event visual elements 410b) that occur at that Location are arranged along this timeline 422 according to the exact time or range of time at which the event occurred. In this way multiple events (represented by respective event visual elements 410b) can be arranged along the timeline 422 and the sequence made visually apparent. A single spatial view will have as many timelines 422 as necessary to show every Event at every location within the current spatial and temporal scope, as defined in the spatial 400 and temporal 402 domains (see FIG. 4) selected by the user. In order to make comparisons between events and sequences of event between locations, the time range represented by multiple timelines 422 projecting through the reference surface 404 at different spatial locations is synchronized. In other words the time scale is the same across all timelines 422 in the time domain 402 of the visual representation 18. Therefore, it is recognised that the timelines 422 are used in the visual representation 18 to visually depict a graphical visualization of the data objects 14 over time with respect to their spatial properties/attributes.

For example, in order to make comparisons between events 20 and sequences of events 20 between locations 410 of interest (see FIG. 4), the time range represented by the timelines 422 can be synchronized. In other words, the time scale can be selected as the same for every timeline 422 of the selected time range of the temporal domain 402 of the representation 18.

Representing Current, Past and Future

Three distinct strata of time are displayed by the timelines 422, namely;

1. The "moment of interest" 900 or browse time, as selected by the user, 2. a range 902 of past time preceding the browse time called "past", and 3. a range 904 of time after the moment of interest 900, called "future"

On a 3D Timeline 422, the moment of focus 900 is the point at which the timeline intersects the reference surface 404. An event that occurs at the moment of focus 900 will appear to be placed on the reference surface 404 (event representation is described above). Past and future time ranges 902, 904 extend on either side (above or below) of the moment of interest 900 along the timeline 422. Amount of time into the past or future is proportional to the distance from the moment of focus 900. The scale of time may be linear or logarithmic in either direction. The user may select to have the direction of future to be down and past to be up or vice versa.

There are three basic variations of Spatial Timelines 422 that emphasize spatial and temporal qualities to varying extents. Each variation has a specific orientation and implementation in terms of its visual construction and behavior in the visualization representation 18 (see FIG. 1). The user may choose to enable any of the variations at any time during application runtime, as further described below.

3D Z-axis Timelines

Figure 10:
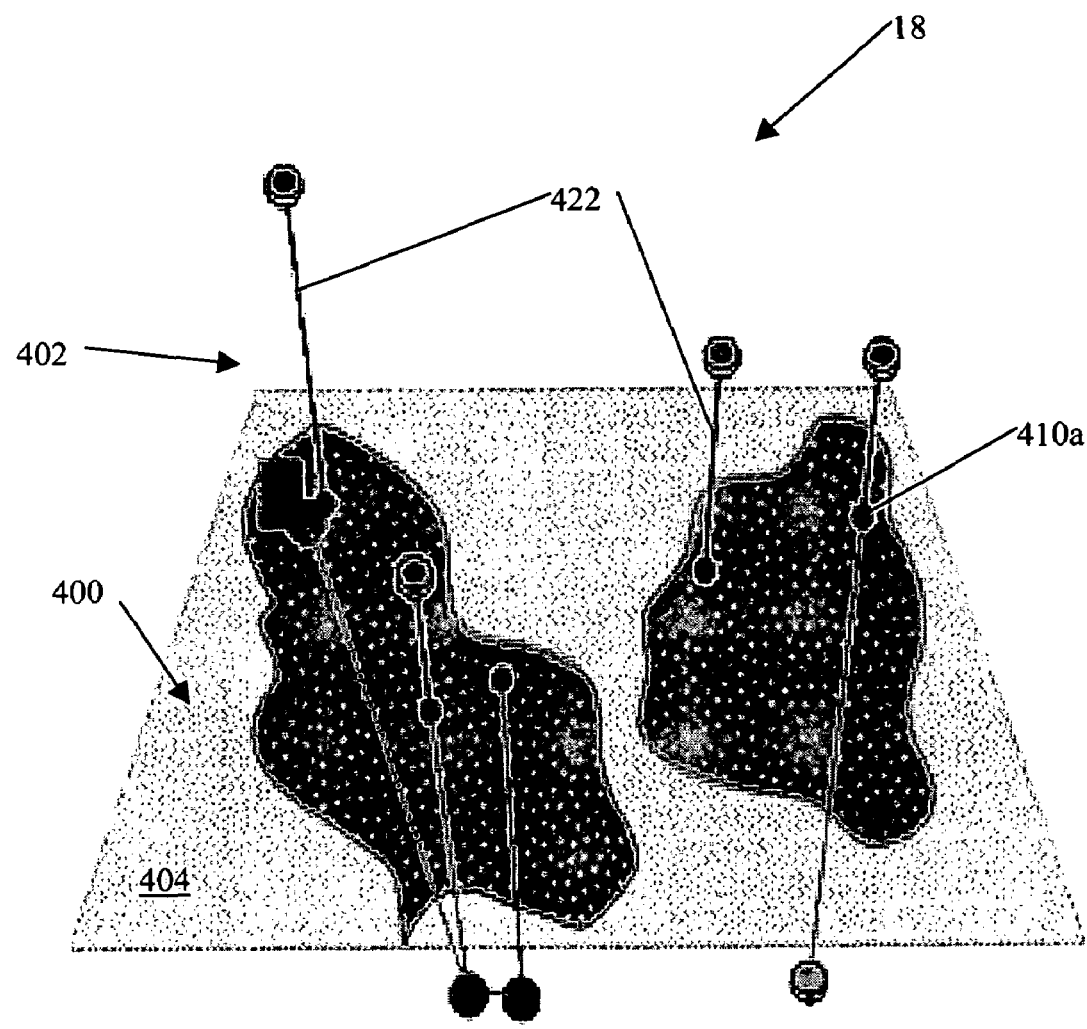
FIG. 10 is a further example timeline of FIG. 8.

FIG. 10 shows how 3D Timelines 422 pass through reference surface 404 locations 410*a*. 3D timelines 422 are locked in orientation (angle) with respect to the orientation of the reference surface 404 and are affected by changes in perspective of the reference surface 404 about the viewpoint 420 (see FIG. 8). For example, the 3D Timelines 422 can be oriented normal to the reference surface 404 and exist within its coordinate space. Within the 3D spatial domain 400, the reference surface 404 is rendered in the X-Y plane and the timelines 422 run parallel to the Z-axis through locations 410*a* on the reference surface 404. Accordingly, the 3D Timelines 422 move with the reference surface 404 as it changes in response to user navigation commands and viewpoint changes about the viewpoint 420, much like flag posts are attached to the ground in real life. The 3D timelines 422 are subject to the same perspective effects as other objects in the 3D graphical window of the VI 202 (see FIG. 1) displaying the visual representation 18. The 3D Timelines 422 can be rendered as thin cylindrical volumes and are rendered only between events 410*a* with which it shares a location and the location 410*a* on the reference surface 404. The timeline 422 may extend above the reference surface 404, below the reference surface 404, or both. If no events 410*b* for its location 410*a* are in view the timeline 422 is not shown on the visualization representation 18.

3D Viewer Facing Timelines

Referring to FIG. 8, 3D Viewer-facing Timelines 422 are similar to 3D Timelines 422 except that they rotate about a moment of focus 425 (point at which the viewing ray of the viewpoint 420 intersects the reference surface 404) so that the 3D Viewer-facing Timeline 422 always remain perpendicular to viewer 423 from which the scene is rendered. 3D Viewer-facing Timelines 422 are similar to 3D Timelines 422 except that they rotate about the moment of focus 425 so that they are always parallel to a plane 424 normal to the viewing ray between the viewer 423 and the moment of focus 425. The effect achieved is that the timelines 422 are always rendered to face the viewer 423, so that the length of the timeline 422 is always maximized and consistent. This technique allows the temporal dimension of the temporal domain 402 to be read by the viewer 423 indifferent to how the reference surface 404 many be oriented to the viewer 423. This technique is also generally referred to as "billboarding" because the information is always oriented towards the viewer 423. Using this technique the reference surface 404 can be viewed from any direction (including directly above) and the temporal information of the timeline 422 remains readable.

Linked TimeChart Timelines

Figure 11:
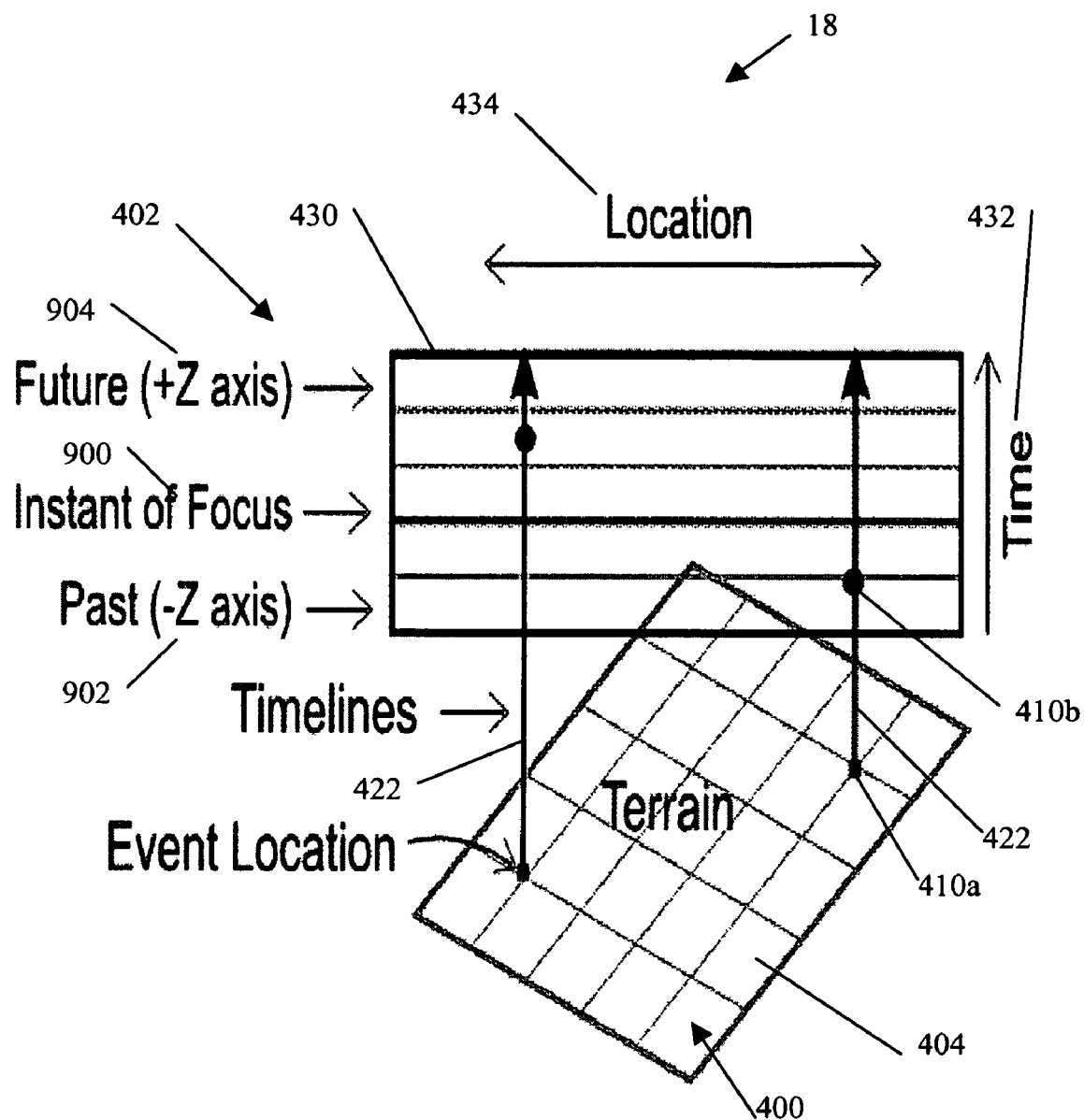
FIG. 11 is a further example timeline of FIG. 8 showing a time chart.

Referring to FIG. 11, showing how an overlay time chart 430 is connected to the reference surface 404 locations 410*a* by timelines 422. The timelines 422 of the Linked TimeChart 430 are timelines 422 that connect the 2D chart 430 (e.g. grid) in the temporal domain 402 to locations 410*a* marked in the 3D spatial domain 400. The timeline grid 430 is rendered in the visual representation 18 as an overlay in front of the 2D or 3D reference surface 404. The timeline chart 430 can be a rectangular region containing a regular or logarithmic time scale upon which event representations 410*b* are laid out. The chart 430 is arranged so that one dimension 432 is time and the other is location 434 based on the position of the locations 410*a* on the reference surface 404. As the reference surface 404 is navigated or manipulated the timelines 422 in the chart 430 move to follow the new relative location 410*a* positions. This linked location and temporal scrolling has the advantage that it is easy to make temporal comparisons between events since time is represented in a flat chart 430 space. The position 410*b* of the event can always be traced by following the timeline 422 down to the reference surface 404 to the location 410*a*.

Figure 12:
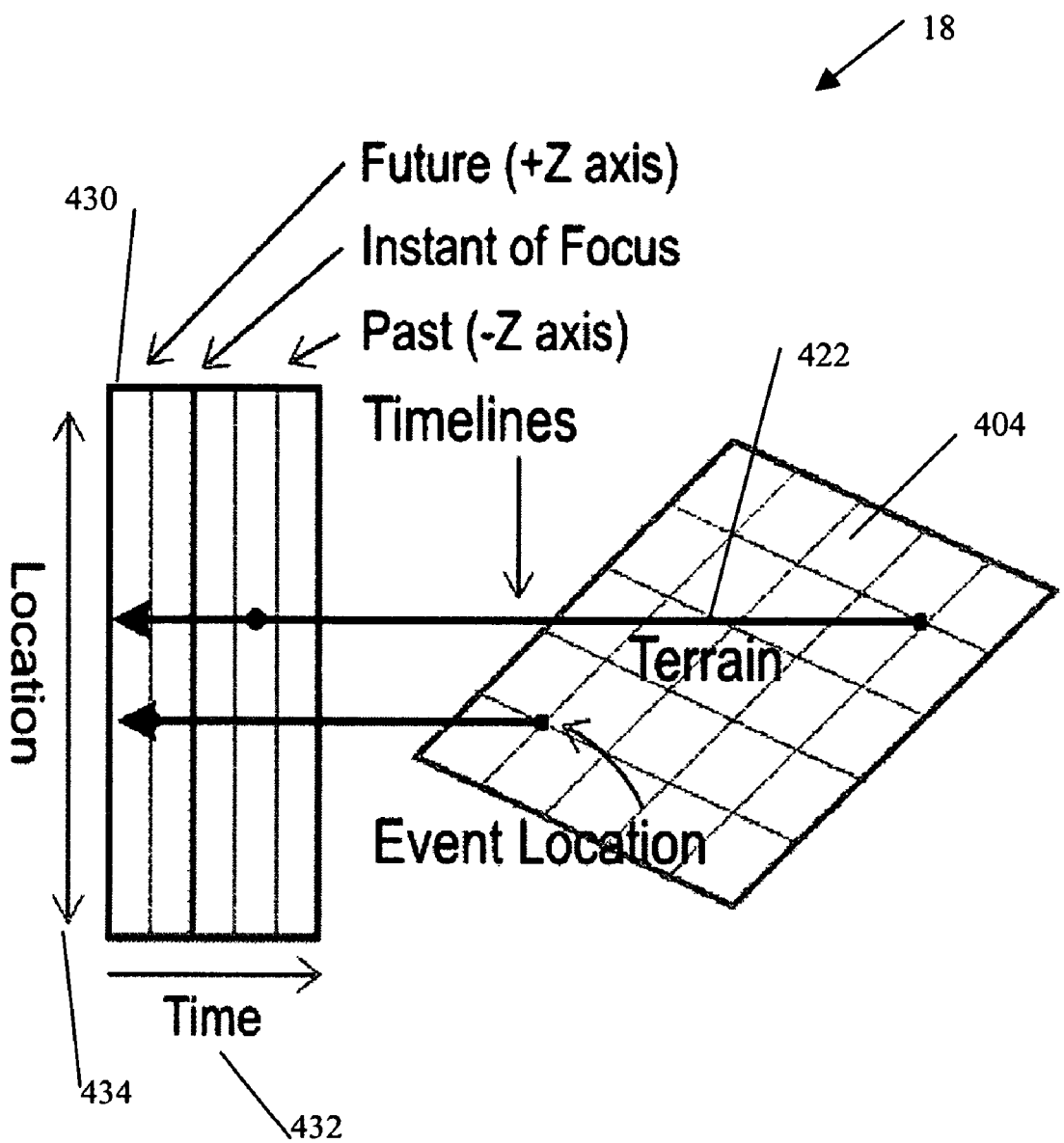
FIG. 12 is a further example of the time chart of FIG. 11.

Referring to FIGS. 11 and 12, the TimeChart 430 can be rendered in 2 orientations, one vertical and one horizontal. In the vertical mode of FIG. 11, the TimeChart 430 has the location dimension 434 shown horizontally, the time dimension 432 vertically, and the timelines 422 connect vertically to the reference surface 404. In the horizontal mode of FIG. 12, the TimeChart 430 has the location dimension 434 shown vertically, the time dimension 432 shown horizontally and the timelines 422 connect to the reference surface 404 horizontally. In both cases the TimeChart 430 position in the visualization representation 18 can be moved anywhere on the screen of the VI 202 (see FIG. 1), so that the chart 430 may be on either side of the reference surface 404 or in front of the reference surface 404. In addition, the temporal directions of past 902 and future 904 can be swapped on either side of the focus 900.

Interaction Interface Descriptions

Figure 13:
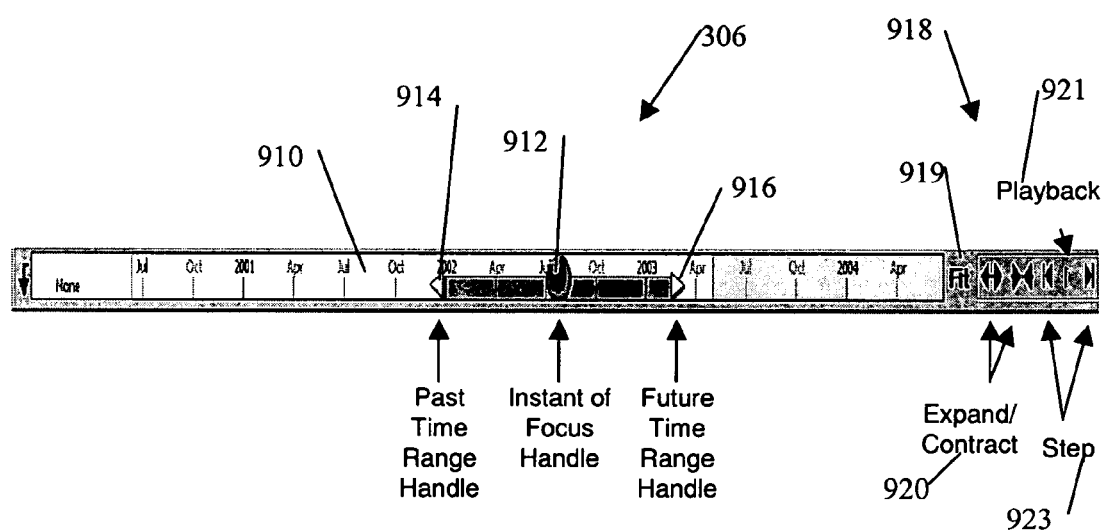
FIG. 13 shows example user controls for the visualization representation of FIG. 5.

Referring to FIGS. 3 and 13, several interactive controls 306 support navigation and analysis of information within the visualization representation 12, as monitored by the visualization manger 300 in connection with user events 109. Examples of the controls 306 are such as but not limited to a time slider 910, an instant of focus selector 912, a past time range selector 914, and a future time selector 916. It is recognized that these controls 306 can be represented on the VI 202 (see FIG. 1) as visual based controls, text controls, and/or a combination thereof.

Time and Range Slider 910

Referring to FIG. 13, the timeline slider 910 is a linear time scale that is visible underneath the visualization representation 18 (including the temporal 402 and spatial 400 domains). The control 910 contains sub controls/selectors that allow control of three independent temporal parameters: the Instant of Focus, the Past Range of Time and the Future Range of Time.

Continuous animation of events 20 over time and geography can be provided as the time slider 910 is moved forward and backwards in time. Example, if a vehicle moves from location A at t1 to location B at t2, the vehicle (object 23,24) is shown moving continuously across the spatial domain 400 (e.g. map). The timelines 422 can animate up and down at a selected frame rate in association with movement of the slider 910.

Instant of Focus

The instant of focus selector 912 is the primary temporal control. It is adjusted by dragging it left or right with the mouse pointer across the time slider 910 to the desired position. As it is dragged, the Past and Future ranges move with it. The instant of focus 900 (see FIG. 12) (also known as the browse time) is the moment in time represented at the reference surface 404 in the spatial-temporal visualization representation 18. As the instant of focus selector 912 is moved by the user forward or back in time along the slider 910, the visualization representation 18 displayed on the interface 202 (see FIG. 1) updates the various associated visual elements of the temporal 402 and spatial 400 domains to reflect the new time settings. For example, placement of Event visual elements 410 animate along the timelines 422 and Entity visual elements 410 move along the reference surface 404 interpolating between known locations visual elements 410 (see FIGS. 6 and 7). Examples of movement are given with reference to FIGS. 14, 15, and 16 below.

Past Time Range

The Past Time Range selector 914 sets the range of time before the moment of interest 900 (see FIG. 11) for which events will be shown. The Past Time range is adjusted by dragging the selector 914 left and right with the mouse pointer. The range between the moment of interest 900 and the Past time limit can be highlighted in red (or other colour codings) on the time slider 910. As the Past Time Range is adjusted, viewing parameters of the spatial-temporal visualization representation 18 update to reflect the change in the time settings.

Future Time Range

The Future Time Range selector 916 sets the range of time after the moment of interest 900 for which events will be shown. The Future Time range is adjusted by dragging the selector 916 left and right with the mouse pointer. The range between the moment of interest 900 and the Future time limit is highlighted in blue (or other colour codings) on the time slider 910. As the Future Time Range is adjusted, viewing parameters of the spatial-temporal visualization representation 18 update to reflect the change in the time settings.

The time range visible in the time scale of the time slider 910 can be expanded or contracted to show a time span from centuries to seconds. Clicking and dragging on the time slider 910 anywhere except the three selectors 912, 914, 916 will allow the entire time scale to slide to translate in time to a point further in the future or past. Other controls 918 associated with the time slider 910 can be such as a "Fit" button 919 for automatically adjusting the time scale to fit the range of time covered by the currently active data set displayed in the visualization representation 18. Controls 918 can include a Fit control button 919, a scale-expand-contract controls 920, a step control 923, and a play control 922, which allow the user to expand or contract the time scale. The step control 923 increments the instant of focus 900 forward or back. The "playback" button 920 causes the instant of focus 900 to animate forward by a user-adjustable rate. This "playback" causes the visualization representation 18 as displayed to animate in sync with the time slider 910.

Simultaneous Spatial and Temporal Navigation can be provided by the tool 12 using, for example, interactions such as zoom-box selection and saved views. In addition, simultaneous spatial and temporal zooming can be used to provide the user to quickly move to a context of interest. In any view of the representation 18, the user may select a subset of events 20 and zoom to them in both time 402 and space 400 domains using Fit Time and a Fit Space functions through the button 919. These functions can happen simultaneously by dragging a zoom-box on to the time chart 430 itself. The time range and the geographic extents of the selected events 20 can be used to set the bounds of the new view of the representation 18, including selected domain 400,402 view formats.

Referring again to FIGS. 13 and 27, the Fit control 919 of the timer slider and other controls 306 can be further subdivided into separate fit time 760 and fit geography/space 762 functions as performed by a fit module 700 though user interaction via the fit control button 919. For example, with a single click via the controls 306, for the fit to geography function the fit module 700 can instruct the visualization manager 300 to zoom in to user selected objects 20,21,22,23,24 (i.e. visual elements 410) and/or connection elements 412 (see FIG. 17) in both/either space (FG) and/or time (FT), as displayed in a re-rendered "fit" version of the representation 18. For example, for fit to geography function 762, after the user has selected places, targets and/or events (i.e. elements 410,412) from the representation 18, the fit module 700 instructs the visualization manager 300 to reduce/expand the displayed map of the representation 18 to only the geographic area that includes those selected elements 410,412. If nothing is selected, the map is fitted to the entire data set (i.e. all geographic areas) included in the representation 18. For example, for fit to time function 760, after the user has selected places, targets and/or events (i.e. elements 410,412) from the representation 18, the fit module 700 instructs the visualization manager 300 to reduce/expand the past portion of the timeline(s) 422 to encompass only the period that includes the selected visual elements 410,412. Further, the fit module 700 can instruct the visualization manager 300 to adjust the display of the browse time slider as moved to the end of the period containing the selected visual elements 410,412 and the future portion of the timeline 422 can account for the same proportion of the visible timeline 422 as it did before the timeline(s) 422 were "time fitted". If nothing is selected, the timeline is fitted to the entire data set (i.e. all temporal areas) included in the representation 18. Further, it is recognized, for both Fit to Geography 762 and Fit to Time 760, if only targets are selected, the fit module 700 coordinates the display of the map/timeline to fit to the targets' entire set of events. Further for example, if a target is selected in addition to events, only those events selected are used in the fit calculation of the fit module 700.

Figure 13A:
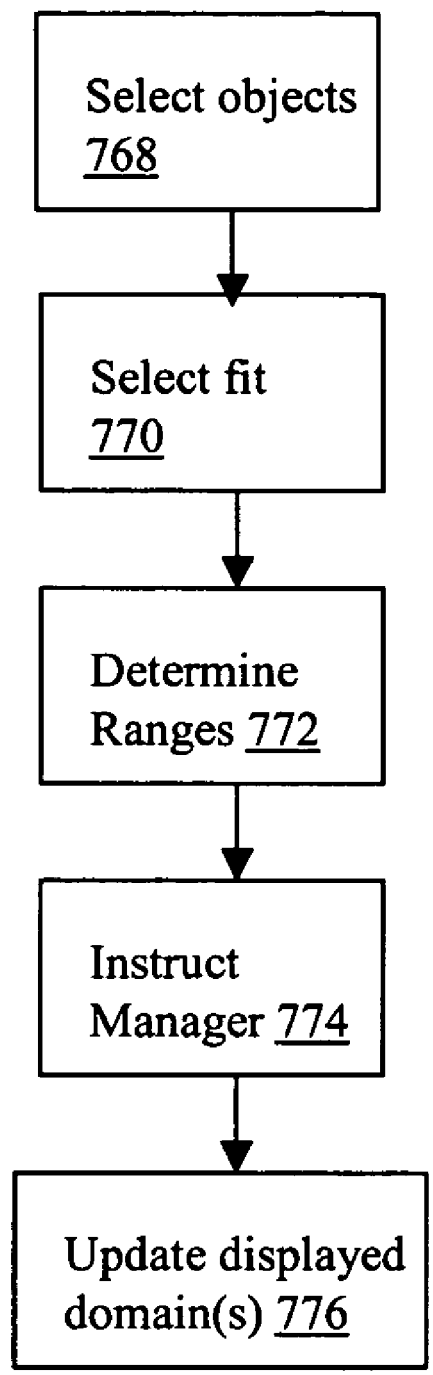
FIG. 13a shows example operation of user controls of FIG. 13.
Figure 27:
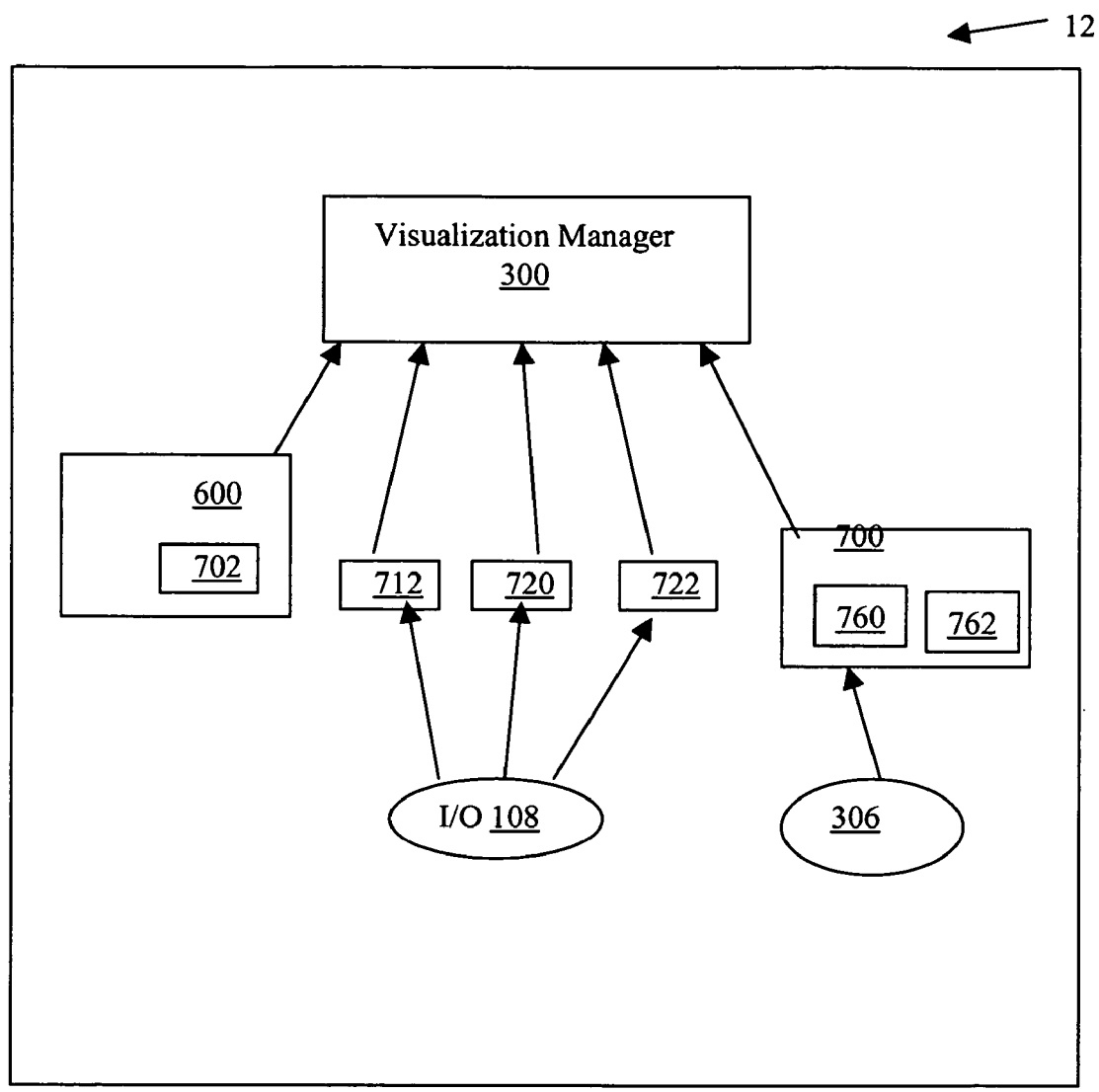
FIG. 27 shows a further embodiment of the tool of FIG. 3.

Referring to FIGS. 13a and 27, operation of the fit buttons 919 of the fit module 700 begin when the user selects 768 desired objects 14 (contained in the tables 122 of the memory 102 for example—see FIG. 2), such that the selected objects have time and/or geographical attributes. At step 770, the user selects the desired fit function(s) 760,762. At step 772, the fit module 700 analyses the range of time and/or geography associated with the selected object(s) 14 (i.e. maximum and minimum values for geography and/or time) and determines the appropriate time/spatial range(s) in the domains 402,400 for display by the visualization representation 18. At step 774, the fit module 700 instruction the visualization manager 300 to adjust the display of the visualization representation 18 to match the determined time/spatial ranges. At step 776, the visualization manager 300 adjusts the displayed domain 400 to match the determined spatial range and adjusts the displayed temporal domain 402 to math the determined temporal range, as well as updating the indicated ranges 914,916 and the instant of focus 912 of the time slider 910 (see FIG. 13).

Association Analysis Tools

Referring to FIGS. 1 and 3, an association analysis module 307 has functions that have been developed that take advantage of the association-based connections between Events, Entities and Locations. These functions 307 are used to find groups of connected objects 14 during analysis of the data in the visualization representation 18. The associations 16 connect these basic objects 20, 22, 24 into complex groups 27 (see FIGS. 6 and 7) representing actual occurrences. The functions are used to follow the associations 16 from object 14 to object 14 to reveal connections between objects 14 that are not immediately apparent. Association analysis functions are especially useful in analysis of large data sets where an efficient method to find and/or filter connected groups is desirable, i.e. identify selected objects 14 and their associated group(s) of objects 14 from the larger scale of unconnected objects 14 in the visualization representation 18. For example, an Entity 24 maybe be involved in events 20 in a dozen places/locations 22, and each of those events 20 may involve other Entities 24. The association analysis function 307 can be used to display only those locations 22 on the visualization representation 18 that the entity 24 has visited and/or the other entities 24 that have been contacted.

The analysis functions A,B,C,D provide the user with different types of link analysis that display connections between 14 of interest, such as but limited to:

1. Expanding Search module A, e.g. a link analysis tool.

Referring to FIGS. 3, 27, and 32, the expanding search module A of the module 307 allows the user to start with a selected object(s) 14a initially shown amongst other objects 14 (both connected and not connected) in the visualization representation 18—see FIG. 32a. The user selects the object 14a or group of objects 14a of focus and clicks on the Expanding search button 920 for a degree of separation 781 of "0", which causes everything in the visualization representation 18 to disappear (or to be otherwise visually distinguished from the other objects 14—e.g. level of transparency, colour, etc.) except the selected items, see FIG. 32b. The user then increments the search depth (e.g. via an appropriate depth slider control) and objects 14 connected by the specified depth, i.e. degree of separation 781, are made visible in the display. For example, in FIG. 32c the selected degree of separation 781 is "1" and all objects 14 connected by one degree 782 are shown in the representation 18 along with the selected object 14a. In FIG. 32d the selected degree of separation 781 is "2" and all objects 14 connected by one degree 782 and two degrees 784 are shown in the representation 18 along with the selected object 14a.

Figures 31A, 31B, 31C:
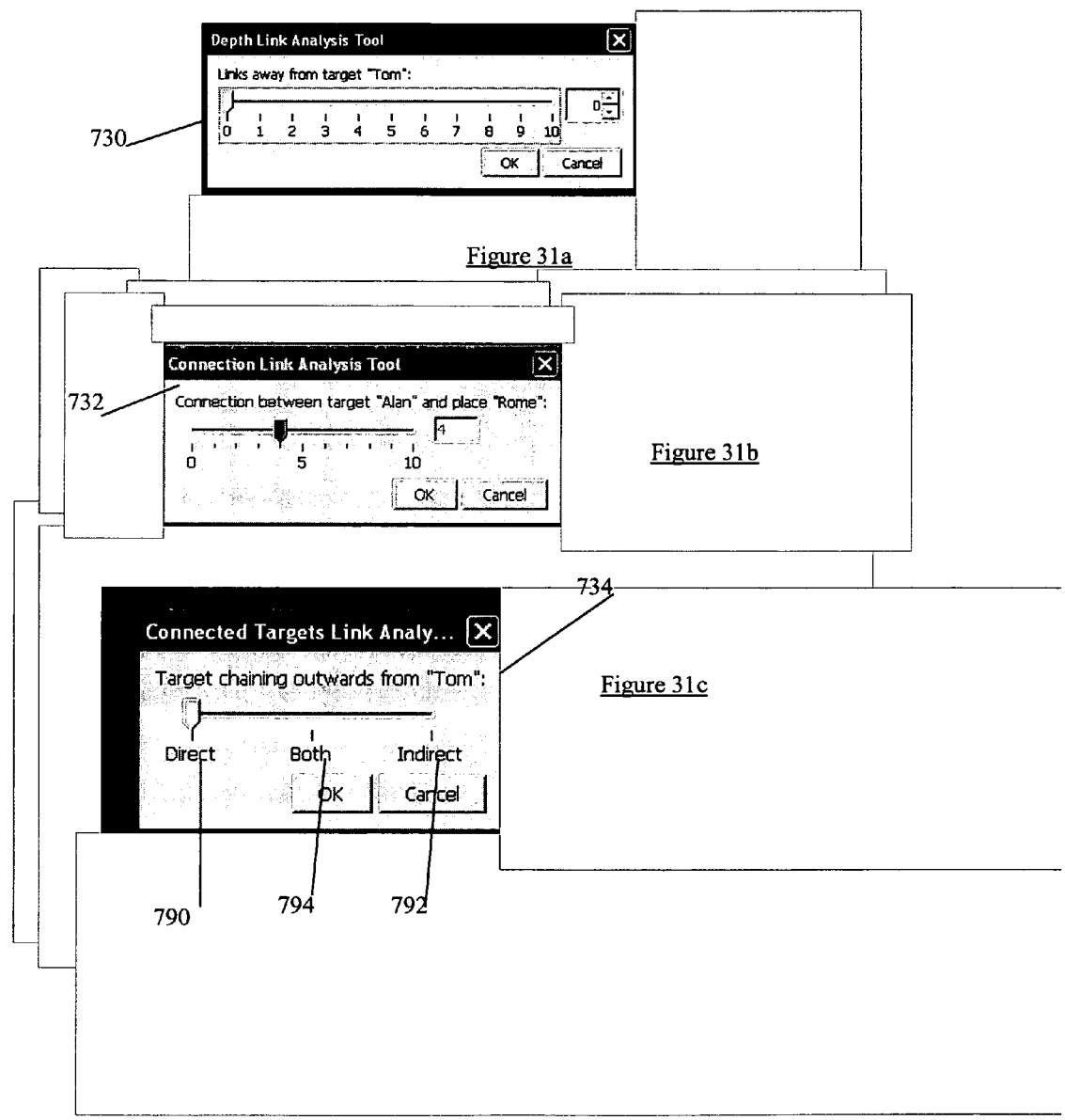
FIGS. 31a,b,c,d show example control sliders of analysis functions of the tool of FIG. 3.

In this way, sets of connected objects 14 are revealed as displayed using the visual elements 410 and 412 in the representation 18 by incrementally showing objects 14 that are associated with the selected object 14a by increasing degrees of separation. Accordingly, the expanding search module A of the module 307 displays all objects 14 represented by elements 410 and 412, in the representation 18 that are connected to the selected object 14a, within the specified range of separation. The range of separation of the expanding search module A can be selected by the user using the I/O interface 108, using a links slider 730 in a dialog window (see FIG. 31a). For example, this link analysis can be performed when a single place 22, target 24 or event 20 is first selected as object 14a. An example operation of the depth slider 730 is as follows, when the expanding search module A is first selected via the I/O interface 108, a dialog opens, and the links slider 730 is initially set to 0 and only the selected object 14a is displayed in the representation 18. Using the slider 730 (or entry field), when the links slider 730 is moved to 1, any object 14 directly linked (i.e. 1 degree of separation such as all elementary events 20) to the initially selected object 14a appears on the representation 18 in addition to the initially selected object 14a. As the links slider 730 is positioned higher up the slider scale, additional connected objects 14 are added at each level to the representation 18, until all objects 14 connected to the initially selected object 14a are displayed.

2. Connection Search B, e.g. a join analysis tool.

Referring to FIGS. 3, 27, and 33, the Connection Search function B of the module 307 allows the user to connect any pair of objects X1,X2 by their web of associations 26. The user selects any two target objects X1,X2 and clicks on the Connection Search module B. The connection search module B works by automatically scanning the extents of the web of associations 26 starting from one of the initially selected target objects X1,X2 of the pair. The search will continue until the second target object X1,X2 is found as one of the connected target objects X1,X2 or until there are no more connected target objects X1,X2. If a path 788 of associated objects 14 between the target objects X1,X2 exists, all of the associated objects 14 along that path 788 are displayed and the depth 732 is automatically displayed showing the minimum number of links 788 between the target objects X1,X2. For example, FIG. 33a shows one connection path, i.e. a depth 732 of "1". For example, FIG. 33b shows two connection paths, i.e. a depth 732 of "2", with an interconnected object 14. For example, FIG. 33c shows three connection paths 788, i.e. a depth 732 of "3", with two interconnected objects 14. It is recognized that other configurations of paths 788 and associated objects 14 than shown can be generated by the connection module B, in relation to the selected target objects X1,X2.

Accordingly, the Join/connection Analysis module B looks for and displays any specified connection path 788 between two (or more) selected target objects X1,X2. This join analysis is performed when two target objects X1,X2, for example, are selected from the representation 18. It is noted that if the two selected target objects X1,X2 are not connected, no events 20 are displayed and the connection level 732 is set to zero. If the paired target objects X1,X2 are connected, the shortest path 788 between them is automatically displayed, for example. It is noted that the Join Analysis module B can be generalized for three or more selected target objects X1,X2 and their associated connection paths 788 and objects 14.

An example operation of the Join Analysis module B is a selection of the targets 24 Alan and Rome. When the dialog opens, the number of links 732 (e.g. 4—which is user adjustable—see FIG. 31b) required to make a connection between the two targets 24 is displayed to the user, and only the objects 14 involved in that connection (having 4 links) are visible on the representation 18.

3. A Chain analysis tool C

Figure 34:
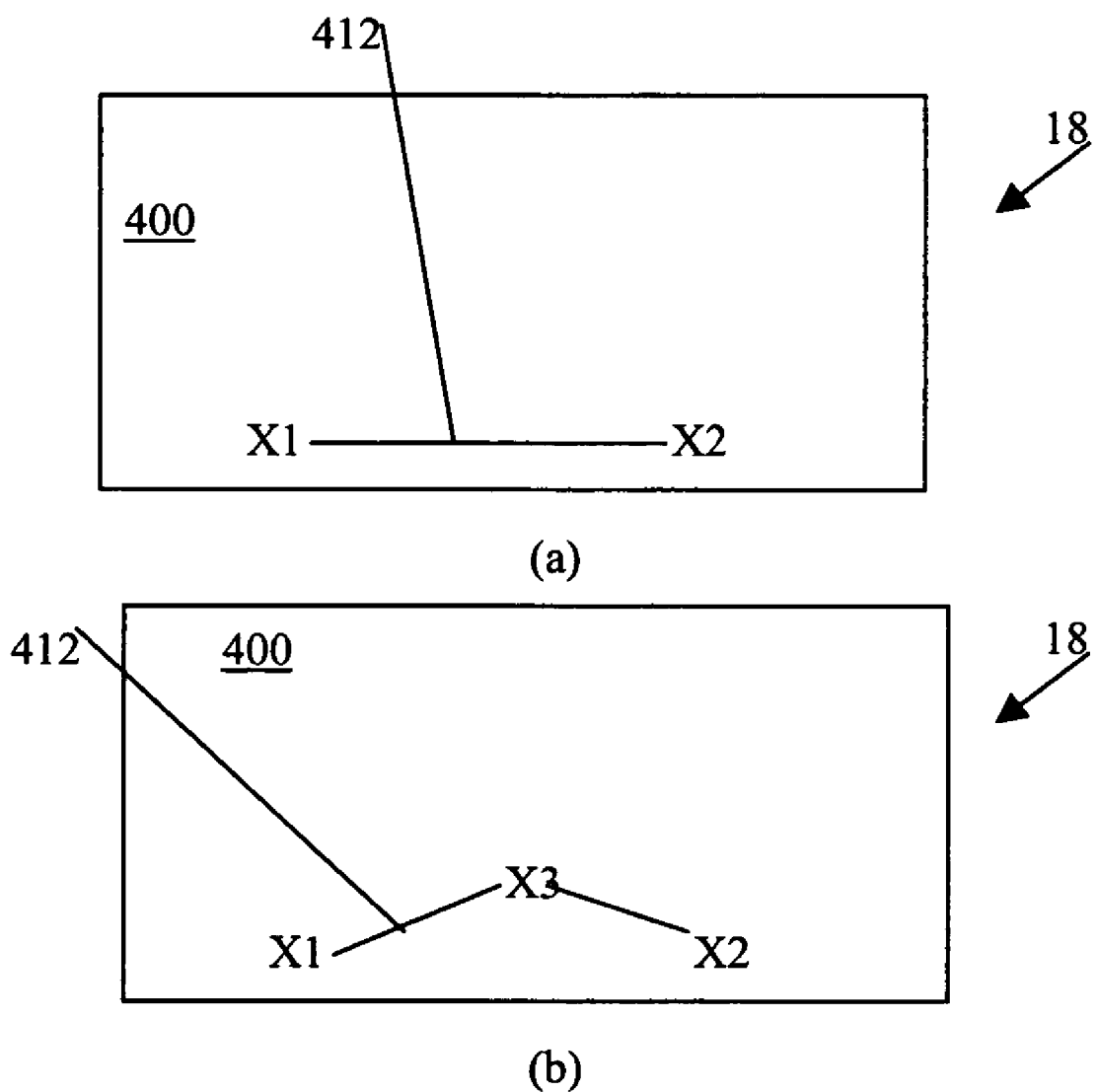
FIGS. 34a,b show further example embodiments of analysis function of the tool of FIG. 27.

Referring to FIGS. 3, 27, and 34, The Chain Analysis module C displays direct and/or indirect connections 412 between a selected target X1 and other connected targets X2. For example, in a direct connection, a single event 20 (example of connection 412) connects target X1 and target X2 (who are both on the terrain 400), see FIG. 34a. In an indirect connection, some number of events 20 (chain) connect X1 and X2, via a target X3 (who can be located off the displayed terrain 400 for example), see FIG. 34b. This analysis can be performed with a single initial target X1 selected. For example, the Analysis module C can be associated with a chaining slider 736—see FIG. 31c (accessed via the I/O interface 108) with the selections of such as but not limited to direct 790, indirect 792, and both 794.

For example, the target TOM is first selected on the representation 18 and then when the target chaining slider 736 is set to Direct, the targets ALAN and PARENTS are displayed, along with the events 20 that cause TOM to be directly connected to them. In the case where TOM does not have any indirect target connections, so moving the slider 736 to both 794 and to indirect 792 does not change the view as generated on the representation 18 for the direct chaining slider 736 setting.

4. A Move analysis tool D

Figure 31D:
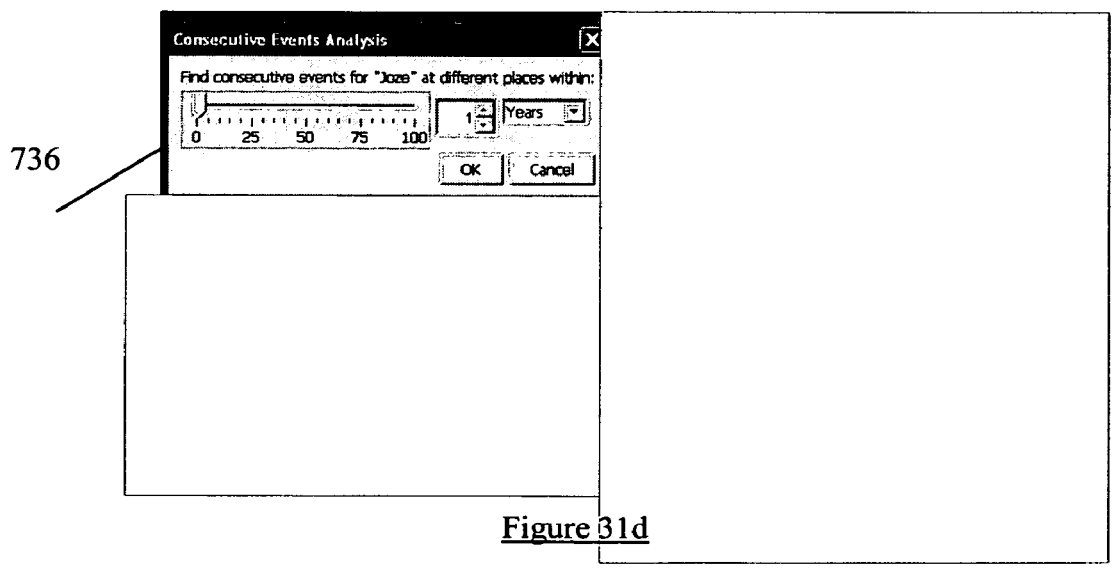

Referring to FIGS. 3, 27, and 5, this analysis module D finds, for a single target 410, all sets of consecutive events 20 (represented by other elements 410), that are located at different places that happened within the specific time range of the temporal domain 402. For example, this analysis of the analysis module D may be performed with a single target 410 selected from the representation 18. In example operation of the analysis module D, the initial target 410 is selected, when a slider 736 opens (see FIG. 31d), the time range slider 736 is set to one Year and quite a few connected events 20 may be displayed on the representation 18, which are connected to the initially selected target 410. When the slider 736 selection is changed to the unit type of one Week, the number of events 20 displayed will drop accordingly. Similarly, as the time range slider 736 is positioned higher, the number of events 20 connected to the selected target 410 are added to the representation 18 as the time range increases. It is recognized that the selected target 410 can be an entity 24, and event 20, and/or a location 22, as desired. It is further recognized that the selected target 410 can be a group of objects 14, as desired.

It is recognized that the functions of the module 307 can be used to implement filtering via such as but not limited to criteria matching, algorithmic methods and/or manual selection of objects 14 and associations 16 using the analytical properties of the tool 12. This filtering can be used to highlight/hide/show (exclusively) selected objects 14 and associations 16 as represented on the visual representation 18. The functions are used to create a group (subset) of the objects 14 and associations 16 as desired by the user through the specified criteria matching, algorithmic methods and/or manual selection. Further, it is recognized that the selected group of objects 14 and associations 16 could be assigned a specific name which is stored in the table 122. Further, it is recognized that the module 307 and associated analysis modules A,B,C,D can have an access module, which accesses the tables 122 of the memory 102 for retrieving object 14 and/or association 26 data representing the links/connections determined through the above described example operation of the analysis modules A,B,C,D.

Operation of Visual Tool to Generate Visualization Representation

Figure 14:
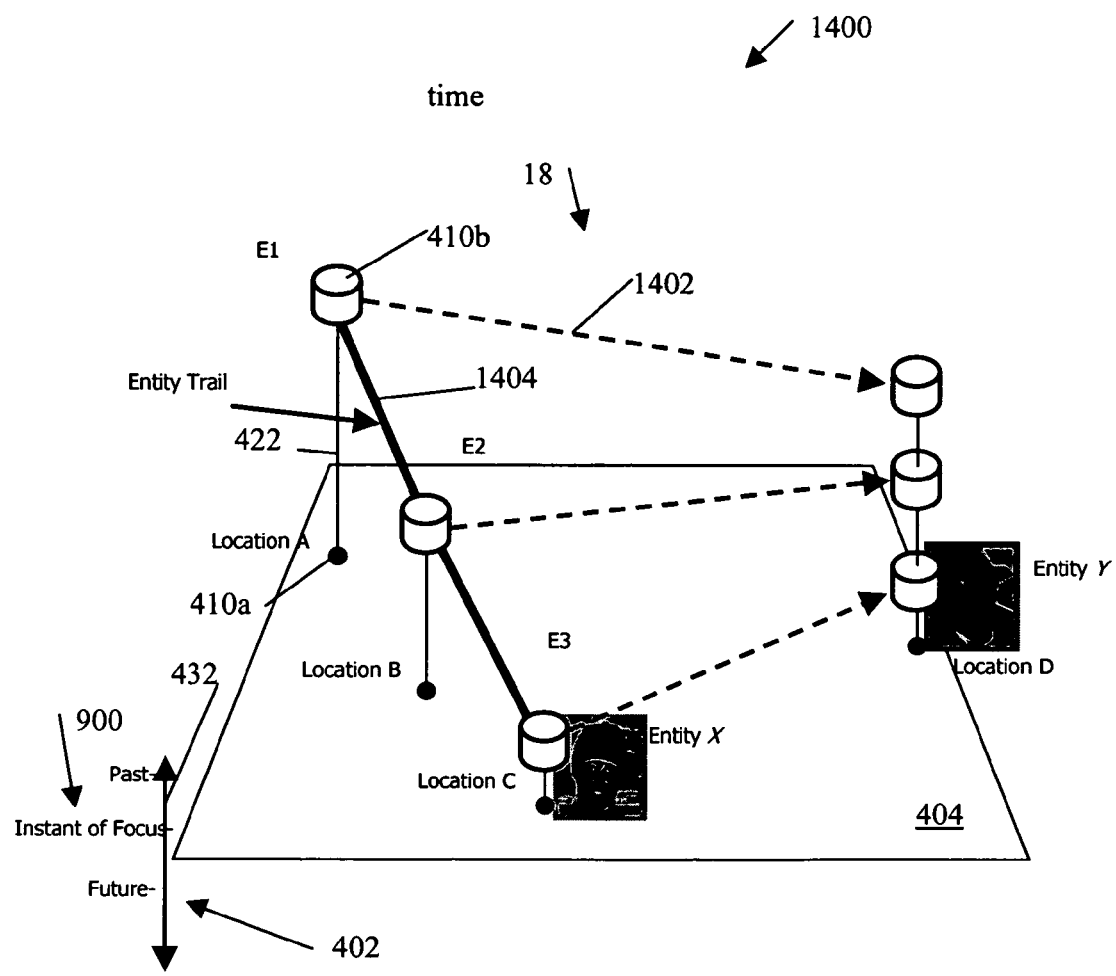
FIG. 14 shows an example operation of the tool of FIG. 3.

Referring to FIG. 14, example operation 1400 shows communications 1402 and movement events 1404 (connection visual elements 412—see FIGS. 6 and 7) between Entities "X" and "Y" over time on the visualization representation 18. This FIG. 14 shows a static view of Entity X making three phone call communications 1402 to Entity Y from 3 different locations 410a at three different times. Further, the movement events 1404 are shown on the visualization representation 18 indicating that the entity X was at three different locations 410a (location A,B,C), which each have associated timelines 422. The timelines 422 indicate by the relative distance (between the elements 410b and 410a) of the events (E1,E2,E3) from the instant of focus 900 of the reference surface 404 that these communications 1404 occurred at different times in the time dimension 432 of the temporal domain 402. Arrows on the communications 1402 indicate the direction of the communications 1402, i.e. from entity X to entity Y. Entity Y is shown as remaining at one location 410a (D) and receiving the communications 1402 at the different times on the same timeline 422.

Figure 15:
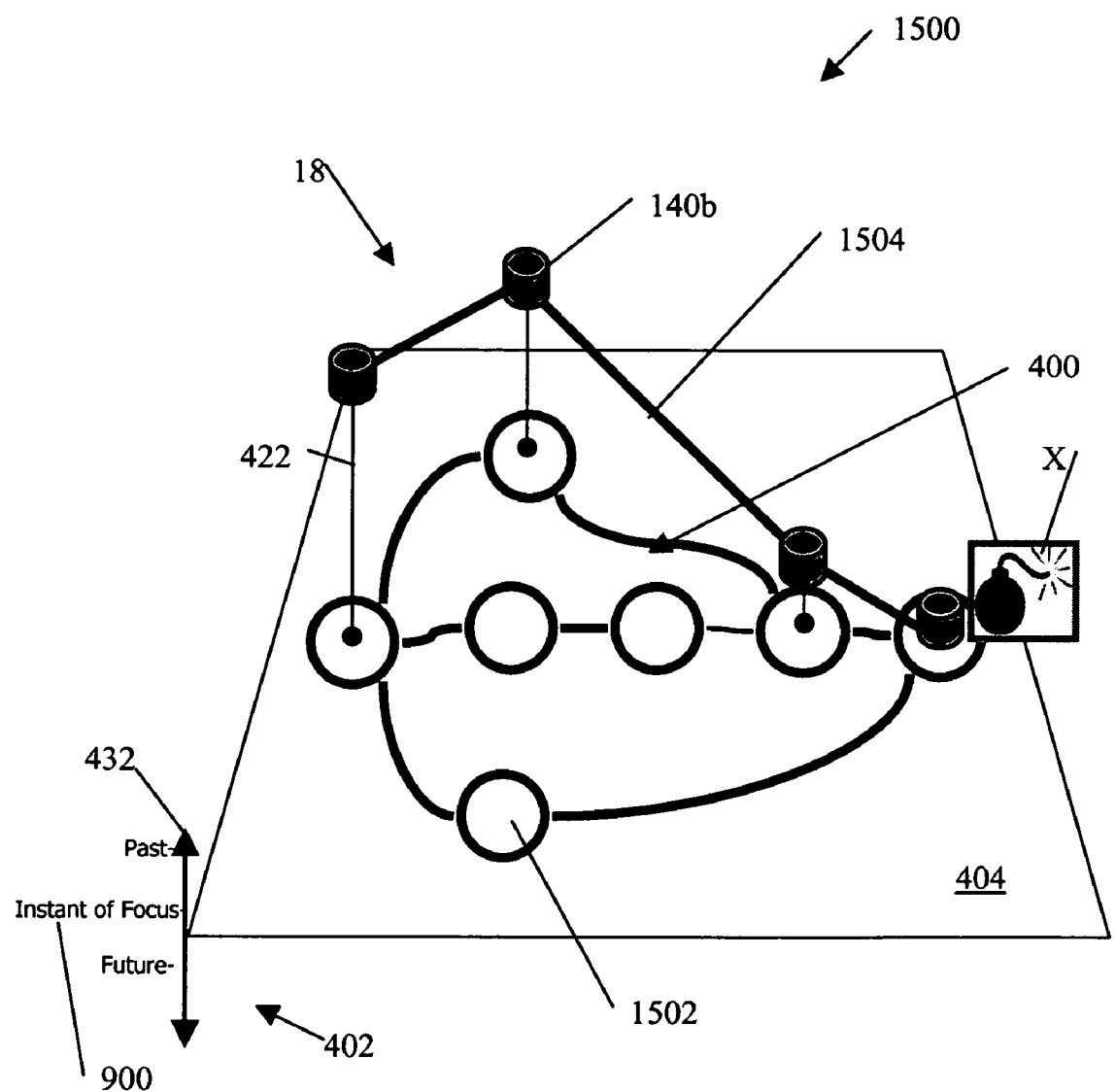
FIG. 15 shows a further example operation of the tool of FIG. 3.

Referring to FIG. 15, example operation 1500 for shows Events 140b occurring within a process diagram space domain 400 over the time dimension 432 on the reference surface 404. The spatial domain 400 represents nodes 1502 of a process. This FIG. 14 shows how a flowchart or other graphic process can be used as a spatial context for analysis. In this case, the object (entity) X has been tracked through the production process to the final stage, such that the movements 1504 represent spatial connection elements 412 (see FIGS. 6 and 7).

Figure 19:
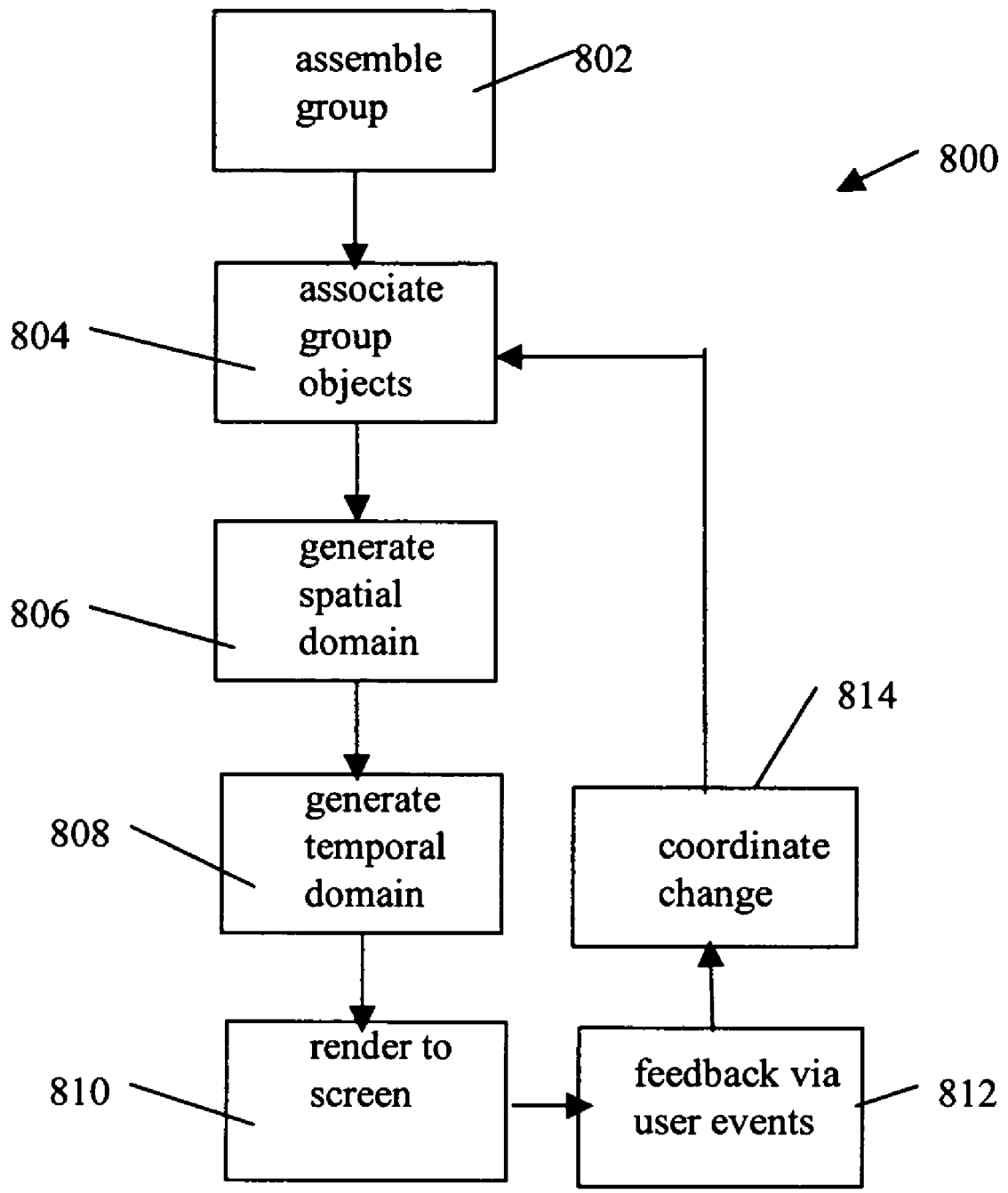
FIG. 19 is an example operation of the visualization tool of FIG. 3.

Referring to FIGS. 3 and 19, operation 800 of the tool 12 begins by the manager 300 assembling 802 the group of objects 14 from the tables 122 via the data manager 114. The selected objects 14 are combined 804 via the associations 16, including assigning the connection visual element 412 (see FIGS. 6 and 7) for the visual representation 18 between selected paired visual elements 410 corresponding to the selected correspondingly paired data elements 14 of the group. The connection visual element 412 represents a distributed association 16 in at least one of the domains 400, 402 between the two or more paired visual elements 410. For example, the connection element 412 can represent movement of the entity object 24 between locations 22 of interest on the reference surface 404, communications (money transfer, telephone call, email, etc. . . . ) between entities 24 different locations 22 on the reference surface 404 or between entities 24 at the same location 22, or relationships (e.g. personal, organizational) between entities 24 at the same or different locations 22.

Next, the manager 300 uses the visualization components 308 (e.g. sprites) to generate 806 the spatial domain 400 of the visual representation 18 to couple the visual elements 410 and 412 in the spatial reference frame at various respective locations 22 of interest of the reference surface 404. The manager 300 then uses the appropriate visualization components 308 to generate 808 the temporal domain 402 in the visual representation 18 to include various timelines 422 associated with each of the locations 22 of interest, such that the timelines 422 all follow the common temporal reference frame. The manager 112 then takes the input of all visual elements 410, 412 from the components 308 and renders them 810 to the display of the user interface 202. The manager 112 is also responsible for receiving 812 feedback from the user via user events 109 as described above and then coordinating 814 with the manager 300 and components 308 to change existing and/or create (via steps 806, 808) new visual elements 410, 412 to correspond to the user events 109. The modified/new visual elements 410, 412 are then rendered to the display at step 810.

Referring to FIG. 16, an example operation 1600 shows animating entity X movement between events (Event 1 and Event 2) during time slider 901 interactions via the selector 912. First, the Entity X is observed at Location A at time t. As the slider selector 912 is moved to the right, at time t+1 the Entity X is shown moving between known locations (Event1 and Event2). It should be noted that the focus 900 of the reference surface 404 changes such that the events 1 and 2 move along their respective timelines 422, such that Event 1 moves from the future into the past of the temporal domain 402 (from above to below the reference surface 404). The length of the timeline 422 for Event 2 (between the Event 2 and the location B on the reference surface 404 decreases accordingly. As the slider selector 912 is moved further to the right, at time t+2, Entity X is rendered at Event2 (Location B). It should be noted that the Event 1 has moved along its respective timeline 422 further into the past of the temporal domain 402, and event 2 has moved accordingly from the future into the past of the temporal domain 402 (from above to below the reference surface 404), since the representation of the events 1 and 2 are linked in the temporal domain 402. Likewise, the entity X is linked spatially in the spatial domain 400 between event 1 at location A and event 2 at location B. It is also noted that the Time Slider selector 912 could be dragged along the time slider 910 by the user to replay the sequence of events from time t to t+2, or from t+2 to t, as desired.

Figure 35:
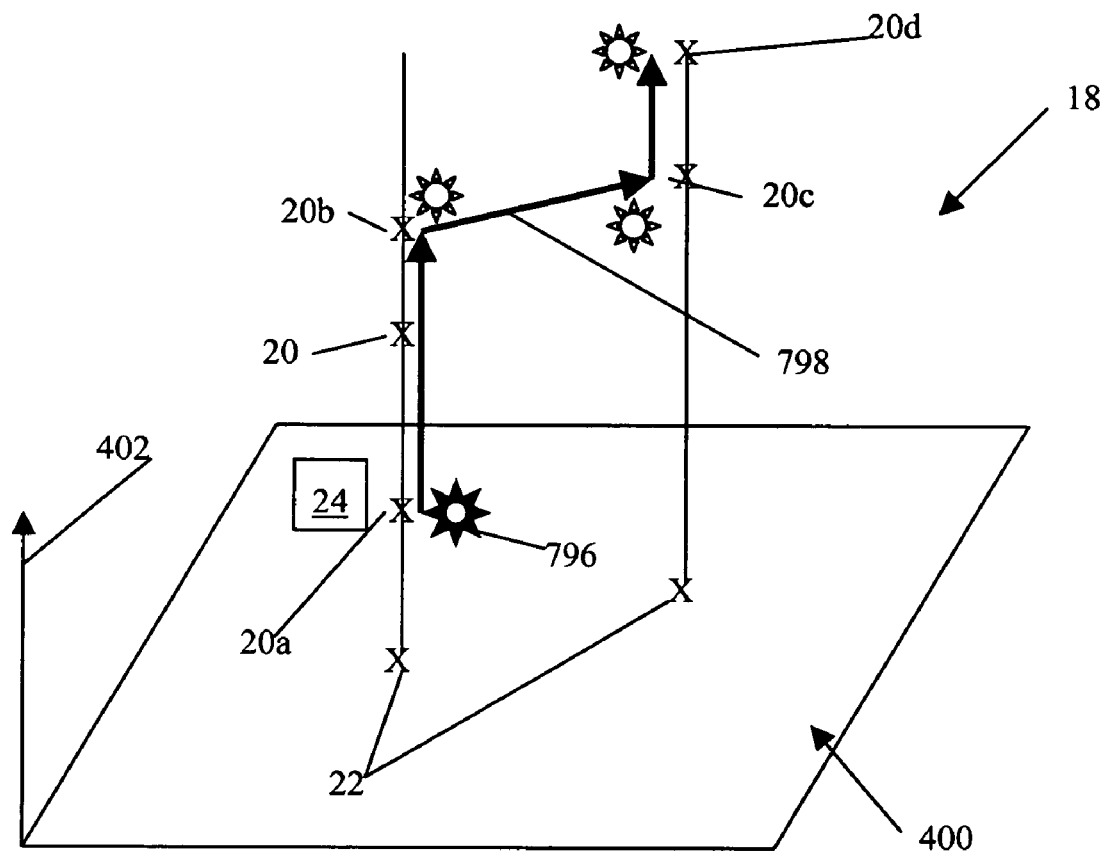
FIG. 35 shows a further example embodiment of analysis function of the tool of FIG. 27.

Referring to FIGS. 27 and 35, a further feature of the tool 12 is a target tracing module 722, which takes user input from the I/O interface 108 for tracing of a selected target/entity 24 through associated events 20a,b,c,d. For example, the user of the tool 12 selects one of the events 20a from the representation 18 associated with one or more entities/target 24, whereby the module 722 provides for a selection icon 796 to be displayed adjacent to the selected event 20a on the representation 18. Using the interface 108 (e.g. up/down arrows), the user can navigate the representation 18 by scrolling, represented by reference numeral 798 and example vector) back and forward (in terms of time and/or geography) through the events 20b,c,d associated with that target 24, i.e. the display of the representation 18 adapts as the user sequentially scrolls 798, for example, through the time domain 402, as described already above. For example, the display of the representation 18 moves between consecutive events 20a,b,c,d associated with the target 24.

Referring to FIG. 35, in an example implementation of the I/O interface 08, the Page Up key moves the selection icon 796 upwards (back in time) and the Page Down key moves the selection icon 796 downwards (forward in time), such that after selection of a single event 20a with an associated target 24, the Page Up keyboard key would move the selection icon 796 to the next event 20b (back in time) on the associated target's 24 trail while selecting the Page Down key would return the selection icon 796 to the first event 20a selected. The module 722 coordinates placement of the selection icon 796 at consecutive events 20b,c,d connected with the associated target 24 while skipping over those events 20 (while scrolling) not connected with the associated target 24.

Figure 17:
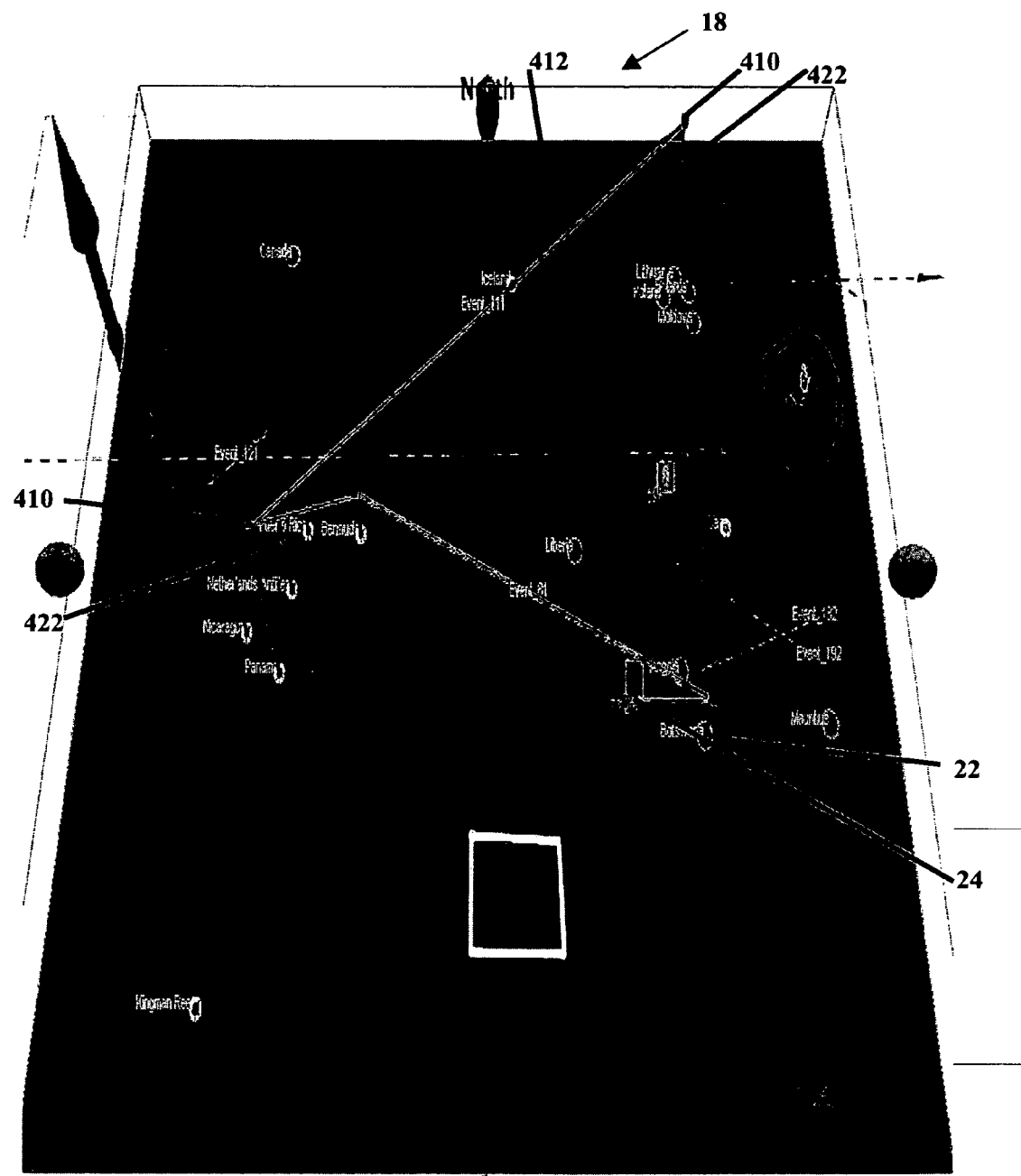
FIG. 17 shows an example visualization representation of FIG. 4 containing events and target tracking over space and time showing connections between events.

Referring to FIG. 17, the visual representation 18 shows connection visual elements 412 between visual elements 410 situated on selected various timelines 422. The timelines 422 are coupled to various locations 22 of interest on the geographical reference frame 404. In this case, the elements 412 represent geographical movement between various locations 22 by entity 24, such that all travel happened at some time in the future with respect to the instant of focus represented by the reference plane 404.

Figure 18:
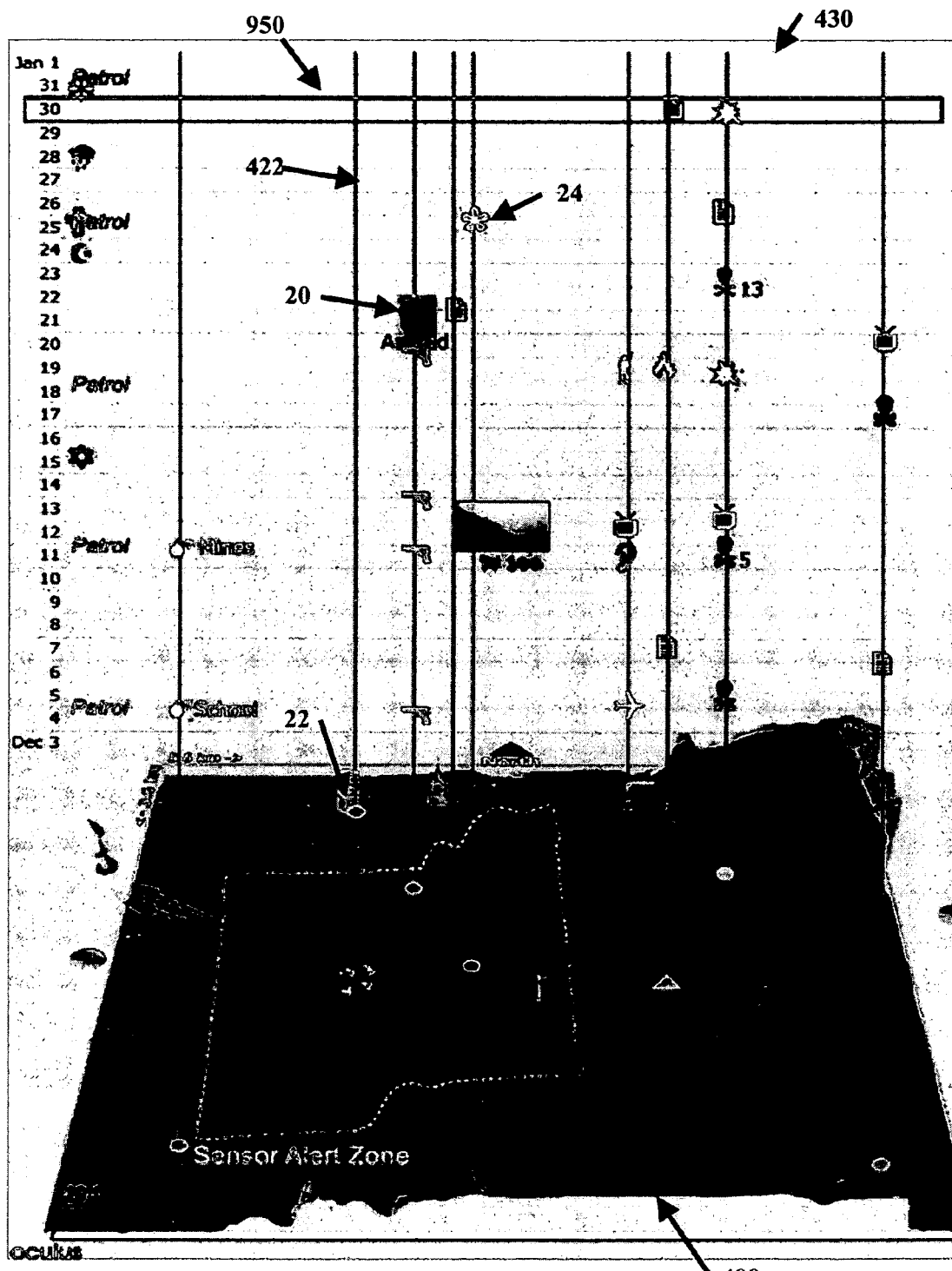
FIG. 18 shows an example visualization representation containing events and target tracking over space and time showing connections between events on a time chart of FIG. 11.

Referring to FIG. 18, the spatial domain 400 is shown as a geographical relief map. The timechart 430 is superimposed over the spatial domain of the visual representation 18, and shows a time period spanning from December 3$^{rd}$ to January 1$^{st}$ for various events 20 and entities 24 situated along various timelines 422 coupled to selected locations 22 of interest. It is noted that in this case the user can use the presented visual representation to coordinate the assignment of various connection elements 412 to the visual elements 410 (see FIG. 6) of the objects 20, 22, 24 via the user interface 202 (see FIG. 1), based on analysis of the displayed visual representation 18 content. A time selection 950 is January 30, such that events 20 and entities 24 within the selection box can be further analysed. It is recognised that the time selection 950 could be used to represent the instant of focus 900 (see FIG. 9).

Aggregation Module 600

Referring to FIG. 3, an Aggregation Module 600 is for, such as but not limited to, summarizing or aggregating the data objects 14, providing the summarized or aggregated data objects 14 to the Visualization Manager 300 which processes the translation from data objects 14 and group of data elements 27 to the visual representation 18, and providing the creation of summary charts 200 (see FIG. 26) for displaying information related to summarized/aggregated data objects 14 as the visual representation 18 on the display 108.

Figure 22:
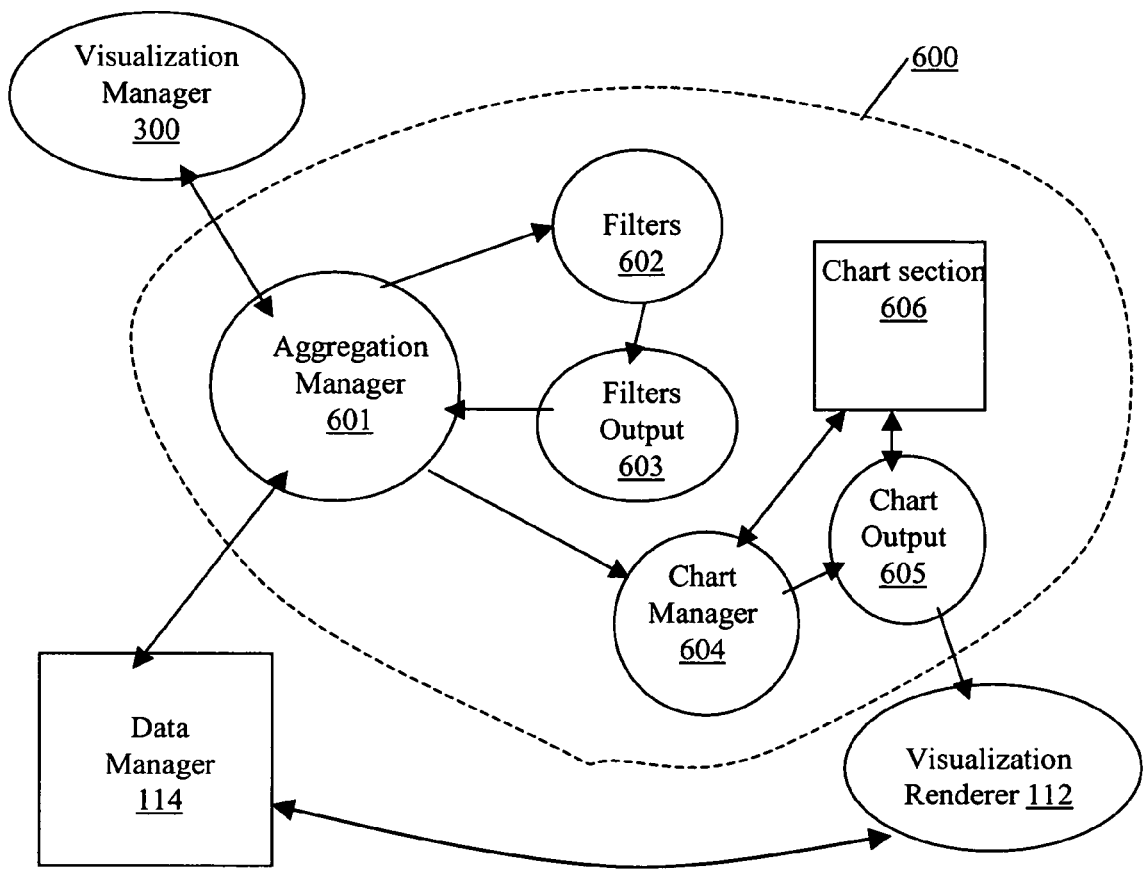
FIG. 22 shows further detail of the aggregation module of FIG. 3.

Referring to FIGS. 3 and 22, the spatial inter-connectedness of information over time and geography within a single, highly interactive 3-D view of the representation 18 is beneficial to data analysis (of the tables 122). However, when the number of data objects 14 increases, techniques for aggregation become more important. Many individual locations 22 and events 20 can be combined into a respective summary or aggregated output 603. Such outputs 603 of a plurality of individual events 20 and locations 22 (for example) can help make trends in time and space domains 400,402 more visible and comparable to the user of the tool 12. Several techniques can be implemented to support aggregation of data objects 14 such as but not limited to techniques of hierarchy of locations, user defined geo-relations, and automatic LOD level selection, as further described below. The tool 12 combines the spatial and temporal domains 400, 402 on the display 108 for analysis of complex past and future events within a selected spatial (e.g. geographic) context.

Referring to FIG. 22, the Aggregation Module 600 has an Aggregation Manager 601 that communicates with the Visualization Manager 300 for receiving aggregation parameters used to formulate the output 603. The parameters can be either automatic (e.g. tool pre-definitions) manual (entered via events 109) or a combination thereof. The manager 601 accesses all possible data objects 14 through the Data Manager 114 (related to the aggregation parameters—e.g. time and/or spatial ranges and/or object 14 types/combinations) from the tables 122, and then applies aggregation tools or filters 602 for generating the output 603. The Visualization Manager 300 receives the output 603 from the Aggregation Manager 601, based on the user events 109 and/or operation of the Time Slider and other Controls 306 by the user for providing the aggregation parameters. As described above, once the output 603 is requested by the Visualization Manager 114, the Aggregation Manager 601 communicates with the Data Manager 114 access all possible data objects 14 for satisfying the most general of the aggregation parameters and then applies the filters 602 to generate the output 603. It is recognised however, that the filters 602 could be used by the manager 601 to access only those data objects 14 from the tables 122 that satisfy the aggregation parameters, and then copy those selected data objects 14 from the tables 122 for storing/mapping as the output 603.

Accordingly, the Aggregation Manager 601 can make available the data elements 14 to the Filters 602. The filters 602 act to organize and aggregate (such as but not limited to selection of data objects 14 from the global set of data in the tables 122 according to rules/selection criteria associated with the aggregation parameters) the data objects 14 according the instructions provided by the Aggregation Manager 601. For example, the Aggregation Manager 601 could request that the Filters 602 summarize all data objects 14 with location data 22 corresponding to Paris. Or, in another example, the Aggregation Manager 601 could request that the Filters 602 summarize all data objects 14 with event data 20 corresponding to Wednesdays. Once the data objects 14 are selected by the Filters 602, the aggregated data is summarized as the output 603. The Aggregation Manager 601 then communicates the output 603 to the Visualization Manager 300, which processes the translation from the selected data objects 14 (of the aggregated output 603) for rendering as the visual representation 18. It is recognised that the content of the representation 18 is modified to display the output 603 to the user of the tool 12, according to the aggregation parameters.

Further, the Aggregation Manager 601 provides the aggregated data objects 14 of the output 603 to a Chart Manager 604. The Chart Manager 604 compiles the data in accordance with the commands it receives from the Aggregation Manager 601 and then provides the formatted data to a Chart Output 605. The Chart Output 605 provides for storage of the aggregated data in a Chart section 606 of the display (see FIG. 25). Data from the Chart Output 605 can then be sent directly to the Visualization Renderer 112 or to the visualization manager 300 for inclusion in the visual representation 18, as further described below.

Figure 23:
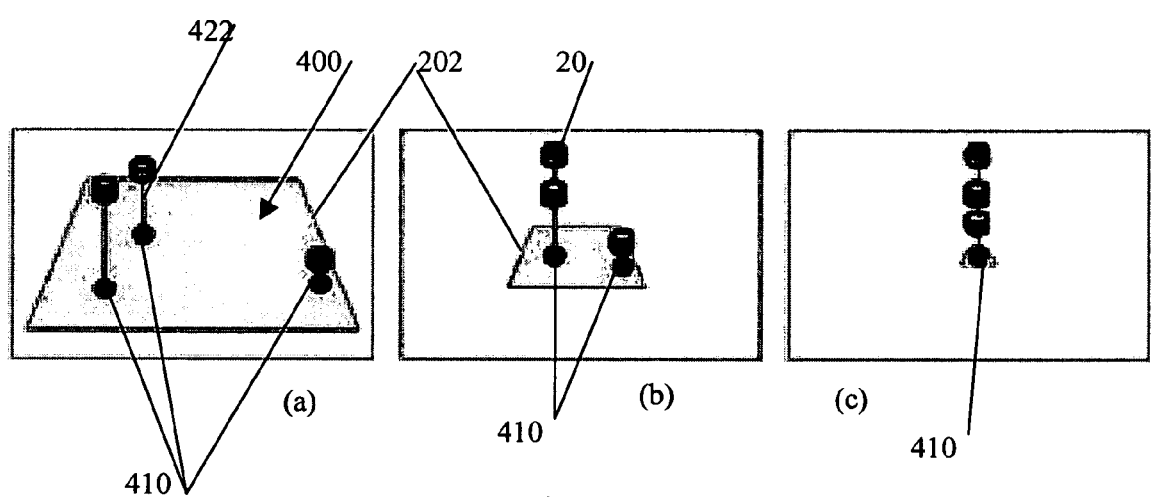
FIG. 23 shows an example aggregation result of the module of FIG. 22.

Referring to FIG. 23, an example aggregation of data objects 14 by the Aggregation Module 601 is shown. The event data 20 (for example) is aggregated according to spatial proximity (threshold) of the data objects 14 with respect to a common point (e.g. particular location 410 or other newly specified point of the spatial domain 400), difference threshold between two adjacent locations 410, or other spatial criteria as desired. For example, as depicted in FIG. 23a, the three data objects 20 at three locations 410 are aggregated to two objects 20 at one location 410 and one object at another location 410 (e.g. combination of two locations 410) as a user-defined field 202 of view is reduced in FIG. 23b, and ultimately to one location 410 with all three objects 20 in FIG. 23c. It is recognised in this example of aggregated output 603 that timelines 422 of the locations 410 are combined as dictated by the aggregation of locations 410.

For example, the user may desire to view an aggregate of data objects 14 related within a set distance of a fixed location, e.g., aggregate of events 20 occurring within 50 km of the Golden Gate Bridge. To accomplish this, the user inputs their desire to aggregate the data according to spatial proximity, by use of the controls 306, indicating the specific aggregation parameters. The Visualization Manager 300 communicates these aggregation parameters to the Aggregation Module 600, in order for filtering of the data content of the representation 18 shown on the display 108. The Aggregation Module 600 uses the Filters 602 to filter the selected data from the tables 122 based on the proximity comparison between the locations 410. In another example, a hierarchy of locations can be implemented by reference to the association data 26 which can be used to define parent-child relationships between data objects 14 related to specific locations within the representation 18. The parent-child relationships can be used to define superior and subordinate locations that determine the level of aggregation of the output 603.

Figure 24:
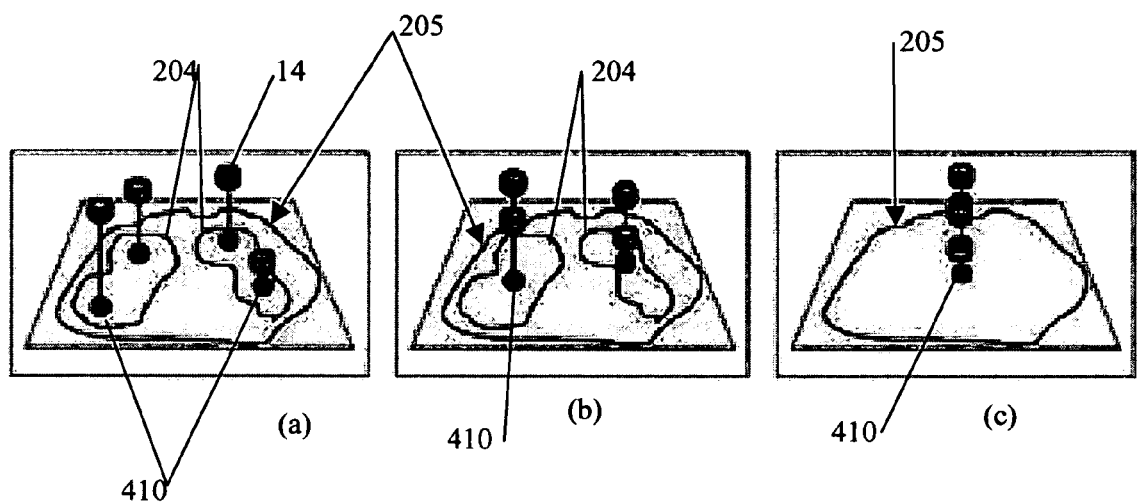
FIG. 24 is a further embodiment of the result of FIG. 23.

Referring to FIG. 24, an example aggregation of data objects 14 by the Aggregation Module 601 is shown. The data 14 is aggregated according to defined spatial boundaries 204. To accomplish this, the user inputs their desire to aggregate the data 14 according to specific spatial boundaries 204, by use of the controls 306, indicating the specific aggregation parameters of the filtering 602. For example, a user may wish to aggregate all event 20 objects located within the city limits of Toronto. The Visualization Manager 300 then requests to the Aggregation Module 600 to filter the data objects 14 of the current representation according to the aggregation parameters. The Aggregation Module 600 provides implements or otherwise applies the filters 602 to filter the data based on a comparison between the location data objects 14 and the city limits of Toronto, for generating the aggregated output 603. In FIG. 24a, within the spatial domain 205 the user has specified two regions of interest 204, each containing two locations 410 with associated data objects 14. In FIG. 24b, once filtering has been applied, the locations 410 of each region 204 have been combined such that now two locations 410 are shown with each having the aggregated result (output 603) of two data objects 14 respectively. In FIG. 24c, the user has defined the region of interest to be the entire domain 205, thereby resulting in the displayed output 603 of one location 410 with three aggregated data objects 14 (as compared to FIG. 24a). It is noted that the positioning of the aggregated location 410 is at the center of the regions of interest 204, however other positioning can be used such as but not limited to spatial averaging of two or more locations 410 or placing aggregated object data 14 at one of the retained original locations 410, or other positioning techniques as desired.

In addition to the examples in illustrated in FIGS. 21 and 22, the aggregation of the data objects can be accomplished automatically based on the geographic view scale provided in the visual representations. Aggregation can be based on level of detail (LOD) used in mapping geographical features at various scales. On a 1:25,000 map, for example, individual buildings may be shown, but a 1:500,000 map may show just a point for an entire city. The aggregation module 600 can support automatic LOD aggregation of objects 14 based on hierarchy, scale and geographic region, which can be supplied as aggregation parameters as predefined operation of the controls 306 and/or specific manual commands/criteria via user input events 109. The module 600 can also interact with the user of the tool 12 (via events 109) to adjust LOD behaviour to suit the particular analytical task at hand.

Figure 28:
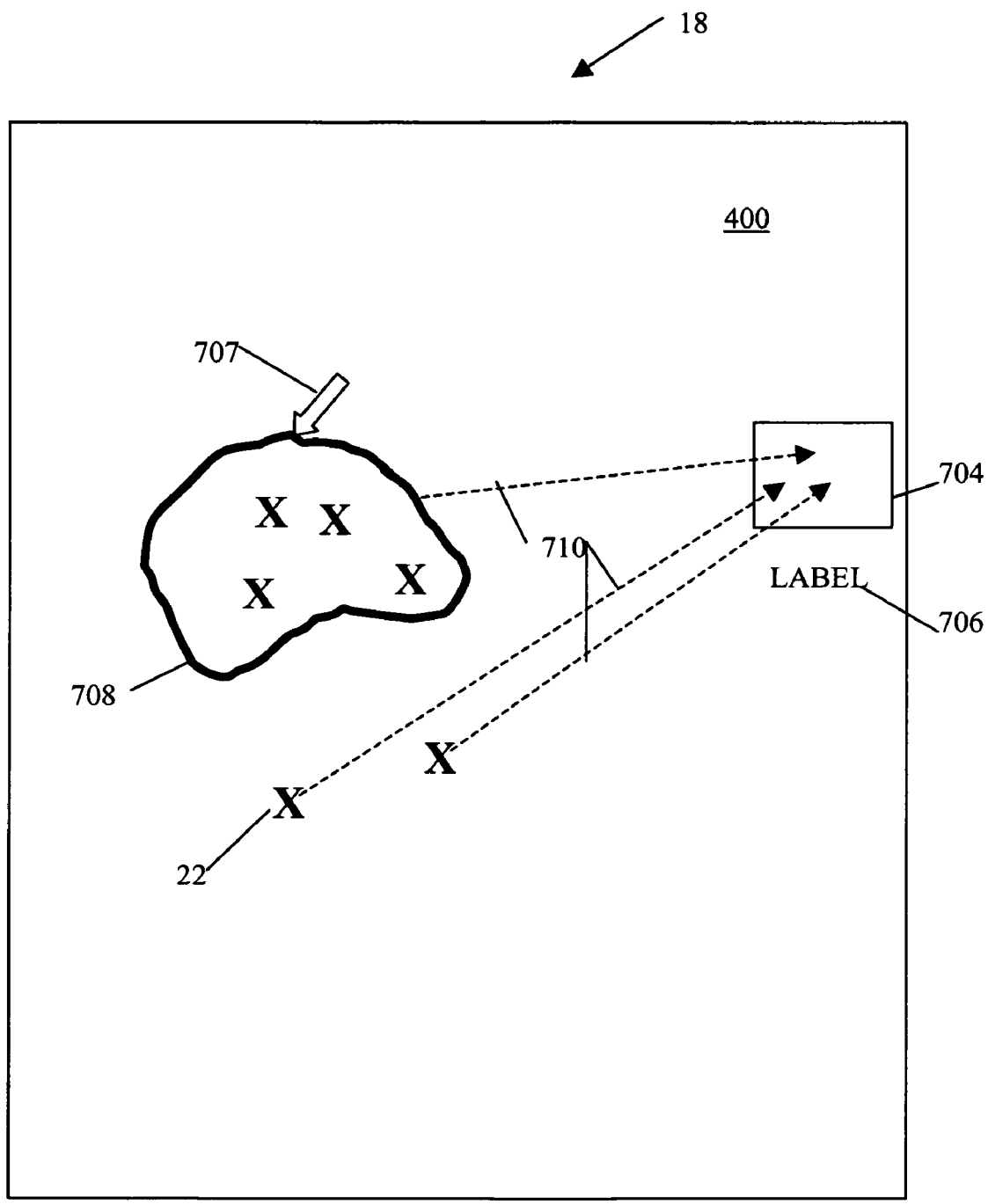
FIG. 28 shows an example operation of the tool of FIG. 27.
Figure 29:
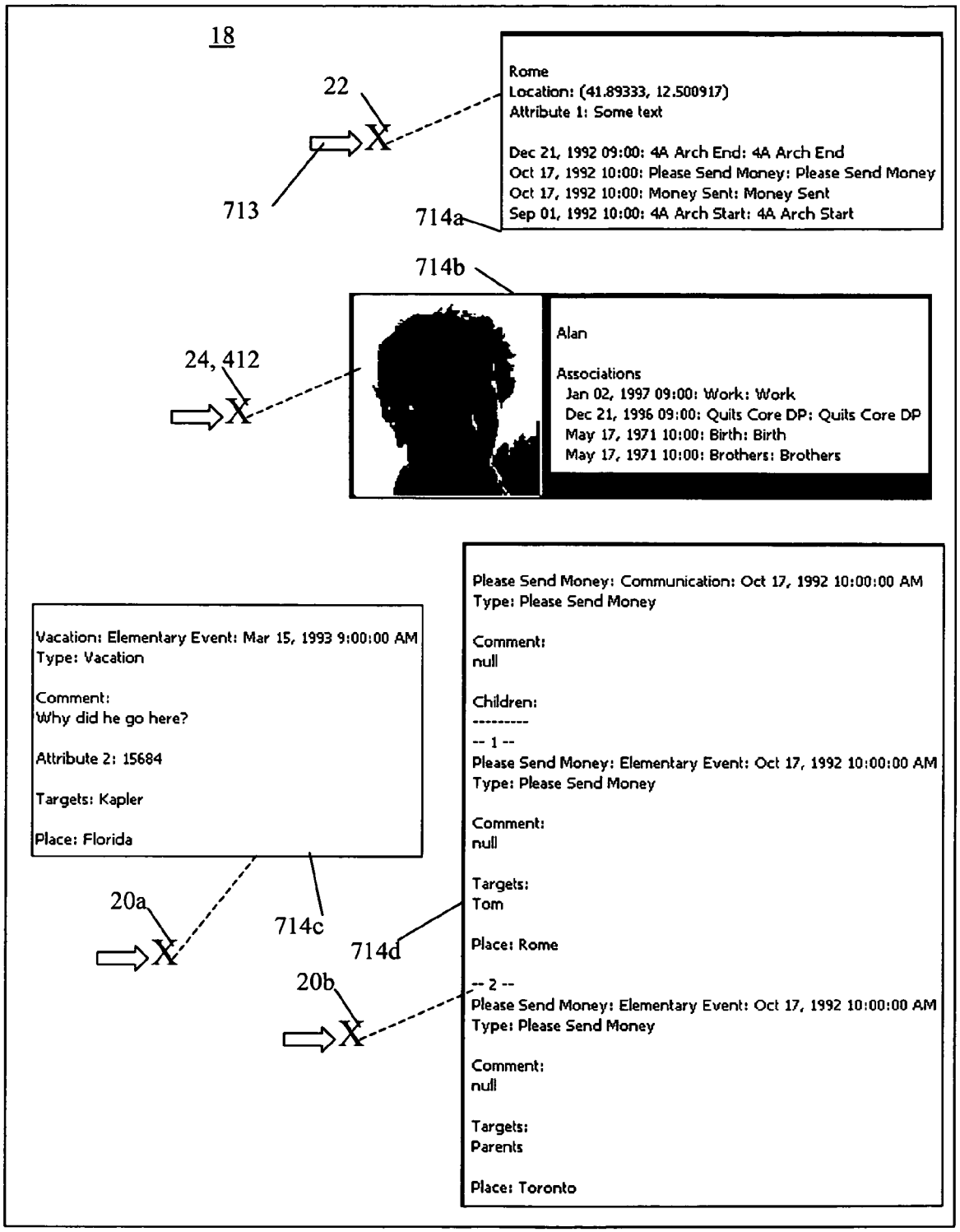
FIG. 29 shows a further example of the visualization representation of FIG. 4.

Referring to FIG. 27 and FIG. 28, the aggregation module 600 can also have a place aggregation module 702 for assigning visual elements 410,412 (e.g. events 20) of several places/locations 22 to one common aggregation location 704, for the purpose of analyzing data for an entire area (e.g. a convoy route or a county). It is recognised that the place aggregation function can be turned on and off for each aggregation location 704, so that the user of the tool 12 can analyze data with and without the aggregation(s) active. For example, the user creates the aggregation location 704 in a selected location of the spatial domain 400 of the representation 18. The user then gives the created aggregation location 704 a label 706 (e.g. North America). The user then selects a plurality of locations 22 from the representation, either individually or as a group using a drawing tool 707 to draw around all desired locations 22 within a user defined region 708. Once selected, the user can drag or toggle the selected regions 708 and individual locations 22 to be included in the created aggregation location 704 by the aggregation module 702. The aggregation module 702 could instruct the visualization manager 300 to refresh the display of the representation 18 to display all selected locations 22 and related visual elements 410,412 in the created aggregation location 704. It is recognised that the aggregation module 702 could be used to configure the created aggregation location 704 to display other selected object types (e.g. entities 24) as a displayed group. In the case of selected entities 24, the created aggregation location 704 could be labelled the selected entities' name and all visual elements 410,412 associated with the selected entity (or entities) would be displayed in the created aggregation location 704 by the aggregation module 702. It is recognised that the above-described same aggregation operation could be done for selected event 20 types, as desired.

Figure 25:
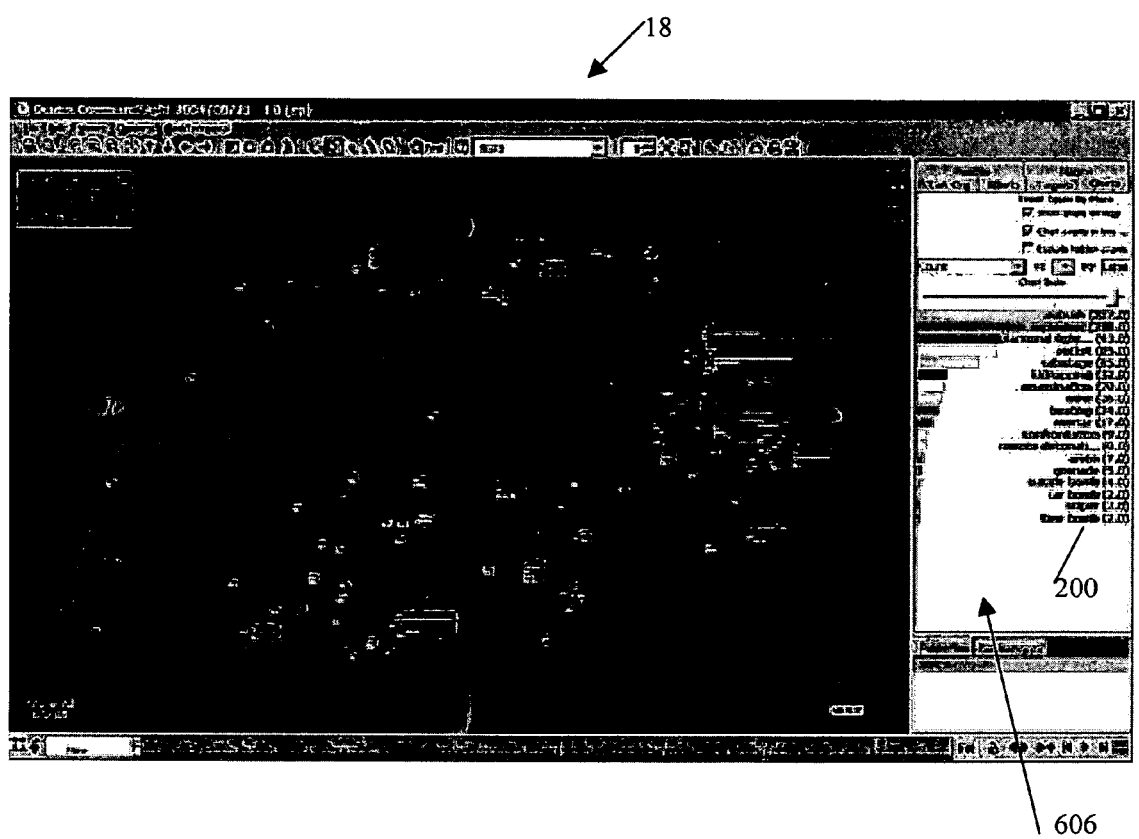
FIG. 25 shows a summary chart view of a further embodiment of the representation of FIG. 20.

Referring to FIG. 25, an example of a spatial and temporal visual representation 18 with summary chart 200 depicting event data 20 is shown. For example, a user may wish to see the quantitative information relating to a specific event object. The user would request the creation of the chart 200 using the controls 306, which would submit the request to the Visualization Manager 300. The Visualization Manager 300 would communicate with the Aggregation Module 600 and instruct the creation of the chart 200 depicting all of the quantitative information associated with the data objects 14 associated with the specific event object 20, and represent that on the display 108 (see FIG. 2) as content of the representation 18. The Aggregation Module 600 would communicate with the Chart Manager 604, which would list the relevant data and provide only the relevant information to the Chart Output 605. The Chart Output 605 provides a copy of the relevant data for storage in the Chart Comparison Module, and the data output is communicated from the Chart Output 605 to the Visualization Renderer 112 before being included in the visual representation 18. The output data stored in the Chart Comparison section 606 can be used to compare to newly created charts 200 when requested from the user. The comparison of data occurs by selecting particular charts 200 from the chart section 606 for application as the output 603 to the Visual Representation 18.

The charts 200 rendered by the Chart Manager 604 can be created in a number of ways. For example, all the data objects 14 from the Data Manager 114 can be provided in the chart 200. Or, the Chart Manager 604 can filter the data so that only the data objects 14 related to a specific temporal range will appear in the chart 200 provided to the Visual Representation 18. Or, the Chart Manager 604 can filter the data so that only the data objects 14 related to a specific spatial and temporal range will appear in the chart 200 provided to the Visual Representation 18.

Figure 30:
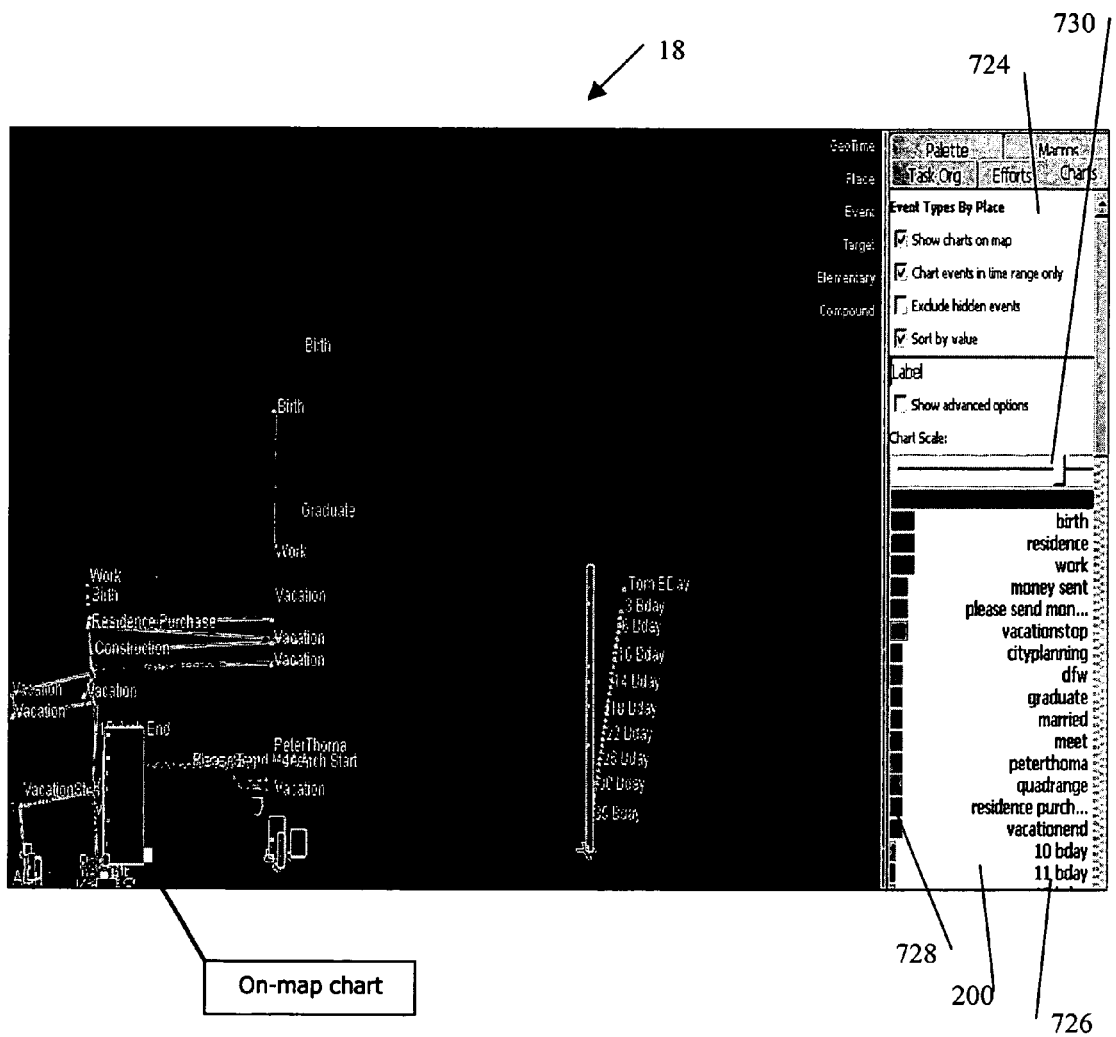
FIG. 30 is a further example of the charts of FIG. 25.

Referring to FIG. 30, a further embodiment of event aggregation charts 200 calculates and displays (both visually and numerically) the count objects by various classifications 726. When charts 200 are displayed on the map (e.g. on-map chart), one chart 200 is created for each place 22 that is associated with relevant events 20. Additional options become available by clicking on the colored chart bars 728 (e.g. Hide selected objects, Hide target). By default, the chart manager 604 (see FIG. 22) can assign colors to chart bars 728 randomly, except for example when they are for targets 24, in which case the chart manager 604 uses existing target 24 colors, for convenience. It is noted that a Chart scale slider 730 can be used to increase or decrease the scale of on-map charts 200, e.g. slide right or left respectively. The chart manager 604 can generate the charts 200 based on user selected options 724, such as but not limited to:

1) Show Charts on Map—presents a visual display on the map, one chart 200 for each place 22 that has relevant events 20;

2) Chart Events in Time Range Only—includes only events 20 that happened during the currently selected time range;

3) Exclude Hidden Events—excludes events 20 that are not currently visible on the display (occur within current time range, but are hidden);

4) Color by Event—when this option is turned on, event 20 color is used for any bar 728 that contains only events 20 of that one color. When a bar 728 contains events 20 of more than one color, it is displayed gray;

5) Sort by Value—when turned on, results are displayed in the Charts 200 panel, sorted by their value, rather than alphabetically; and 6) Show Advanced Options—gives access to additional statistical calculations.

Figure 26:
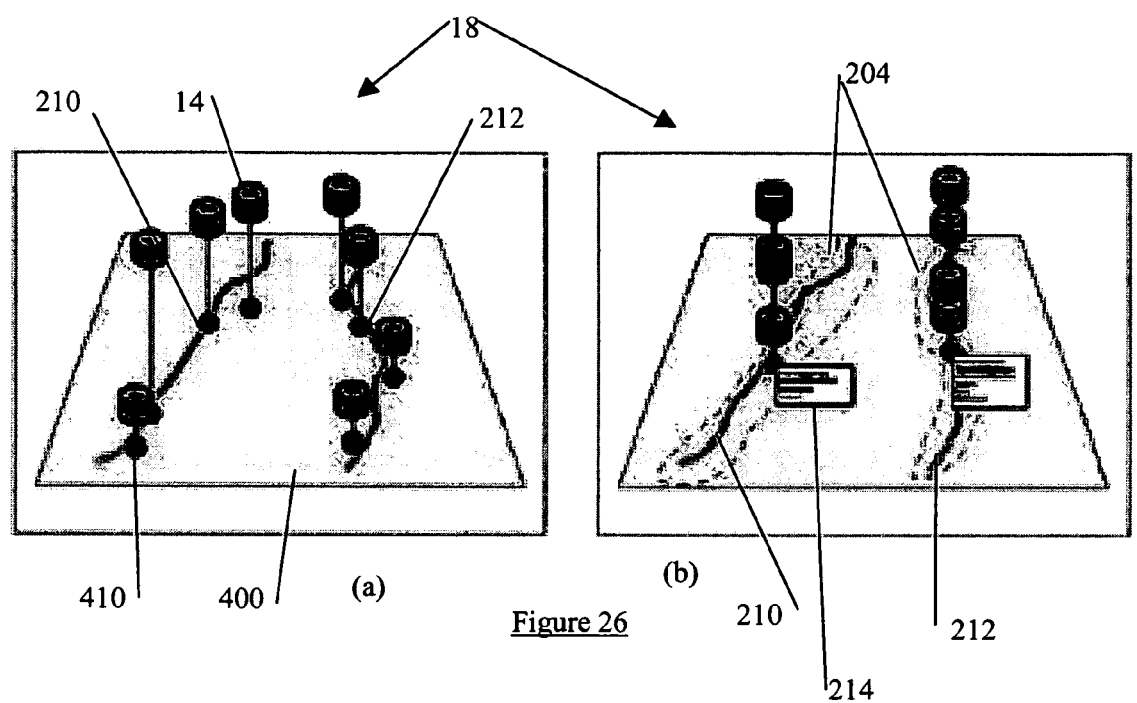
FIG. 26 shows an event comparison for the aggregation module of FIG. 23.

In a further example of the aggregation module 601, user-defined location boundaries 204 can provide for aggregation of data 14 across an arbitrary region. Referring to FIG. 26, to compare a summary of events along two separate routes 210 and 212, aggregation output 603 of the data 14 associated with each route 210,212 would be created by drawing an outline boundary 204 around each route 210,212 and then assigning the boundaries 204 to the respective locations 410 contained therein, as depicted in FIG. 26a. By the user adjusting the aggregation level in the Filters 602 through specification of the aggregation parameters of the boundaries 204 and associated locations 410, the data 14 is the aggregated as output 603 (see FIG. 26b) within the outline regions into the newly created locations 410, with the optional display of text 214 providing analysis details for those new aggregated locations 410. For example, the text 214 could summarise that the number of bad events 20 (e.g. bombings) is greater for route 210 than route 212 and therefore route 212 would be the route of choice based on the aggregated output 603 displayed on the representation 18.

It will be appreciated that variations of some elements are possible to adapt the invention for specific conditions or functions. The concepts of the present invention can be further extended to a variety of other applications that are clearly within the scope of this invention.

For example, one application of the tool 12 is in criminal analysis by the "information producer". An investigator, such as a police officer, could use the tool 12 to review an interactive log of events 20 gathered during the course of long-term investigations. Existing reports and query results can be combined with user input data 109, assertions and hypotheses, for example using the annotations 21. The investigator can replay events 20 and understand relationships between multiple suspects, movements and the events 20. Patterns of travel, communications and other types of events 20 can be analysed through viewing of the representation 18 of the data in the tables 122 to reveal such as but not limited to repetition, regularity, and bursts or pauses in activity.

Subjective evaluations and operator trials with four subject matter experts have been conducted using the tool 12. These initial evaluations of the tool 12 were run against databases of simulated battlefield events and analyst training scenarios, with many hundreds of events 20. These informal evaluations show that the following types of information can be revealed and summarized. What significant events happened in this area in the last X days? Who was involved? What is the history of this person? How are they connected with other people? Where are the activity hot spots? Has this type of event occurred here or elsewhere in the last Y period of time?

With respect to potential applications and the utility of the tool 12, encouraging and positive remarks were provided by military subject matter experts in stability and support operations. A number of those remarks are provided here. Preparation for patrolling involved researching issues including who, where and what. The history of local belligerent commanders and incidents. Tracking and being aware of history, for example, a ceasefire was organized around a religious calendar event. The event presented an opportunity and knowing about the event made it possible. In one campaign, the head of civil affairs had been there twenty months and had detailed appreciation of the history and relationships. Keeping track of trends. What happened here? What keeps happening here? There are patterns. Belligerents keep trying the same thing with new rotations [a rotation is typically six to twelve months tour of duty]. When the attack came, it did come from the area where many previous earlier attacks had also originated. The discovery of emergent trends . . . persistent patterns . . . sooner rather than later could be useful. For example, the XXX Colonel that tends to show up in an area the day before something happens. For every rotation a valuable knowledge base can be created, and for every rotation, this knowledge base can be retained using the tool 12 to make the knowledge base a valuable historical record. The historical record can include events, factions, populations, culture, etc.

Referring to FIG. 27, the tool 12 could also have a report generation module 720 that saves a JPG format screenshot (or other picture format), with a title and description (optional—for example entered by the user) included in the screenshot image, of the visual representation 18 displayed on the visual interface 202 (see FIG. 1). For example, the screenshot image could include all displayed visual elements 410,412, including any annotations 21 or other user generated analysis related to the displayed visual representation 18, as selected or otherwise specified by the user. A default mode could be all currently displayed information is captured by the report generation module 720 and saved in the screenshot image, along with the identifying label (e.g. title and/or description as noted above) incorporated as part of the screenshot image (e.g. superimposed on the lower right-hand corner of the image). Otherwise the user could select (e.g. from a menu) which subset of the displayed visual elements 410,412 (on a category/individual basis) is for inclusion by the module 720 in the screenshot image, whereby all non-selected visual elements 410,412 would not be included in the saved screenshot image. The screenshot image would then be given to the data manager 114 (see FIG. 3) for storing in the database 122. For further information detail of the visual representation 18 not captured in the screenshot image, a filename (or other link such as a URL) to the non-displayed information could also be superimposed on the screenshot image, as desired. Accordingly, the saved screenshot image can be subsequently retrieved and used as a quick visual reference for more detailed underlying analysis linked to the screenshot image. Further, the link to the associated detailed analysis could be represented on the subsequently displayed screenshot image as a hyperlink to the associated detailed analysis, as desired.

Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

We claim:

1. A method for analysing a plurality of data elements having both temporal and spatial properties, a first data element and a second data element of the plurality of data elements linked by at least one association element, the method stored as instructions on a memory for execution by a computer processor, the instructions comprising of:

selecting the first data element from the plurality of data elements; providing at least one search criteria for use in analysing the properties of the plurality of data elements with respect to at least one property of the first data element;

applying the at least one search criteria to the properties of the plurality of data elements for identifying the second data element from the plurality of data elements and the corresponding at least one association element, the at least one association element configured for representing a connection between the first data element and the second data element, the connection having a first property common to a property of the first data element and a second property common to a property of the second data element, the connection for representing a communication event as the same event for both of the data elements; and generating a visual representation of the first and second data elements and the association element configured for display on a user interface for subsequent interaction with user events, the visual representation including a spatial domain including a reference surface for providing a spatial reference frame having at least two spatial dimensions and including a temporal domain operatively coupled to the spatial domain for providing a common temporal reference frame for locations of interest in the spatial domain, the first data element and the second data element being adapted for positioning at different locations in the spatial reference frame and an occurrence time of the communication event adapted for being a parameter of the communication event.

2. The method of claim 1, wherein the visual representation of the group of data elements is selected from the group comprising; a concurrent time and geographic context and a concurrent time and diagrammatic context.

3. The method of claim 2, wherein the type of the data elements is selected from the group comprising: entities; events; and locations.

4. The method of claim 3, wherein the event type represents an action taking place at a particular one of the locations of interest in the spatial reference frame and at the occurrence time in the temporal domain, such that the occurrence time is selected from the group comprising an instant in time and a time span.

5. The method of claim 3, wherein the entity type represents an actor involved in a selected event.

6. The method of claim 3, wherein the location type represents one of the locations of interest in the spatial domain.

7. The method of claim 2, wherein the communication element is selected from the group comprising: a communication connection describing communication details transferred between the two or more data elements; and financial transaction or other transaction.

8. The method of claim 7, wherein the association element is selected from the group comprising: a direct connection; and an indirect connection.

9. The method of claim 2 further comprising the step of displaying an information element on the visual representation adjacent to one of the elements in response to a trigger event, the information element for describing selected ones of the properties of said one of the elements.

10. The method of claim 9, wherein the trigger event is a mouse over of said one of the elements.

11. The method of claim 9, wherein the information element is configured based on an element type of said one of the elements.

12. The method of claim 2 further comprising the step of adjusting the display of the visual representation to match a selected range in at least one of the domains.

13. The method of claim 12 further comprising the step of selecting the range based on the properties of the first and second data elements.

14. The method of claim 2, wherein the at least one search criteria represents a degree of separation between the first data element and the second data element.

15. The method of claim 14 further comprising the step of selecting the degree of separation greater than one for facilitating the identification of at least a third data element and an additional association element, such that the association element links the first data element to the second data element and the additional association element links the second data element to the third data element for representing a link between the first and third data elements.

16. The method of claim 15 further comprising the step of increasing the degree of separation for resulting in the identification and display of further data elements indirectly linked to the first data element through further association elements.

17. The method of claim 2 further comprising the step of selecting the second data element and applying the at least one search criteria as a number of connections to the properties of the second data element for facilitating identification of a connection path represented by the association element between the first and second data elements.

18. The method of claim 17 further comprising the step of increasing the specified number of connections between the first and second data elements for facilitating identification of multiple connection paths between the first and second data elements and at least one additional data element.

19. The method of claim 17, wherein the connection path is selected from the group comprising: a direct connection path and an indirect connection path.

20. The method of claim 15, wherein the first data element represents a target object and the second data element represents an event connected to the target object.

21. A system for analysing a plurality of data elements having both temporal and spatial properties, a first data element and a second data element of the plurality of data elements linked by at least one association element, the system comprising:
  a computer processor;
  a user interface coupled to the computer processor for selecting the first data element from the plurality of data elements and for providing at least one search criteria for use in analysing the properties of the plurality of data elements with respect to at least one property of the first data element;
  an analysis module executable by the computer processor configured for applying the at least one search criteria to the properties of the plurality of data elements for identifying the second data element from the plurality of data elements and the corresponding at least one association element, the at least one association element configured for representing a connection between the first data element and the second data element, the connection having a first property common to a property of the first data element and a second property common to a property of the second data element, the connection element for representing a communication event as the same event for both of the data elements; and
  a visualisation module executable by the computer processor configured for generating a visual representation of the first and second data elements and the association element configured for display on the user interface for subsequent interaction with user events, the visual representation including a spatial domain including a reference surface for providing a spatial reference frame having at least two spatial dimensions and including a temporal domain operatively coupled to the spatial domain for providing a common temporal reference frame for locations of interest in the spatial domain, the first data element and the second data element being adapted for positioning at different locations in the spatial reference frame and an occurrence time of the communication event adapted for being a parameter of the communication event.

22. The system of claim 21, wherein the visual representation of the group of data elements is selected from the group comprising; a concurrent time and geographic context and a concurrent time and diagrammatic context.

23. The system of claim 22, wherein the type of the data elements is selected from the group comprising: entities; events; and locations.

24. The system of claim 23, wherein the event type represents an action taking place at a particular one of the locations of interest in the spatial reference frame and at the occurrence time in the temporal domain, such that the occurrence time is selected from the group comprising an instant in time and a time span.

25. The system of claim 23, wherein the entity type represents an actor involved in a selected event.

26. The system of claim 23, wherein the location type represents one of the locations of interest in the spatial domain.

27. The system of claim 22, wherein the connection element is selected from the group comprising: a communication connection describing communication details transferred between the two or more data elements; and a financial transaction or other transaction.

28. The system of claim 27, wherein the association element is selected from the group comprising: a direct connection; and an indirect connection.

29. The system of claim 22 further comprising an information module configured for generating an information element in response to a trigger event for display on the visual representation adjacent to one of the elements, the information element for describing selected ones of the properties of said one of the elements.

30. The system of claim 29, wherein the trigger event is a mouse over of said one of the elements.

31. The system of claim 29, wherein the information element is configured based on an element type of said one of the elements.

32. The system of claim 22 further comprising a fit module for adjusting the display of the visual representation to match a selected range in at least one of the domains.

33. The system of claim 32, wherein the range is based on the properties of the first and second data elements identified by the fit module.

34. The system of claim 22, wherein the at least one search criteria represents a degree of separation between the first data element and the second data element.

35. The system of claim 34 further comprising the analysis module configured for applying the degree of separation greater than one for facilitating the identification of at least a third data element and an additional association element, such that the association element links the first data element to the second data element and the additional association element links the second data element to the third data element for representing a link between the first and third data elements.

36. The system of claim 35, wherein an increase in the degree of separation results in the identification and display of further data elements indirectly linked to the first data element through further association elements.

37. The system of claim 22 further comprising the user interface configured for selecting the second data element and the analysis module configured for applying the at least one search criteria as a number of connections to the properties of the second data element for facilitating identification of a connection path represented by the association element between the first and second data elements.

38. The system of claim 37 further, wherein an increase in the specified number of connections between the first and second data elements facilitates identification of multiple connection paths between the first and second data elements and at least one additional data element.

39. The system of claim 37, wherein the connection path is selected from the group comprising: a direct connection path and an indirect connection path.

40. The system of claim 35, wherein the first data element represents a target object and the second data element represents an event connected to the target object.

* * * * *